(12) United States Patent
Jung et al.

(10) Patent No.: US 11,146,998 B2
(45) Date of Patent: Oct. 12, 2021

(54) METHOD AND APPARATUS FOR TRANSCEIVING DATA IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Himke Van Der Velde, Suwon-si (KR); Alexander Sayenko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/530,458

(22) Filed: Aug. 2, 2019

(65) Prior Publication Data

US 2020/0045593 A1 Feb. 6, 2020

(30) Foreign Application Priority Data

Aug. 3, 2018 (KR) .................. 10-2018-0090911
Oct. 25, 2018 (KR) .................. 10-2018-0128489

(51) Int. Cl.
*H04W 36/00* (2009.01)
*H04W 36/08* (2009.01)
*H04W 88/06* (2009.01)
*H04W 24/10* (2009.01)
(Continued)

(52) U.S. Cl.
CPC ....... *H04W 36/0058* (2018.08); *H04W 24/10* (2013.01); *H04W 36/0007* (2018.08); *H04W 36/08* (2013.01); *H04W 48/20* (2013.01); *H04W 76/27* (2018.02); *H04W 88/06* (2013.01)

(58) Field of Classification Search
CPC ............ H04W 36/0058; H04W 76/27; H04W 36/0007
See application file for complete search history.

(56) References Cited

U.S. PATENT DOCUMENTS

2006/0258386 A1* 11/2006 Jeong .................... H04W 36/24
455/525
2009/0239535 A1 9/2009 Chun et al.
(Continued)

FOREIGN PATENT DOCUMENTS

WO 2011/092126 A1 8/2011
WO 2014/021661 A1 2/2014

OTHER PUBLICATIONS

International Search Report dated Oct. 30, 2019, issued in International Patent Application No. PCT/KR2019/009402.
(Continued)

*Primary Examiner* — Siming Liu
(74) *Attorney, Agent, or Firm* — Jefferson IP Law, LLP

(57) ABSTRACT

A method, performed by a user equipment (UE), of reselecting a cell in a wireless communication system is provided. The method includes determining, by using at least one parameter received from a serving cell, whether to reselect at least one non-serving cell and reselecting a target cell from among the at least one non-serving cell, based on a result of the determining, wherein the reselecting of the target cell includes determining, by using at least one parameter received from the target cell, whether the target cell satisfies a cell selection criterion.

13 Claims, 30 Drawing Sheets

(51) Int. Cl.
*H04W 76/27* (2018.01)
*H04W 48/20* (2009.01)

(56) References Cited

U.S. PATENT DOCUMENTS

| | | | |
|---|---|---|---|
| 2013/0225182 A1* | 8/2013 | Singh | H04W 36/16 455/444 |
| 2014/0036874 A1* | 2/2014 | Jeong | H04W 36/30 370/332 |
| 2014/0206355 A1 | 7/2014 | Pani et al. | |
| 2018/0035342 A1 | 2/2018 | Fujishiro et al. | |

OTHER PUBLICATIONS

3rd Generation Partnership Project (3GPP), Technical Specification Group Radio Access Network, User Equipment (UE) procedures in Idle mode and RRC Inactive state, Dec. 2018, Valbonne, France.
CMCC, Discussion on the immediate cell reselection issue, R2-1810532, 3GPP TSG-RAN WG2 Meeting #AH-1807, Jul. 1, 2018, Montreal, Canada.
European Search Report dated Jul. 23, 2021, issued in European Application No. 19843372.4.

* cited by examiner

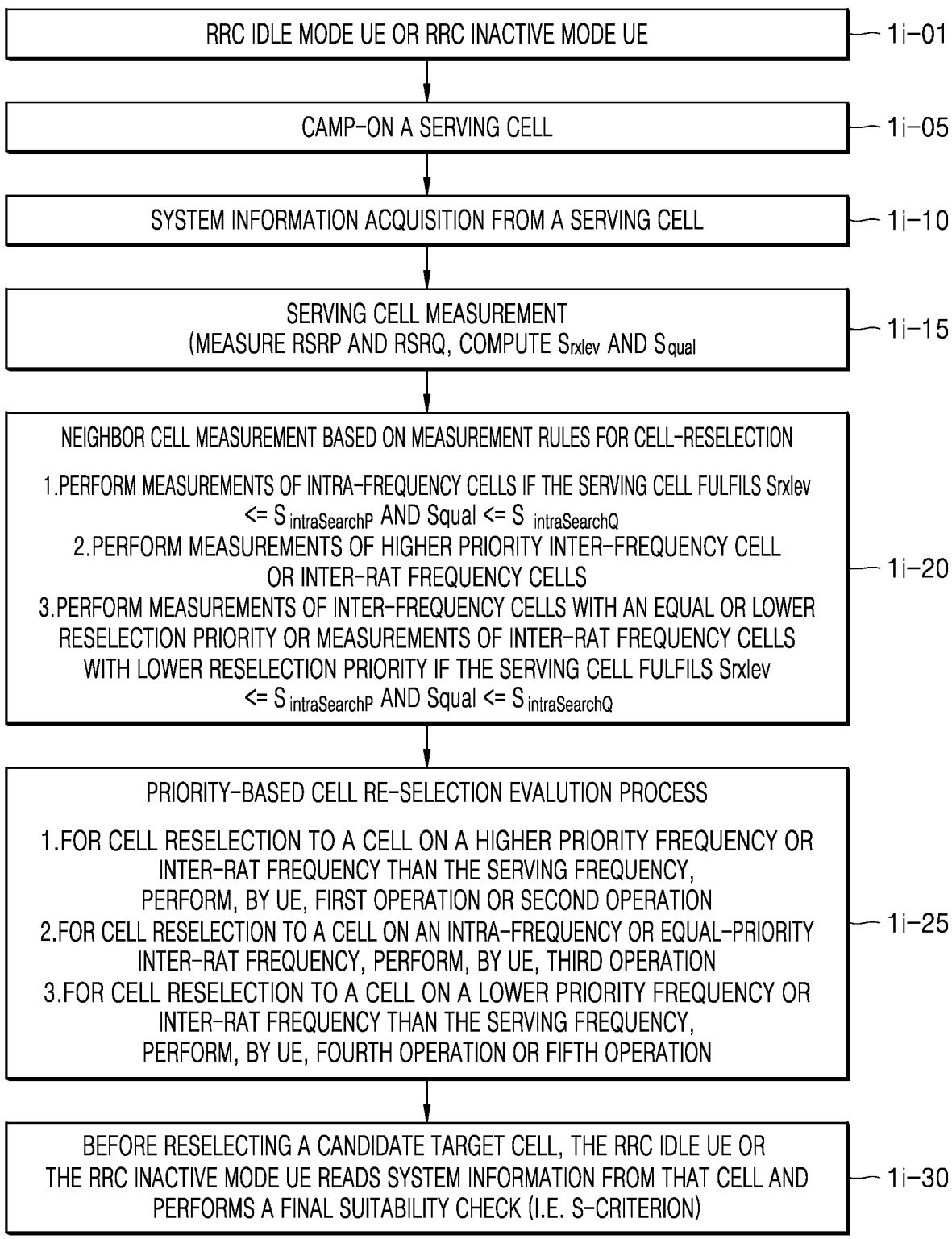

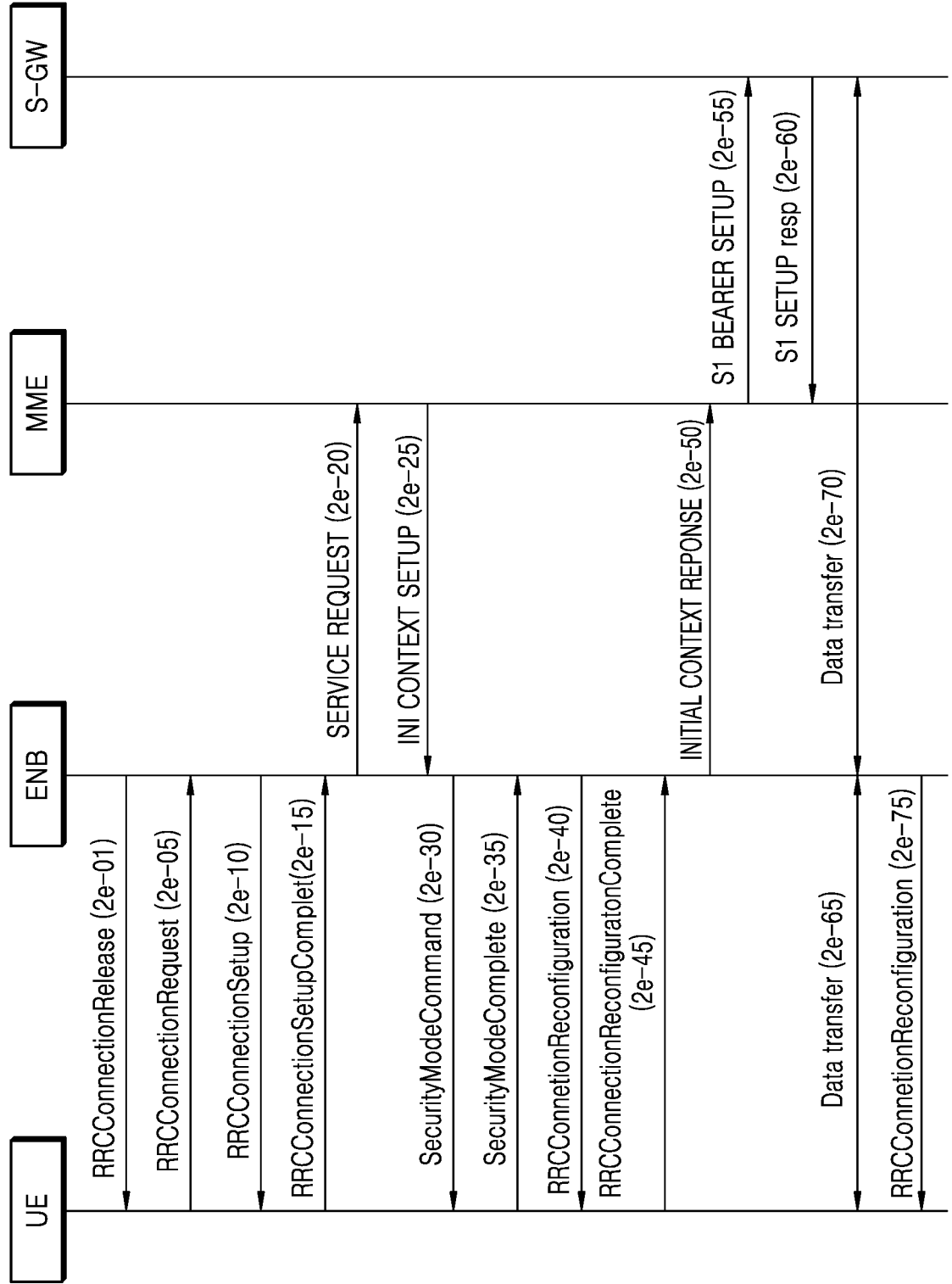

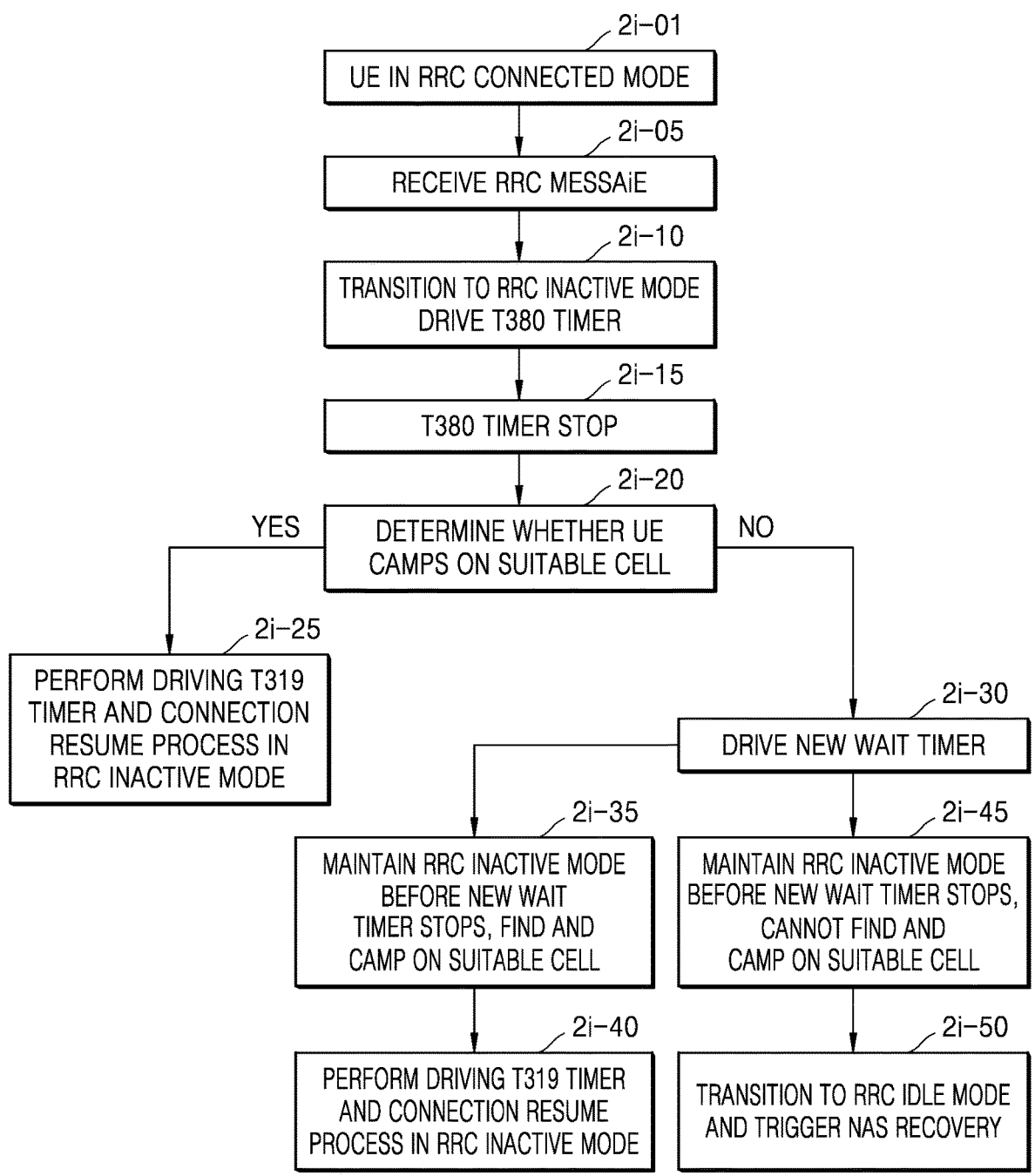

METHOD AND APPARATUS FOR TRANSCEIVING DATA IN WIRELESS COMMUNICATION SYSTEM

CROSS-REFERENCE TO RELATED APPLICATIONS

This application is based on and claims priority under 35 U.S.C. § 119(a) to Korean patent application number 10-2018-0090911, filed on Aug. 3, 2018, in the Korean Intellectual Property Office and to Korean application number 10-2018-0128489, filed on Oct. 25, 2018, in the Korean Intellectual Property Office, the disclosures of each of which are incorporated by reference herein in their entirety.

BACKGROUND

1. Field

The disclosure relates to a method and apparatus for transceiving data in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mm Wave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of cloud radio access network (Cloud-RAN) as the above-described big data processing technology may be an example of convergence of 5G communication technology and IoT technology.

Because various services are enabled to be provided due to the aforementioned technical features and the development of wireless communication systems, methods for effectively providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for transceiving data in a wireless communication system.

Additional aspects will be set forth in part in the description which follows and, in part, will be apparent from the description, or may be learned by practice of the presented embodiments.

In accordance with an aspect of the disclosure, a method, performed by a user equipment (UE), of reselecting a cell in a wireless communication system is provided. The method includes determining, by using at least one parameter received from a serving cell, whether to reselect at least one non-serving cell and reselecting a target cell from among the at least one non-serving cell, based on a result of the determining, wherein the reselecting of the target cell includes determining, by using at least one parameter received from the target cell, whether the target cell satisfies a cell selection criterion.

The determining of whether the target cell satisfies the cell selection criterion may include measuring, by using the at least one parameter received from the target cell, a cell selection reception level value (Srxlev) and a cell selection quality value (Squal) of the target cell and determining whether the Srxlev of the target cell is greater than 0 and the Squal of the target cell is greater than 0.

The at least one parameter received from the target cell may be included in system information broadcast by the target cell.

The at least one parameter received from the target cell may include a parameter representing a minimum required reception level of the target cell and a parameter representing a minimum required quality level of the target cell.

The determining of whether to reselect the at least one non-serving cell may include measuring, by using the at least one parameter received from the serving cell, a cell selection reception level value (Srxlev) and a cell selection quality value (Squal) of the at least one non-serving cell and evaluating, for cell reselection, the Srxlev and the Squal of the at least one non-serving cell.

The at least one parameter received from the serving cell may be included in system information broadcast by the serving cell.

The at least one parameter received from the serving cell may include a parameter representing a minimum required reception level of the at least one non-serving cell and a parameter representing a minimum required quality level of the at least one non-serving cell.

The method may be performed when the UE is in a radio resource control (RRC) idle state or an RRC inactive state.

In accordance with another aspect of the disclosure, a UE for reselecting a cell in a wireless communication system is provided. The UE includes a transceiver and at least one controller coupled with the transceiver and configured to determine, by using at least one parameter received from a serving cell, whether to reselect at least one non-serving cell and reselect a target cell from among the at least one non-serving cell, based on a result of the determining, wherein the at least one controller is further configured to determine, when reselecting the target cell, whether the target cell satisfies a cell selection criterion, by using at least one parameter received by the target cell.

The at least one controller may be further configured to measure, by using the at least one parameter received from the target cell, a cell selection reception level value (Srxlev) and a cell selection quality value (Squal) of the target cell and determine whether the Srxlev of the target cell is greater than 0 and the Squal of the target cell is greater than 0.

The at least one parameter received from the target cell may be included in system information broadcast by the target cell.

The at least one parameter received from the target cell may include a parameter representing a minimum required reception level of the target cell and a parameter representing a minimum required quality level of the target cell.

The at least one controller may be further configured to measure, by using the at least one parameter received from the serving cell, a cell selection reception level value (Srxlev) and a cell selection quality value (Squal) of the at least one non-serving cell and evaluate, for cell reselection, the Srxlev and the Squal of the at least one non-serving cell.

The at least one parameter received from the serving cell may be included in system information broadcast by the serving cell.

The at least one parameter received from the serving cell may include a parameter representing a minimum required reception level of the at least one non-serving cell and a parameter representing a minimum required quality level of the at least one non-serving cell.

An operation of the at least one controller may be performed when the UE is in an RRC idle state or an RRC inactive state.

According to another embodiment of the disclosure, provided is a computer program product including a computer readable recording medium having a computer readable program stored therein, wherein the computer readable program, when executed on a computing device, causes the computing device to determine, by using at least one parameter received from a serving cell, whether to reselect at least one non-serving cell and reselect a target cell from among the at least one non-serving cell, based on a result of the determining, wherein the at least one controller is further configured to determine, when reselecting the target cell, whether the target cell satisfies a cell selection criterion, by using at least one parameter received by the target cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1I illustrates a process of preventing a ping-pong phenomenon when the UE is in the RRC idle mode or the RRC inactive mode, according to an embodiment of the disclosure;

FIG. 2E illustrates a procedure in which an eNode B (eNB) releases a connection to a UE and thus the UE transitions from an RRC connected mode to an RRC idle mode, and a procedure in which the UE establishes a connection with the eNB and thus transitions from the RRC idle mode to the RRC connected mode, according to an embodiment of the disclosure;

FIG. 2I illustrates a flowchart of operations of a UE that drives a new timer according to whether the UE camps on a suitable cell when a T380 timer stops, the T380 timer been driven by the UE after the UE transitioned from an RRC connected mode to an RRC inactive mode, according to an embodiment of the disclosure;

FIG. 2O illustrates a process of maintaining an RRC inactive mode, the process being performed by a UE in the RRC inactive mode when the UE camps on an acceptable cell, according to an embodiment of the disclosure;

Throughout the drawings, it should be noted that like reference numbers are used to depict the same or similar elements, features, and structures.

DETAILED DESCRIPTION

Figure 1A:
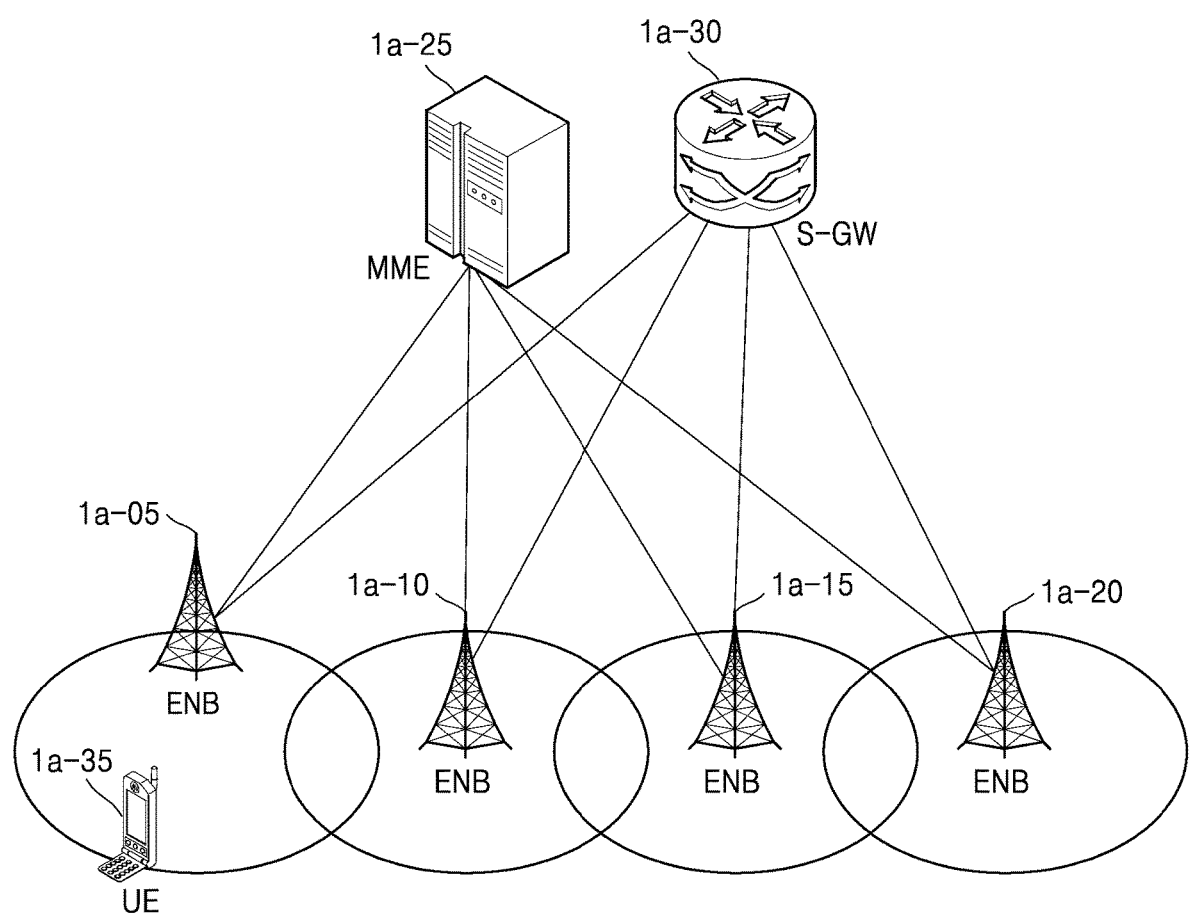
FIG. 1A is a diagram illustrating a configuration of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, may generate units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may be executed in a substantially same time or in reverse order depending on functions corresponding thereto.

As used herein, the term "unit" denotes a software element or a hardware element such as a field-programmable gate array (FPGA) or an application-specific integrated circuit (ASIC), and performs certain functions. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units," or may be divided into additional elements and "units." Furthermore, the elements and "units" may be embodied to reproduce one or more central processing units (CPUs) in a device or security multimedia card. Also, the "unit" may include at least one processor.

In the disclosure, a downlink (DL) is a wireless transmission path of a signal transmitted from a base station to a terminal, and an uplink (UL) is a wireless transmission path of a signal transmitted from a terminal to a base station. Also, one or more embodiments of the disclosure will be described as an example of a long-term evolution (LTE) or LTE-advanced (LTE-A) system, but the one or more embodiments of the disclosure may also be applied to other communication systems having a similar technical background or channel form. For example, 5th generation (5G) mobile communication technology (5G or new radio (NR)) developed after LTE-A may be included. In addition, the one or more embodiments of the disclosure may be applied to other communication systems through some modifications within the scope of the disclosure without significantly departing from the scope of the disclosure by the judgment of a person of ordinary skill in the art.

In the following descriptions, terms identifying access nodes, terms indicating network entities, terms indicating messages, terms indicating interfaces between network entities, terms indicating various types of identification information, etc. are selected only for convenience of description. Therefore, the disclosure is not limited to the terms to be described below and other terms having technically equivalent meanings may also be used.

Hereinafter, for convenience of description, the disclosure uses terms and names defined in the 3rd Generation Partnership Project (3GPP) long term evolution (LTE) communication standards. However, the disclosure is not limited to terms and names and may be equally applied to systems conforming to other standards. In the disclosure, an eNode B (eNB) and a gNode B (gNB) may be mixedly used for convenience of description. That is, a base station described as an eNB may indicate a gNB.

Throughout the disclosure, a layer may also be referred to as an entity.

In the following descriptions, detailed descriptions of known functions and configurations incorporated herein will be omitted when they would obscure the disclosure with unnecessary detail. Hereinafter, embodiments of the disclosure will be described with reference to the attached drawings.

Throughout the disclosure, the expression "at least one of a, b, or c" indicates only a, only b, only c, both a and b, both a and c, both b and c, all of a, b, and c, or variations thereof.

FIG. 1A is a diagram illustrating a configuration of an LTE system according to an embodiment of the disclosure.

Referring to FIG. 1A, a radio access network (RAN) of the LTE system as illustrated may include evolved nodes B (eNBs) or nodes B or eNB 1a-05, 1a-10, 1a-15, and 1a-20, a mobility management entity (MME) 1a-25, and a serving-gateway (S-GW) 1a-30. A user equipment (hereinafter, referred to as a UE or terminal) 1a-35 may access an external network via the eNB 1a-05, 1a-10, 1a-15, and 1a-20 and the S-GW 1a-30.

In FIG. 1A, each of the eNBs 1a-05, 1a-10, 1a-15, and 1a-20 may correspond to an existing node B of a universal mobile telecommunications system (UMTS). Each eNB is connected to the UE 1a-35 through radio channels and may perform complex functions compared to the existing node B. In the LTE system, all user traffic data including real-time services such as voice over Internet protocol (VoIP) may be serviced through shared channels. Therefore, an entity for collating, for example, buffer status information of UEs, available transmit power status information, and channel status information and performing scheduling is required, and each of the eNBs 1a-05, 1a-10, 1a-15, and 1a-20 may serve as such an entity. One eNB may generally control a plurality of cells. For example, the LTE system may use radio access technology (RAT) such as orthogonal frequency division multiplexing (OFDM) at a bandwidth of 20 MHz to achieve a data rate of 100 Mbps. In addition, the eNB may use adaptive modulation and coding (AMC) to determine a modulation scheme and a channel coding rate in accordance with a channel status of the UE 1a-35. The S-GW 1a-30 is an entity for providing data bearers and may establish and release the data bearers by the control of the MME 1a-25. The MME 1a-25 is an entity for performing a mobility management function and various control functions on the UE 1a-35 and may be connected to a plurality of base stations.

Figure 1B:
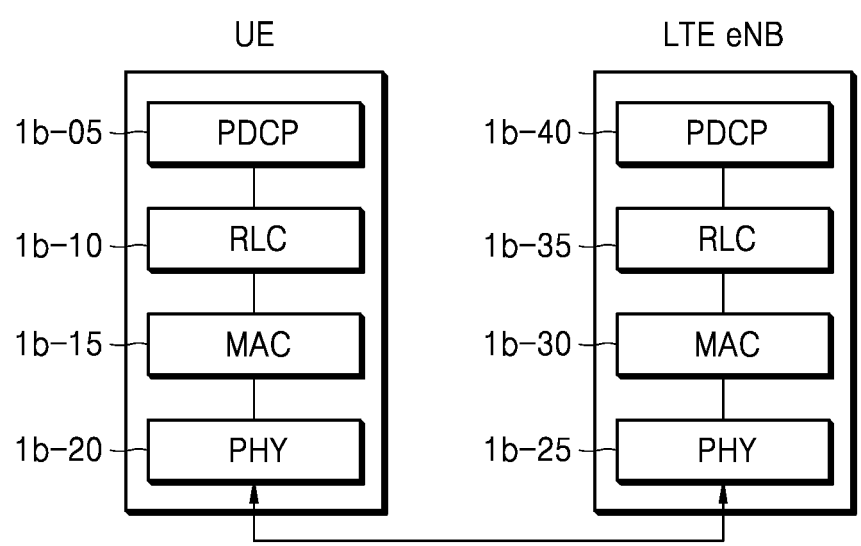
FIG. 1B is a diagram illustrating a radio protocol architecture of an LTE system according to an embodiment of the disclosure.

FIG. 1B is a diagram illustrating a radio protocol architecture of an LTE system according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 may perform operations such as IP header compression/decompression. Main functions of the PDCP layer 1b-05 or 1b-40 may be summarized as shown below:

Header compression and decompression: robust header compression (ROHC) only;
Transfer of user data;
In-sequence delivery of upper layer packet data units (PDUs) at PDCP re-establishment procedure for RLC acknowledged mode (AM);
For split bearers in DC (only support for RLC AM): PDCP PDU routing for transmission and PDCP PDU reordering for reception;
Duplicate detection of lower layer service data units (SDUs) at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering; and
Timer-based SDU discard in uplink.

The RLC layer 1b-10 or 1b-35 may perform, for example, an automatic repeat request (ARQ) operation by reconfiguring PDCP PDUs to an appropriate size. Main functions of the RLC layer 1b-10 or 1b-35 may be summarized as shown below:

Transfer of upper layer PDUs;
Error correction through ARQ (only for AM data transfer);
Concatenation, segmentation and reassembly of RLC SDUs (only for unacknowledged mode (UM) and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer); and
RLC re-establishment.

The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer 1b-15 or 1b-30 may be summarized as shown below:

Mapping between logical channels and transport channels;
Multiplexing/demultiplexing of MAC SDUs belonging to one or different logical channels into/from transport blocks (TBs) delivered to/from the physical layer on transport channels;
Scheduling information reporting;
Error correction through hybrid ARQ (HARQ);
Priority handling between logical channels of one UE;
Priority handling between UEs by means of dynamic scheduling;
Multimedia broadcast/multicast service (MBMS) service identification;
Transport format selection; and
Padding.

A physical (PHY) layer 1b-20 or 1b-25 may channel-code and modulate upper layer data into OFDM symbols and may transmit the OFDM symbols through a radio channel, or may demodulate OFDM symbols received through a radio channel and may channel-decode and may deliver the OFDM symbols to an upper layer.

Figure 1C:
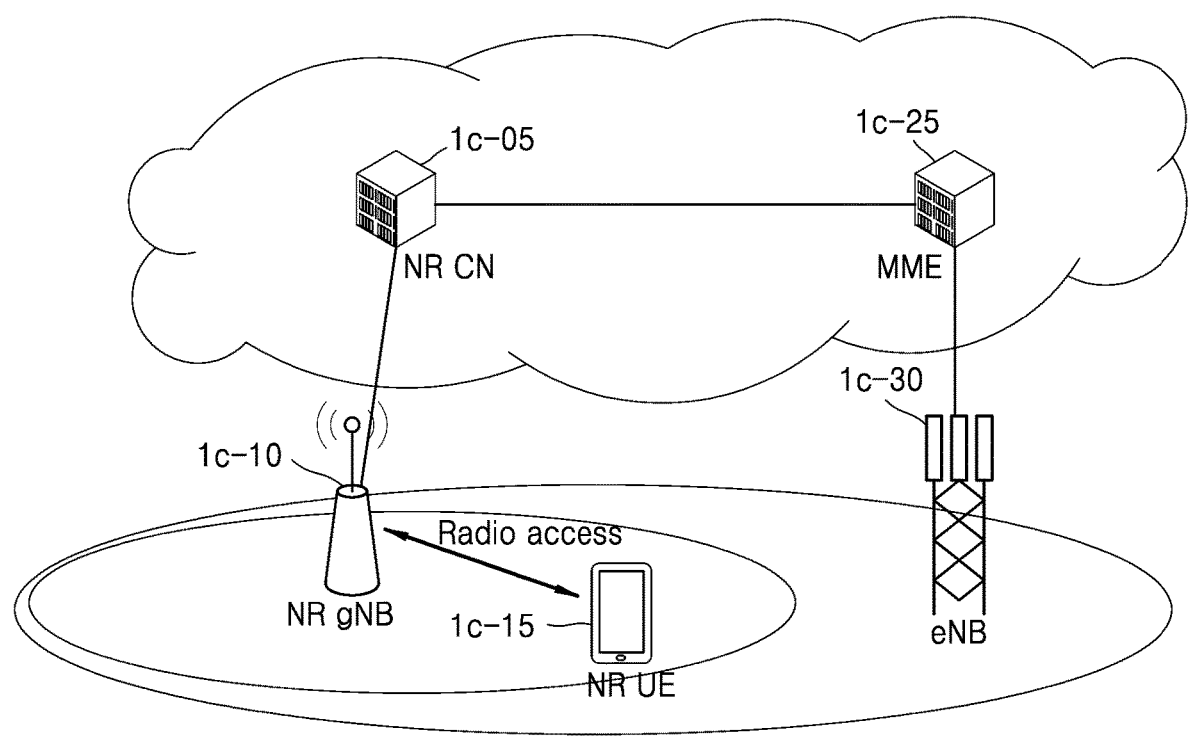
FIG. 1C is a diagram illustrating a configuration of a new mobile communication system according to an embodiment of the disclosure.

FIG. 1C is a diagram illustrating a configuration of a new mobile communication system according to an embodiment of the disclosure.

Referring to FIG. 1C, an RAN of the new mobile communication system (hereinafter, NR or 5G) includes a new radio node B (hereinafter, NR gNB or NR base station) 1c-10 and a new radio core network (NR CN) 1c-05. A new radio user equipment (hereinafter, NR UE or terminal) 1c-15 may access an external network via the NR gNB 1c-10 and the NR CN 1c-05.

In FIG. 1C, the NR gNB 1c-10 may correspond to an eNB of an existing LTE system. The NR gNB 1c-10 is connected to the NR UE 1c-15 through radio channels and may provide superior services compared to an existing node B. In the NR or 5G system, all user traffic data may be serviced through shared channels. Therefore, an entity for collating, for example, buffer status information of UEs, available transmit power status information, and channel status information and performing scheduling is required, and the NR gNB 1c-10 may serve as such an entity. One NR gNB may generally control a plurality of cells. The NR or 5G system may have a bandwidth equal to or greater than a current maximum bandwidth of existing LTE so as to achieve an ultrahigh data rate. Also, the NR or 5G system may additionally use a beamforming technology by using orthogonal frequency division multiplexing (OFDM) as RAT. Also, the NR or 5G system may use adaptive modulation & coding (AMC) to determine a modulation scheme and a channel coding rate according to a channel state of a terminal. The NR CN 1c-05 may perform functions such as mobility support, bearer configuration, quality of service (QoS) configuration, or the like. The NR CN 1c-05 is an entity for performing a mobility management function and various control functions on the NR UE 1c-15 and may be connected to a plurality of base stations. The NR or 5G system may cooperate with the existing LTE system, and the NR CN 1c-05 may be connected to a mobility management entity (MME) 1c-25 through a network interface. The MME 1c-25 may be connected to an existing eNB 1c-30.

Figure 1D:
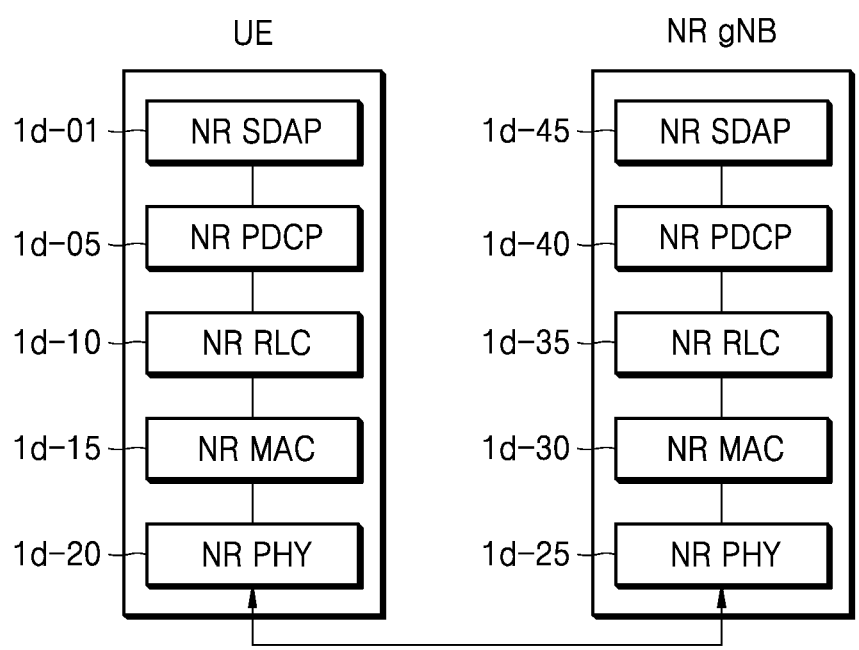
FIG. 1D is a diagram illustrating a radio protocol architecture of a new radio (NR) or $5^{th}$ generation (5G) system according to an embodiment of the disclosure.

FIG. 1D is a diagram illustrating a radio protocol architecture of an NR or 5G system according to an embodiment of the disclosure.

Referring to FIG. 1D, the radio protocol architecture of the NR or 5G system includes NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include some of the following functions:

Transfer of user plane data;
Mapping between a QoS flow and a data radio bearer (DRB) for both DL and UL;
Marking QoS flow identifier (ID) in both DL and UL packets; and
Reflective QoS flow to DRB mapping for the UL SDAP PDUs.

With regard to a SDAP layer, information about whether to use a header of the SDAP layer or to use functions of the SDAP layer may be configured for a UE by using a radio resource control (RRC) message per PDCP layer, per bearer, or per logical channel. When the SDAP header is configured, the UE may update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. QoS information may be used as data processing priority information or scheduling information for appropriately supporting a service.

Main functions of the NR PDCP layer 1*d*-05 or 1*d*-40 may include some of the following functions:
  Header compression and decompression: ROHC only;
  Transfer of user data;
  In-sequence delivery of upper layer PDUs;
  Out-of-sequence delivery of upper layer PDUs;
  PDCP PDU reordering for reception;
  Duplicate detection of lower layer SDUs;
  Retransmission of PDCP SDUs;
  Ciphering and deciphering; and
  Timer-based SDU discard in uplink.

In the aforementioned descriptions, the reordering function of the NR PDCP layer 1*d*-05 or 1*d*-40 may indicate a function of reordering PDCP PDUs received from a lower layer, on a PDCP sequence number (SN) basis. The reordering function of the NR PDCP layer 1*d*-05 or 1*d*-40 may include a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

Main functions of the NR RLC layer 1*d*-10 or 1*d*-35 may include some of the following functions:
  Transfer of upper layer PDUs;
  In-sequence delivery of upper layer PDUs;
  Out-of-sequence delivery of upper layer PDUs;
  Error correction through ARQ;
  Concatenation, segmentation and reassembly of RLC SDUs;
  Re-segmentation of RLC data PDUs;
  Reordering of RLC data PDUs;
  Duplicate detection;
  Protocol error detection;
  RLC SDU discard; and
  RLC re-establishment.

In the aforementioned descriptions, the in-sequence delivery function of the NR RLC layer 1*d*-10 or 1*d*-35 may indicate a function of delivering RLC SDUs received from a lower layer, to an upper layer in order. When one RLC SDU is segmented into a plurality of RLC SDUs and the segmented RLC SDUs are received, the in-sequence delivery function of the NR RLC layer 1*d*-10 or 1*d*-35 may include a function of reassembling the segmented RLC SDUs and delivering the reassembled RLC SDU.

The in-sequence delivery function of the NR RLC layer 1*d*-10 or 1*d*-35 may include a function of reordering received RLC PDUs on a RLC SN or PDCP SN basis, a function of recording missing RLC PDUs by reordering the received RLC PDUs, a function of reporting status information of the missing RLC PDUs to a transmitter, and a function of requesting to retransmit the missing RLC PDUs.

The in-sequence delivery function of the NR RLC layer 1*d*-10 or 1*d*-35 may include a function of delivering only RLC SDUs prior to a missing RLC SDU, to an upper layer in order when the missing RLC SDU exists.

The in-sequence delivery function of the NR RLC layer 1*d*-10 or 1*d*-35 may include a function of delivering all RLC SDUs received before a timer starts, to an upper layer in order although a missing RLC SDU exists when a certain timer stops.

The in-sequence delivery function of the NR RLC layer 1*d*-10 or 1*d*-35 may include a function of delivering all RLC SDUs received up to a current time, to an upper layer in order although a missing RLC SDU exists when a certain timer stops.

The NR RLC layer 1*d*-10 or 1*d*-35 may process the RLC PDUs in order of reception, regardless of SNs, and may deliver the RLC PDUs to a PDCP layer out of order (out-of-sequence delivery).

When the NR RLC layer 1*d*-10 or 1*d*-35 is to receive a segment, the NR RLC layer 1*d*-10 or 1*d*-35 may receive segments stored in a buffer or to be received, may reassemble the segments into a whole RLC PDU and may deliver the RLC PDU to the NR PDCP layer.

The NR RLC layer 1*d*-10 or 1*d*-35 may not have a concatenation function, and the concatenation function may be performed by the NR MAC layer 1*d*-15 or 1*d*-30 or be replaced with a multiplexing function of the NR MAC layer 1*d*-15 or 1*d*-30.

In the aforementioned descriptions, the out-of-sequence delivery function of the NR RLC layer 1*d*-10 or 1*d*-35 may indicate a function of delivering RLC SDUs received from a lower layer, to an upper layer out of order. The out-of-sequence delivery function of the NR RLC layer 1*d*-10 or 1*d*-35 may include a function of reassembling a plurality of RLC SDUs segmented from one RLC SDU and delivering the reassembled RLC SDU when the segmented RLC SDUs are received. The out-of-sequence delivery function of the NR RLC layer 1*d*-10 or 1*d*-35 may include a function of recording missing RLC PDUs by storing RLC SNs or PDCP SNs of received RLC PDUs and reordering the received RLC PDUs.

The NR MAC layer 1*d*-15 or 1*d*-30 may be connected to a plurality of NR RLC layers configured for one UE, and main functions of the NR MAC layer 1*d*-15 or 1*d*-30 may include some of the following functions:
  Mapping between logical channels and transport channels;
  Multiplexing/demultiplexing of MAC SDUs;
  Scheduling information reporting;
  Error correction through HARQ;
  Priority handling between logical channels of one UE;
  Priority handling between UEs by means of dynamic scheduling;
  MBMS service identification;
  Transport format selection; and
  Padding.

An NR PHY layer 1*d*-20 or 1*d*-25 may channel-code and modulate upper layer data into OFDM symbols and may transmit the OFDM symbols through a radio channel, or may demodulate OFDM symbols received through a radio channel and channel-decode and deliver the OFDM symbols to an upper layer.

Figure 1E:
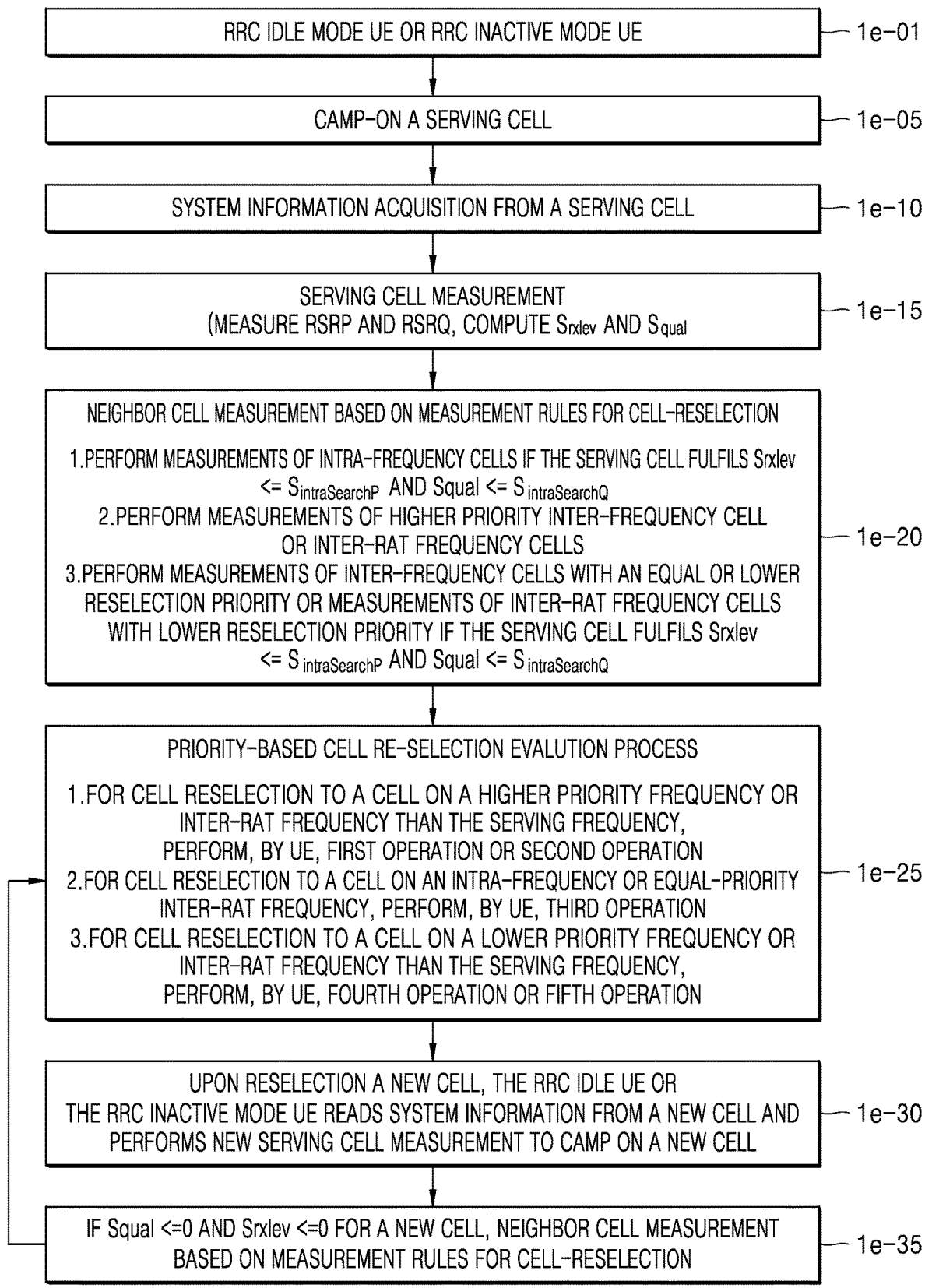
FIG. 1E is a diagram for describing occurrence of a ping-pong phenomenon in a cell reselection process in a radio resource control (RRC) idle mode or an RRC inactive mode of a user equipment (UE), according to an embodiment of the disclosure.

FIG. 1E is a diagram for describing an occurrence of a ping-pong phenomenon in a cell reselection process in an RRC idle mode or an RRC inactive mode of a UE, according to an embodiment of the disclosure.

Referring to FIG. 1E, the cell reselection process may indicate a process of determining, by the UE in the RRC idle mode or the RRC inactive mode, whether to maintain a current serving cell or to reselect a cell as a neighbor cell when a service quality of a serving cell deteriorates compared to a service quality of the neighbor cell for a predetermined reason or due to movement of the UE.

In handover, whether to perform handover is determined by a network (an MME, an access and mobility management function (AMF), a source eNB, or a source gNB), whereas, in the cell reselection process, the UE itself may determine whether to perform the cell reselection process, based on a measurement value of the UE. A cell to be re-selected by the UE as the UE moves may be an intra-frequency cell using a same NR frequency as the serving cell that the UE currently camps on, an inter-frequency cell using a different NR frequency, or an inter-radio access technology (inter-RAT) cell using a different RAT.

The UE in the RRC idle mode or the RRC inactive mode (operation 1e-01) may perform a series of operations when it camps on a serving cell (operation 1e-05).

In operation 1e-10, the UE in the RRC idle mode or the RRC inactive mode may receive system information broadcast by a base station of the serving cell. In this regard, the UE in the RRC idle mode or the RRC inactive mode may not receive system information broadcast by a base station of the neighbor cell. The system information may be divided into a master information block (MIB) and system information blocks (SIBs). In addition, the SIBs may be divided into SIB1 and an SI message (e.g., SIB2, SIB3, SIB4, or SIB5) excluding SIB1. The UE in the RRC idle mode or the RRC inactive mode may previously receive and read system information (e.g., MIB, SIB1, or SIB2) broadcast by a base station of a certain serving cell before the UE camps on the certain serving cell. For reference, MIB and SIB1 may be system information to be commonly applied to all UEs. SIB2 may be system information to be commonly applied to a process of reselecting, by the UE in the RRC idle mode or the RRC inactive mode, the intra-frequency cell, the inter-frequency cell, or the inter-RAT cell. SIB3 to SIB5 may include information required for the UE in the RRC idle mode or the RRC inactive mode to reselect a cell.

SIB1 may include information about parameters such as a minimum required reception level, a minimum required quality level, or a threshold value which is used in determining whether to measure a serving cell signal, and such information may be applied in a cell-specific manner. SIB2, SIB3, SIB4, and SIB5 may include information about parameters such as a minimum required reception level, a minimum required quality level, or a threshold value which is used in determining whether to measure a neighbor cell signal. In detail, SIB2 may include common information for reselecting the intra-frequency cell, the inter-frequency cell, or the inter-RAT cell, SIB3 may include information for reselecting only the intra-frequency cell, SIB4 may include information for reselecting only the inter-frequency cell, and SIB5 may include information for reselecting only the inter-RAT cell.

In operation 1e-15, the UE in the RRC idle mode or the RRC inactive mode may wake up in a discontinuous reception (DRX) period and may measure reference signal received power (RSRP) $Q_{rxlevmeas}$ and reference signal received quality (RSRQ) $Q_{qualmeas}$. The UE may calculate, based on the measurement values, a reception level Srxlev (cell selection reception level) and a reception quality Squal (cell selection quality value) of the serving cell by using the parameters received from SIB1. The UE may compare the calculated values with threshold values and then may determine whether to perform neighbor cell measurement for cell reselection. The reception level Srxlev and the reception quality Squal of the serving cell may be determined by using Equation 1 below.

$$Srxlev = Q_{rxlevmeas} - (Q_{rxlevmin} + Q_{rxlevminoffset}) - P_{compensation} - Qoffset_{temp},$$

$$Squal = Q_{qualmeas} - (Q_{qualmin} + Q_{qualminoffset}) - Qoffset_{temp}.$$

Equation 1

Definitions of parameters used in Equation 1 may be determined according to the 3GPP standard specification titled "38.304: User Equipment (UE) procedures in idle mode and RRC Inactive state." Hereinafter, the definitions are equally applied to embodiments of the disclosure to which Equation 1 is applied.

The UE in the RRC idle mode or the RRC inactive mode may not constantly perform the neighbor cell measurement but may determine whether to perform the neighbor cell measurement based on measurement rules so as to minimize consumption of a battery power (operation 1e-20). In this regard, the UE in the RRC idle mode or the RRC inactive mode may not receive the system information broadcast by the base station of the neighbor cell, and may perform the neighbor cell measurement by using the system information broadcast by the serving cell that the UE currently camps on. When the reception level Srxlev and the reception quality Squal of the serving cell which are measured in operation 1e-15 are lower than a threshold value (Srxlev≤$S_{IntraSearchP}$ and Squal≤$S_{IntraSearchQ}$), the UE in the RRC idle mode or the RRC inactive mode may measure neighbor cells using a same frequency as the serving cell (operation 1e-20). That is, a reception quality Squal or a reception level Srxlev of each neighbor cell using the same frequency as the serving cell may be derived based on SIB2 or SIB3 broadcast by the serving cell (application of Equation 1).

For reference, information about threshold values of $S_{IntraSearchP}$ and $S_{IntrasearchQ}$ is included in SIB2. Also, regardless of a quality of the serving cell, the neighbor cell measurement may be performed on inter-frequency and inter-RAT cells having priorities higher than a frequency of the current serving cell (operation 1e-20). That is, a reception quality Squal or a reception level Srxlev of each of inter-frequency cells having a priority higher than the frequency of the serving cell is derived (according to Equation 1) based on SIB4 broadcast by the serving cell, and a reception quality Squal or a reception level Srxlev of each of inter-RAT cells having a priority higher than the frequency of the serving cell is derived (according to Equation 1) based on SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell, which are measured in operation 1e-15, are lower than a threshold value (Srxlex≤$S_{nonIntraSearchP}$ and Squal≤$S_{intraSearchQ}$), the UE in the RRC idle mode or the RRC inactive mode may measure neighbor inter-frequency cells (neighbor cells using a frequency different from the serving cell) or neighbor inter-RAT cells (neighbor cells using a RAT different from that of the serving cell) (operation 1e-20). That is, a reception quality Squal or a reception level Srxlev of at least one inter-frequency cell having a priority equal to or lower than the frequency of the serving cell is derived (according to Equation 1) based on SIB4 broadcast by the serving cell, and a reception quality Squal or a reception level Srxlev of at least one inter-RAT cell having a priority lower than the frequency of the serving cell is derived (according to Equation 1) based on SIB5 broadcast by the serving cell. For reference, information about threshold values of $S_{nonIntraSearchP}$ and $S_{nonIntraSearchQ}$ is included in SIB2.

The UE in the RRC idle mode or the RRC inactive mode may perform a priority (CellReselectionPriority)-based cell reselection evaluation process based on measurement values of neighbor cells (obtained in operation 1e-20) (operation 1e-25). That is, when a plurality of cells fulfilling cell reselection criteria have different priorities, reselection of frequency/RAT cells having a higher priority precedes reselection of frequency/RAT cells having a lower priority. Priority information is included in the system information (SIB2, SIB4, and SIB5) broadcast by the serving cell or is included in an RRCRelease message received when the UE transitions from an RRC connected mode to the RRC idle mode or the RRC inactive mode. Operations of the UE with respect to a cell reselection evaluation process for inter-frequency/inter-RAT cells having a priority higher than the frequency of the serving cell will now be described below.

First Operation:

In a case where SIB2 including a threshold value of threshServingLowQ is broadcast and one second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ ($Squal > Thresh_{X,HighQ}$ during time interval $Treselection_{RAT}$), the UE may perform reselection with respect to the inter-frequency or inter-RAT cell.

Second Operation:

When the UE cannot perform the first operation, the UE may perform the second operation.

When one second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ ($Srxlev > Thresh_{X,HighP}$ during time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Thresh_{X,HighQ}$ and $Thresh_{X,HighP}$, and $Treselection_{RAT}$ of the inter-frequency cell, i.e., information included in SIB4 broadcast by the serving cell. Also, the UE may perform the first operation or the second operation, based on values of a reception quality Squal, a reception level Srxlev, threshold values $Thresh_{X,HighQ}$ and $Thresh_{X,HighP}$, and $Treselection_{RAT}$ of the inter-RAT cell, i.e., information included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

Also, operations of the UE with respect to a cell reselection evaluation process for intra-frequency/inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (i.e. the UE shall perform ranking of all cells that fulfils the cell selection criterion S). Rankings of the serving cell and a neighbor cell may be respectively calculated by using Equation 2 below.

$$R_s = Q_{meas,s} + Q_{hyst}$$

$$R_n = Q_{meas,n} - Q\text{offset} \quad \text{Equation 2}$$

In this regard, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB3. When the inter-frequency cell is reselected, Qoffset is signaled according to each cell, is applied only to a designated cell, and is included in SIB4. When a ranking of a neighbor cell which is derived according to Equation 2 is greater than a ranking of the serving cell (i.e., $R_n > R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where SIB2 including a threshold value of threshServingLowQ is broadcast and one second has elapsed after the UE camped on the current serving cell, when a reception quality Squal of the current serving cell is less than a threshold value $Thresh_{Serving, LowQ}$ ($Squal < Thresh_{Serving, LowQ}$) and a reception quality Squal of an inter-frequency or inter-RAT cell is higher than a threshold value $Thresh_{X, LowQ}$ during a specific time interval $Treselection_{RAT}$ ($Squal > Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When one second has elapsed after the UE camped on the current serving cell, a reception level Srxlev of the current serving cell is lower than a threshold value $Thresh_{Serving, LowP}$ ($Srxlev < Thresh_{Serving, LowP}$), and a reception level Srxlev of the inter-frequency or inter-RAT cell is higher than a threshold value $Thresh_{X, LowQ}$ during a specific time interval $Treselection_{RAT}$ ($Srxlev > Thresh_{X,LowP}$ during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving, LowQ}$ and $Thresh_{Serving, LowP}$ included in SIB2 broadcast by the serving cell, and the reception quality Squal, the reception level Srxlev, and the threshold values $Thresh_{X, LowQ}$ and $Thresh_{X, LowP}$ of the inter-frequency cell which are included in SIB4 broadcast by the serving cell. The fourth operation or the fifth operation by the UE with respect to the inter-RAT cell may be performed based on the threshold values $Thresh_{Serving, LowQ}$ and $Thresh_{Serving, LowP}$ included in SIB2 broadcast by the serving cell, and the reception quality Squal, the reception level Srxlev, and the threshold values $Thresh_{X,LowQ}$ and $Thresh_{X, LowP}$ of the inter-RAT cell which are included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

In operation 1e-30, the UE may receive system information (e.g., MIB, SIB1, SIB2, SIB3, SIB4, or SIB5) broadcast by a target cell reselected based on a priority in operation 1e-25, and may measure a signal of the target cell so as to camp on the target cell. That is, the UE may derive a reception level Srxlev and a reception quality Squal of the target cell, based on SIB1 broadcast by the target cell, and then may determine whether the target cell fulfils a cell selection criterion (S-criterion) (Srxlev>0 AND Squal>0).

In this regard, when the $Q_{qualmin}$ value or the $Q_{rxlevmin}$ value which is included in SIB1 broadcast by the target cell is greater than the $Q_{qualmin}$ value or the $Q_{rxlevmin}$ value included in each of SIB2 (when the target cell is an intra-frequency cell), SIB4 (when the target cell is an inter-frequency cell), and SIB5 (when the target cell is an inter-RAT cell) which are broadcast by the serving cell that the UE camped on in operation 1e-05, the UE may determine that the cell selection criterion is not fulfilled. In operation 1e-35, when a reselected cell does not fulfill an S-criterion, the UE may perform neighbor cell measurement again based on the system information so as to reselect a new cell. The neighbor cell measurement may be performed in a same manner as operation 1e-20.

Afterward, the UE may perform operation 1e-25 again and then may reselect and camp on the cell that the UE camped on in operation 1e-05 or may reselect a cell that was not previously camped on.

Even when the UE performs operation 1e-30 again and reselects a cell, the UE may determine that the cell does not fulfill the S-criterion. Therefore, a ping-pong phenomenon may occur in a cell reselection process.

Figure 1F:
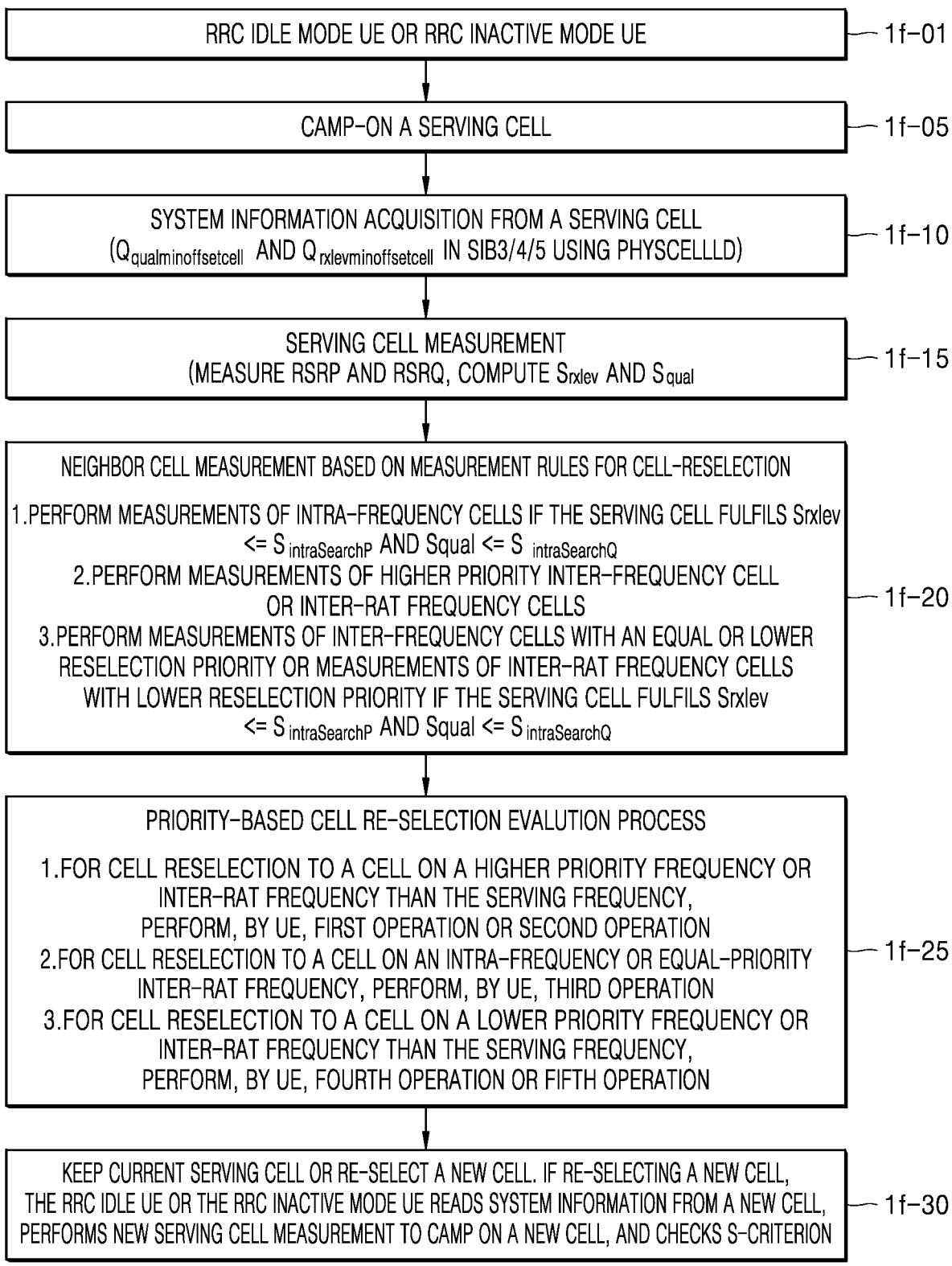
FIG. 1F illustrates a process of preventing a ping-pong phenomenon when the UE is in the RRC idle mode or the RRC inactive mode, according to an embodiment of the disclosure.

FIG. 1F illustrates a process of preventing a ping-pong phenomenon by having information of $Q_{rxlevminoffsetcell}$ and $Q_{qualminoffsetcell}$ included in SIB3, SIB4, or SIB5 broadcast by a serving cell and applying the information only to a designated cell, when the UE in the RRC idle mode or the RRC inactive mode reselects a cell, according to an embodiment of the disclosure.

Referring to FIG. 1F, the UE in the RRC idle mode or the RRC inactive mode (operation 1f-01) may perform a series of operations when it camps on a serving cell (operation 1f-05).

In operation 1f-10, the UE in the RRC idle mode or the RRC inactive mode may receive system information broadcast by a base station of the serving cell. In this regard, the UE in the RRC idle mode or the RRC inactive mode may not receive system information broadcast by a base station of the neighbor cell. The system information may be divided into an MIB and SIBs. In addition, the SIBs may be divided into SIB1 and an SI message (e.g., SIB2, SIB3, SIB4, or SIB5) excluding SIB1. The UE in the RRC idle mode or the RRC inactive mode may previously receive and read system information (e.g., MIB, SIB1, or SIB2) broadcast by a base station of a certain serving cell before the UE camps on the certain serving cell. For reference, MIB and SIB1 may be system information to be commonly applied to all UEs. SIB2 may be system information to be commonly applied to a process of reselecting, by the UE in the RRC idle mode or the RRC inactive mode, the intra-frequency cell, the inter-frequency cell, or the inter-RAT cell. SIB3 to SIB5 may include information required for the UE in the RRC idle mode or the RRC inactive mode to reselect a cell. SIB1 may include information about parameters such as a minimum required reception level, a minimum required signal quality level, or a threshold value which is used in determining whether to measure a serving cell signal, and such information may be applied in a cell-specific manner. SIB2, SIB3, SIB4, and SIB5 may include information about parameters such as a minimum required reception level, a minimum required quality level, or a threshold value which is used in determining whether to measure a neighbor cell signal. In detail, SIB2 may include common information for reselecting the intra-frequency cell, the inter-frequency cell, or the inter-RAT cell, SIB3 may include information for reselecting only the intra-frequency cell, SIB4 may include information for reselecting only the inter-frequency cell, and SIB5 may include information for reselecting only the inter-RAT cell.

In operation 1f-15, the UE in the RRC idle mode or the RRC inactive mode may wake up in a DRX period and may measure a RSRP $Q_{rxlevmeas}$ and a RSRQ $Q_{qualmeas}$. The UE may calculate, based on the measurement values, a reception level Srxlev and a reception quality Squal of the serving cell by using the parameters received from SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 1f-20). In this regard, the UE in the RRC idle mode or the RRC inactive mode may not receive the system information broadcast by the base station of the neighbor cell, and may perform the neighbor cell measurement by using the system information broadcast by the serving cell that the UE currently camps on. When the reception level Srxlev and the reception quality Squal of the serving cell which are measured in operation 1f-15 are lower than a threshold value (Srxlev≤$S_{IntraSearchP}$ and Squal≤$S_{IntraSearchQ}$), the UE in the RRC idle mode or the RRC inactive mode may measure neighbor cells using a same frequency as the serving cell (operation 1f-20). That is, a reception quality Squal or a reception level Srxlev of each neighbor cell using the same frequency as the serving cell may be derived based on SIB2 or SIB3 broadcast by the serving cell. In this regard, the reception quality Squal or the reception level Srxlev of each neighbor cell using the same frequency as the serving cell may be calculated by using Equation 3 below.

$$Srxlev = Q_{rxlevmeas} - (Q_{rxlevmin} + Q_{rxlevminoffset} + Q_{rxlevminoffsetcell}) - P_{compensation} - Qoffset_{temp},$$

$$Squal = Q_{qualmeas} - (Q_{qualmin} + Q_{qualminoffset} + Q_{qualminoffsetcell}) - Qoffset_{temp}. \quad \text{Equation 3}$$

In this regard, a $Q_{rxlevminoffsetcell}$ value and a $Q_{qualminoffsetcell}$ value are included in SIB3 broadcast by the serving cell, and may be applied only to a designated cell. Also, to decrease signaling overhead, the $Q_{rxlevminoffsetcell}$ value and the $Q_{qualminoffsetcell}$ value may be signaled by reusing parameter values in SIB2 or SIB3. For example, the $Q_{rxlevminoffsetcell}$ value and the $Q_{qualminoffsetcell}$ value may be signaled by reusing a Qoffset value considered when a cell-ranking criterion $R_n$ is performed.

```
IntraFreqNeighCellInfo ::=    SEQUENCE {
    physCellId                    PhysCellId,
    q-OffsetCell                  Q-OffsetRange,
    Qrxlevminoffsetcell           Enumerate (reUseQ-OffsetCell)
    Qqualminoffsetcell            Enumerate (reuseQ-OffsetCell)
    ...
}
```

Definitions of parameters used in Equation 3 may be determined according to the 3GPP standard specification titled "38.304: User Equipment (UE) procedures in idle mode and RRC Inactive state." Hereinafter, the definitions are equally applied to embodiments of the disclosure to which Equation 3 is applied. For reference, information about threshold values of $S_{IntraSearchP}$ and $S_{IntraSearchQ}$ is included in SIB2.

Also, regardless of a quality of the serving cell, the neighbor cell measurement may be performed on inter-frequency and inter-RAT cells having priorities higher than a frequency of the current serving cell (operation 1f-20). That is, a reception quality Squal or a reception level Srxlev of each of inter-frequency cells having a priority higher than the frequency of the serving cell may be derived based on SIB4 broadcast by the serving cell. A reception quality Squal or a reception level Srxlev of each of inter-RAT cells having a priority higher than the frequency of the serving cell may be derived based on SIB5 broadcast by the serving cell. For reference, information about threshold values of $S_{nonIntraSearchP}$ and $S_{nonIntraSearchQ}$ is included in SIB2. A reception quality Squal or a reception level Srxlev of inter-frequency cells having a priority higher than the serving cell may be derived by using Equation 3. According to Equation 3, the $Q_{rxlevminoffsetcell}$ value and the $Q_{qualminoffsetcell}$ value are included in SIB4 broadcast by the serving cell, and may be applied only to a designated cell. Also, to decrease signaling overhead, the $Q_{rxlevminoffsetcell}$ value and the $Q_{qualminoffsetcell}$ value may be signaled by reusing parameter values in SIB2 or SIB4. For example, the $Q_{rxlevminoffsetcell}$ value and the $Q_{qualminoffsetcell}$ value may be signaled by reusing a Qoffset value in SIB4, the Qoffset value being considered when a cell-ranking criterion $R_n$ is performed.

```
InterFreqNeighCellInfo ::=    SEQUENCE {
    physCellId                    PhysCellId,
    q-OffsetCell                  Q-OffsetRange,
    Qrxlevminoffsetcell           Enumerate (reUseQ-OffsetCell)
    Qqualminoffsetcell            Enumerate (reuseQ-OffsetCell)
    ...
}
```

Also, the reception quality Squal or the reception level Srxlev of each of inter-RAT cells having a priority higher than the frequency of the serving cell may be derived based on SIB5 broadcast by the serving cell. In this regard, the reception quality Squal or the reception level Srxlev of each of the inter-RAT cells having a priority higher than the serving cell may be derived by using Equation 3. According to Equation 3, a $Q_{rxlevminoffsetcell}$ value and a $Q_{qualminoffsetcell}$ value are included in SIB5 broadcast by the serving cell, and may be applied only to a designated cell. Also, to decrease signaling overhead, the $Q_{rxlevminoffsetcell}$ value and the $Q_{qualminoffsetcell}$ value may be signaled by reusing parameter values in SIB2 or SIB5. For example, the $Q_{rxlevminoffsetcell}$ value and the $Q_{qualminoffsetcell}$ value may be signaled by reusing a Qoffset value in SIB5, the Qoffset value being considered when a cell-ranking criterion $R_n$ is performed.

```
EUTRA-FreqNeighCellInfo ::=   SEQUENCE {
    physCellId                    EUTRA-PhysCellId,
    q-OffsetCell                  E-UTRA-Q-OffsetRange,
    Qrxlevminoffsetcell           Enumerate (reUseQ-OffsetCell)
    Qqualminoffsetcell            Enumerate (reuseQ-OffsetCell)
    ...
}
```

Also, for inter-frequency cells having a priority equal to or lower than the frequency of the serving cell or for inter-RAT cells having a priority lower than the frequency of the serving cell, when the reception level Srxlev and the reception quality Squal of the serving cell which are measured in operation 1f-15 are lower than a threshold value (Srxlev≤$S_{nonIntraSearchP}$ and Squal≤$S_{intraSearchQ}$), the UE in the RRC idle mode or the RRC inactive mode may measure neighbor inter-frequency cells (neighbor cells using a frequency different from the serving cell) or neighbor inter-RAT cells (neighbor cells using a RAT different from that of the serving cell) (operation 1f-20). That is, a reception quality Squal or a reception level Srxlev of at least one inter-frequency cell having a priority lower than the frequency of the serving cell may be derived based on SIB4 broadcast by the serving cell, and a reception quality Squal or a reception level Srxlev of at least one inter-RAT cell having a priority lower than the frequency of the serving cell may be derived based on SIB5 broadcast by the serving cell. For reference, information about threshold values of $S_{nonIntraSearchP}$ and $S_{nonIntraSearchQ}$ is included in SIB2. In this regard, a reception quality Squal or a reception level Srxlev of each of inter-frequency cells having a priority lower than the frequency of the serving cell may be derived by using Equation 3. Also, a reception quality Squal or a reception level Srxlev of each of inter-RAT cells having a priority lower than the frequency of the serving cell may be derived based on SIB5 broadcast by the serving cell. In this regard, the reception quality Squal or the reception level Srxlev of each of the inter-RAT cells having a priority higher than the serving cell may be derived by using Equation 3.

The UE in the RRC idle mode or the RRC inactive mode may perform a priority-based cell reselection evaluation process (CellReselectionPriority) based on measurement values of neighbor cells (obtained in operation 1f-20) (operation 1f-25). That is, when a plurality of cells fulfilling cell reselection criteria have different priorities, reselection of frequency/RAT cells having a higher priority precedes reselection of frequency/RAT cells having a lower priority. Priority information is included in the system information (SIB2, SIB4, and SIB5) broadcast by the serving cell or is included in an RRCRelease message received when the UE transitions from an RRC connected mode to the RRC idle mode or the RRC inactive mode. Operations of the UE with respect to a cell reselection evaluation process for inter-frequency/inter-RAT cells having a priority higher than the frequency of the serving cell will now be described below.

First Operation:

In a case where SIB2 including a threshold value of threshServingLowQ is broadcast and one second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during a time interval $Treselection_{RAT}$), the UE may perform reselection with respect to the inter-frequency or inter-RAT cell.

Second Operation:

When the UE cannot perform the first operation, the UE may perform the second operation.

When one second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X,HighP}$ during a time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Thresh_{X,HighQ}$ and $Thresh_{X,HighP}$, and $Treselection_{RAT}$ of the inter-frequency cell, i.e., information included in SIB4 broadcast by the serving cell. Also, the UE may perform the first operation or the second operation, based on values of a reception quality Squal, a reception level Srxlev, threshold values $Thresh_{X,HighQ}$ and $Thresh_{X,HighP}$, and $Treselection_{RAT}$ of the inter-RAT cell, i.e., information included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

Also, operations of the UE with respect to a cell reselection evaluation process for intra-frequency/inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (i.e. The UE shall perform ranking of all cells that fulfils the cell selection criterion S). Rankings of the serving cell and a neighbor cell may be respectively calculated by using Equation 2 described above. In this regard, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB3. When the inter-frequency cell is reselected, Qoffset is signaled according to each cell, is applied only to a designated cell, and is included in SIB4. When a ranking of a neighbor cell which is derived according to Equation 2 is greater than a ranking of the serving cell (i.e., $R_n > R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where SIB2 including a threshold value of threshServingLowQ is broadcast and one second has elapsed after the UE camped on the current serving cell, when a reception quality Squal of the current serving cell is less than a threshold value $Thresh_{Serving, LowQ}$ (Squal<$Thresh_{Serving, LowQ}$) and a reception quality Squal of an inter-frequency or inter-RAT cell is higher than a threshold value $Thresh_{X, LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When one second has elapsed after the UE camped on the current serving cell, a reception level Srxlev of the current serving cell is lower than a threshold value $Thresh_{Serving, LowP}$ (Srxlev<$Thresh_{Serving, LowP}$), and a reception level Srxlev of the inter-frequency or inter-RAT cell is higher than a threshold value $Thresh_{X, LowQ}$ during a specific time interval $Treselection_{RAT}$ (Srxlev>$Thresh_{X,LowP}$ during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving, LowQ}$ and $Thresh_{Serving, LowP}$ included in SIB2 broadcast by the serving cell, and the reception quality Squal, the reception level Srxlev, and the threshold values $Thresh_{X, LowQ}$ and $Thresh_{X, LowP}$ of the inter-frequency cell which are included in SIB4 broadcast by the serving cell. The fourth operation or the fifth operation by the UE with respect to the inter-RAT cell may be performed based on the threshold values $Thresh_{Serving, LowQ}$ and $Thresh_{Serving, LowP}$ included in SIB2 broadcast by the serving cell, and the reception quality Squal, the reception level Srxlev, and the threshold values $Thresh_{X,LowQ}$ and $Thresh_{X, LowP}$ of the inter-RAT cell which are included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

In operation 1$f$-30, the UE may stay in the current serving cell due to the $Q_{qualminoffsetcell}$ value or the $Q_{rxlevminoffsetcell}$ value. Also, in operation 1$f$-30, the UE may receive system information (e.g., MIB, SIB1, SIB2, SIB3, SIB4, or SIB5) broadcast by a target cell reselected based on a priority (operation 1$f$-25), and may measure a signal of the target cell so as to camp on the target cell. That is, the UE may derive a reception level Srxlev and a reception quality Squal of the target cell, based on SIB1 broadcast by the target cell, and then may determine whether the target cell fulfils a cell selection criterion (S-criterion) (Srxlev>0 AND Squal>0).

In this regard, even when the $Q_{qualmin}$ value or the $Q_{rxlevmin}$ value which is included in SIB1 broadcast by the target cell is greater than the $Q_{qualmin}$ value or the $Q_{rxlevmin}$ value included in each of SIB2 (when the target cell is an intra-frequency cell), SIB4 (when the target cell is an inter-frequency cell), and SIB5 (when the target cell is an inter-RAT cell) which are broadcast by the serving cell that the UE camped on in operation 1$f$-05, the UE may determine that the cell selection criterion is fulfilled, due to the $Q_{qualminoffsetcell}$ value or the $Q_{rxlevminoffsetcell}$ value, and may camp on a new target cell, such that a ping-pong phenomenon in cell reselection may be prevented.

Figure 1G:
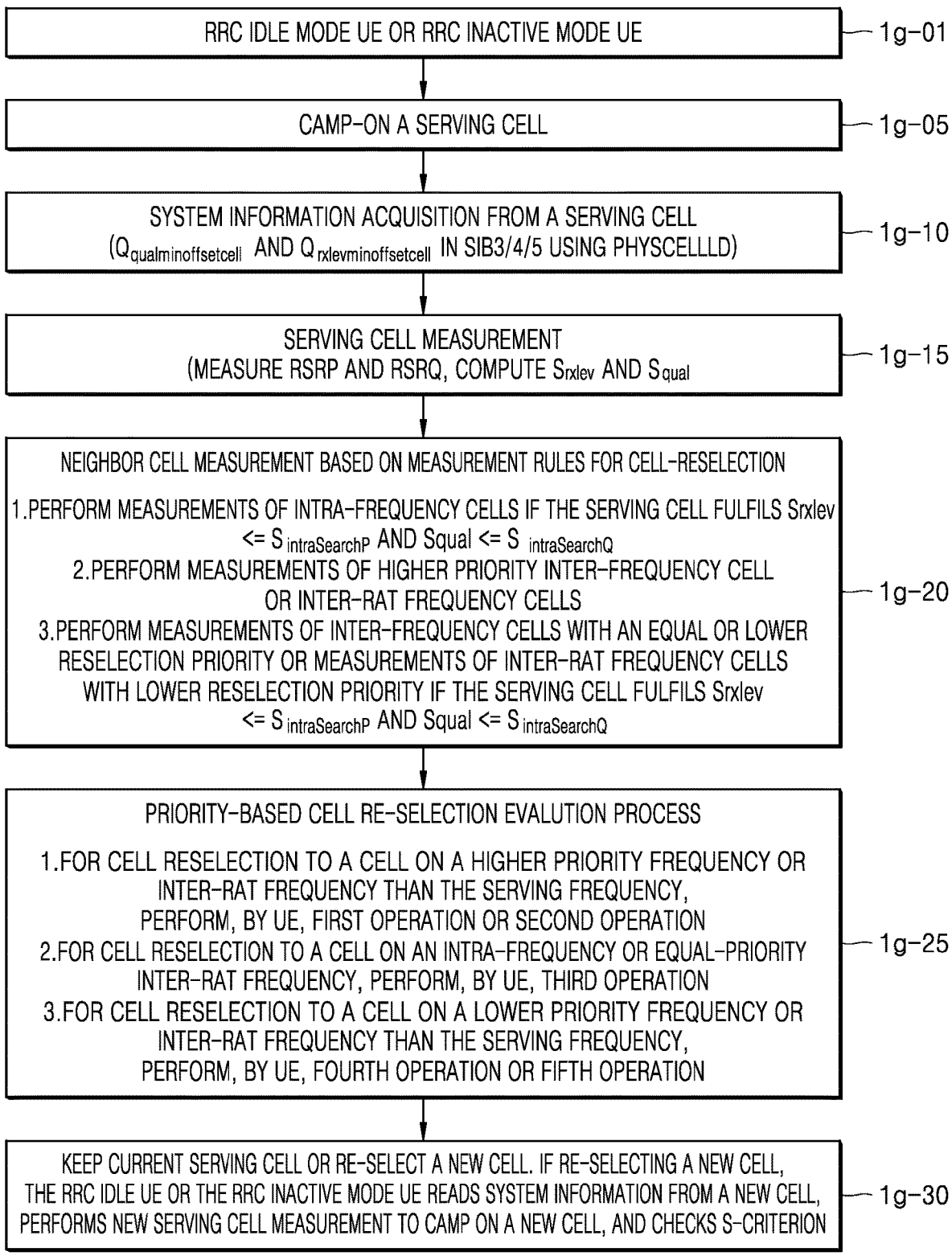
FIG. 1G illustrates a process of preventing a ping-pong phenomenon when the UE is in the RRC idle mode or the RRC inactive mode, according to an embodiment of the disclosure.

FIG. 1G illustrates a process of preventing a ping-pong phenomenon by having information of $Q_{rxlevminoffsetcell}$ and $Q_{qualminoffsetcell}$ included in SIB3, SIB4, or SIB5 broadcast by a serving cell, signaling the information to a predetermined cell group, and having the information commonly applied to all neighbor cells of the predetermined cell group, when the UE in the RRC idle mode or the RRC inactive mode reselects a cell, according to an embodiment of the disclosure.

The UE in the RRC idle mode or the RRC inactive mode (operation 1$g$-01) may perform a series of operations when it camps on a serving cell (operation 1$g$-05). In operation 1$g$-10, the UE in the RRC idle mode or the RRC inactive mode may receive system information broadcast by a base station of the serving cell. In this regard, the UE in the RRC idle mode or the RRC inactive mode may not receive system information broadcast by a base station of the neighbor cell. The system information may be divided into an MIB and SIBs. In addition, the SIBs may be divided into SIB1 and an SI message (e.g., SIB2, SIB3, SIB4, or SIB5) excluding SIB1. The UE in the RRC idle mode or the RRC inactive mode may previously receive and read system information (e.g., MIB, SIB1, or SIB2) broadcast by a base station of a certain serving cell before the UE camps on the certain serving cell. For reference, MIB and SIB1 may be system information to be commonly applied to all UEs. SIB2 may be system information to be commonly applied to a process of reselecting, by the UE in the RRC idle mode or the RRC inactive mode, the intra-frequency cell, the inter-frequency cell, or the inter-RAT cell. SIB3 to SIB5 may include information required for the UE in the RRC idle mode or the RRC inactive mode to reselect a cell. SIB1 may include information about parameters such as a minimum required reception level, a minimum required quality level, or a threshold value which is used in determining whether to measure a serving cell signal, and such information may be applied in a cell-specific manner. SIB2, SIB3, SIB4, and SIB5 may include information about parameters such as a minimum required reception level, a minimum required quality level, or a threshold value which is used in determining whether to measure a neighbor cell signal. In detail, SIB2 may include common information for reselecting the intra-frequency cell, the inter-frequency cell, or the inter-RAT cell, SIB3 may include information for reselecting only the intra-frequency cell, SIB4 may include information for reselecting only the inter-frequency cell, and SIB5 may include information for reselecting only the inter-RAT cell.

In operation 1g-15, the UE in the RRC idle mode or the RRC inactive mode may wake up in a DRX period and may measure a RSRP $Q_{rxlevmeas}$ and a RSRQ $Q_{qualmeas}$. The UE may calculate, based on the measurement values, a reception level Srxlev and a reception quality Squal of the serving cell by using the parameters received from SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 1g-20). In this regard, the UE in the RRC idle mode or the RRC inactive mode may not receive the system information broadcast by the base station of the neighbor cell, and may perform the neighbor cell measurement by using the system information broadcast by the serving cell that the UE currently camps on. When the reception level Srxlev and the reception quality Squal of the serving cell which are measured in operation 1g-15 are lower than a threshold value (Srxlev≤$S_{IntraSearchP}$ and Squal≤$S_{IntraSearchQ}$), the UE in the RRC idle mode or the RRC inactive mode may measure neighbor cells using a same frequency as the serving cell (operation 1g-20). That is, a reception quality Squal or a reception level Srxlev of each neighbor cell using the same frequency as the serving cell may be derived based on SIB2 or SIB3 broadcast by the serving cell. In this regard, the reception quality Squal or the reception level Srxlev of each neighbor cell using the same frequency as the serving cell may be calculated by using Equation 3 described above.

A $Q_{rxlevminoffsetcell}$ value and a $Q_{qualminoffsetcell}$ value are included in SIB3 broadcast by the serving cell, and may be commonly applied only to all neighbor cells of the predetermined cell group. Also, to decrease signaling overhead, the $Q_{rxlevminoffsetcell}$ value and the $Q_{qualminoffsetcell}$ value may be signaled by reusing parameter values in SIB2 or SIB3. For example, the $Q_{rxlevminoffsetcell}$ value and the $Q_{qualminoffsetcell}$ value may be signaled by reusing a Qoffset value considered when a cell-ranking criterion $R_n$ is performed.

```
IntraFreqNeighCellInfo ::=    SEQUENCE {
    physCellIdRange                    PCIRange,
    q-OffsetCell                       Q-OffsetRange,
    Qrxlevminoffsetcell                Enumerate (reUseQ-OffsetCell)
    Qqualminoffsetcell                 Enumerate (reuseQ-OffsetCell)
    ...
}
```

For reference, information about threshold values of $S_{IntraSearchP}$ and $S_{IntraSearchQ}$ is included in SIB2.

Also, regardless of a quality of the serving cell, the neighbor cell measurement may be performed on inter-frequency and inter-RAT cells having priorities higher than a frequency of the current serving cell (operation 1g-20). That is, a reception quality Squal or a reception level Srxlev of each of inter-frequency cells having a priority higher than the frequency of the serving cell may be derived based on SIB4 broadcast by the serving cell. A reception quality Squal or a reception level Srxlev of each of inter-RAT cells having a priority higher than the frequency of the serving cell may be derived based on SIB5 broadcast by the serving cell. For reference, information about threshold values of $S_{nonIntraSearchP}$ and $S_{nonIntraSearchQ}$ is included in SIB2. A reception quality Squal or a reception level Srxlev of inter-frequency cells having a priority higher than the serving cell may be derived by using Equation 3. According to Equation 3, the $Q_{rxlevminoffsetcell}$ value and the $Q_{qualminoffsetcell}$ value are included in SIB4 broadcast by the serving cell, and may be commonly applied only to all neighbor cells of the predetermined cell group. Also, to decrease signaling overhead, the $Q_{rxlevminoffsetcell}$ value and the $Q_{qualminoffsetcell}$ value may be signaled by reusing parameter values in SIB2 or SIB4. For example, the $Q_{rxlevminoffsetcell}$ value and the $Q_{qualminoffsetcell}$ value may be signaled by reusing a Qoffset value in SIB4, the Qoffset value being considered when a cell-ranking criterion $R_n$ is performed.

```
InterFreqNeighCellInfo ::=    SEQUENCE {
    physCellIdRange                    PCIRange,
    q-OffsetCell                       Q-OffsetRange,
    Qrxlevminoffsetcell                Enumerate (reUseQ-OffsetCell)
    Qqualminoffsetcell                 Enumerate (reuseQ-OffsetCell)
    ...
}
```

Also, the reception quality Squal or the reception level Srxlev of each of inter-RAT cells having a priority higher than the frequency of the serving cell may be derived based on SIB5 broadcast by the serving cell. In this regard, the reception quality Squal or the reception level Srxlev of each of the inter-RAT cells having a priority higher than the serving cell may be derived by using Equation 3. According to Equation 3, a $Q_{rxlevminoffsetcell}$ value and a $Q_{qualminoffsetcell}$ value are included in SIB5 broadcast by the serving cell, and may be commonly applied only to all neighbor cells of the predetermined cell group. Also, to decrease signaling overhead, the $Q_{rxlevminoffsetcell}$ value and the $Q_{qualminoffsetcell}$ value may be signaled by reusing parameter values in SIB2 or SIB5. For example, the $Q_{rxlevminoffsetcell}$ value and the $Q_{qualminoffsetcell}$ value may be signaled by reusing a Qoffset value in SIB5, the Qoffset value being considered when a cell-ranking criterion $R_n$ is performed.

```
EUTRA-FreqNeighCellInfo ::=   SEQUENCE {
    physCellIdRange                    EUTRA-PCIRange,
    q-OffsetCell                       E-UTRA-Q-OffsetRange,
    Qrxlevminoffsetcell                Enumerate (reUseQ-OffsetCell)
    Qqualminoffsetcell                 Enumerate (reuseQ-OffsetCell)
    ...
}
```

Also, for inter-frequency cells having a priority equal to or lower than the frequency of the serving cell or for inter-RAT cells having a priority lower than the frequency of the serving cell, when the reception level Srxlev and the reception quality Squal of the serving cell which are measured in operation 1g-15 are lower than a threshold value (Srxlex≤$S_{nonIntraSearchP}$ and Squal≤$S_{intraSearchQ}$), the UE in the RRC idle mode or the RRC inactive mode may measure neighbor inter-frequency cells (neighbor cells using a frequency different from the serving cell) or neighbor inter-RAT cells (neighbor cells using a RAT different from that of the serving cell) (operation 1g-20). That is, a reception quality Squal or a reception level Srxlev of at least one inter-frequency cell having a priority lower than the frequency of the serving cell may be derived based on SIB4 broadcast by the serving cell, and a reception quality Squal or a reception level Srxlev of at least one inter-RAT cell having a priority lower than the frequency of the serving cell may be derived based on SIB5 broadcast by the serving cell. For reference, information about threshold values of $S_{nonIntraSearchP}$ and $S_{nonIntraSearchQ}$ is included in SIB2. In this regard, a reception quality Squal or a reception level Srxlev of each of inter-frequency cells having a priority lower than the frequency of the serving cell may be derived by using Equation 3. Also, a reception quality Squal or a reception level Srxlev of each of inter-RAT cells having a priority lower than the frequency of the serving cell may be derived based on SIB5 broadcast by the serving cell. In this regard, the reception quality Squal or the reception level Srxlev of each of the inter-RAT cells having a priority higher than the serving cell may be derived by using Equation 3.

The UE in the RRC idle mode or the RRC inactive mode may perform a priority-based cell reselection evaluation process (CellReselectionPriority) based on measurement values of neighbor cells (obtained in operation 1g-20) (operation 1g-25). That is, when a plurality of cells fulfilling cell reselection criteria have different priorities, reselection of frequency/RAT cells having a higher priority precedes reselection of frequency/RAT cells having a lower priority. Priority information is included in the system information (SIB2, SIB4, and SIB5) broadcast by the serving cell or is included in an RRCRelease message received when the UE transitions from an RRC connected mode to the RRC idle mode or the RRC inactive mode. Operations of the UE with respect to a cell reselection evaluation process for inter-frequency/inter-RAT cells having a priority higher than the frequency of the serving cell will now be described below.

First Operation:

In a case where SIB2 including a threshold value of threshServingLowQ is broadcast and one second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during a time interval $Treselection_{RAT}$), the UE may perform reselection with respect to the inter-frequency or inter-RAT cell.

Second Operation:

When the UE cannot perform the first operation, the UE may perform the second operation.

When one second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X, HighP}$ during a time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Thresh_{X, HighQ}$ and $Thresh_{X, HighP}$, and $Treselection_{RAT}$ of the inter-frequency cell, i.e., information included in SIB4 broadcast by the serving cell. Also, the UE may perform the first operation or the second operation, based on values of a reception quality Squal, a reception level Srxlev, threshold values $Thresh_{X, HighQ}$ and $Thresh_{X, HighP}$, and $Treselection_{RAT}$ of the inter-RAT cell, i.e., information included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

Also, operations of the UE with respect to a cell reselection evaluation process for intra-frequency/inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (i.e. The UE shall perform ranking of all cells that fulfils the cell selection criterion S). Rankings of the serving cell and a neighbor cell may be respectively calculated by using Equation 2 described above. In this regard, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB3. When the inter-frequency cell is reselected, Qoffset is signaled according to each cell, is applied only to a designated cell, and is included in SIB4. When a ranking of a neighbor cell which is derived according to Equation 2 is greater than a ranking of the serving cell (i.e., $R_n$>$R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where SIB2 including a threshold value of threshServingLowQ is broadcast and one second has elapsed after the UE camped on the current serving cell, when a reception quality Squal of the current serving cell is less than a threshold value $Thresh_{Serving, LowQ}$ (Squal<$Thresh_{Serving, LowQ}$) and a reception quality Squal of an inter-frequency or inter-RAT cell is higher than a threshold value $Thresh_{X, LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When one second has elapsed after the UE camped on the current serving cell, a reception level Srxlev of the current serving cell is lower than a threshold value $Thresh_{Serving, LowP}$ (Srxlev<$Thresh_{Serving, LowP}$), and a reception level Srxlev of the inter-frequency or inter-RAT cell is higher than a threshold value $Thresh_{X, LowQ}$ during a specific time interval $Treselection_{RAT}$ (Srxlev>$Thresh_{X,LowP}$ during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving,\ LowQ}$ and $Thresh_{Serving,\ LowP}$ included in SIB2 broadcast by the serving cell, and the reception quality Squal, the reception level Srxlev, and the threshold values $Thresh_{X,\ LowQ}$ and $Thresh_{X,\ LowP}$ of the inter-frequency cell which are included in SIB4 broadcast by the serving cell. The fourth operation or the fifth operation by the UE with respect to the inter-RAT cell may be performed based on the threshold values $Thresh_{Serving,\ LowQ}$ and $Thresh_{Serving,\ LowP}$ included in SIB2 broadcast by the serving cell, and the reception quality Squal, the reception level Srxlev, and the threshold values $Thresh_{X,LowQ}$ and $Thresh_{X,\ LowP}$ of the inter-RAT cell which are included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

In operation 1g-30, the UE may stay in the current serving cell due to the $Q_{qualminoffsetcell}$ value or the $Q_{rxlevminoffsetcell}$ value. Also, in operation 1g-30, the UE may receive system information (e.g., MIB, SIB1, SIB2, SIB3, SIB4, or SIB5) broadcast by a target cell reselected based on a priority (operation 1g-25), and may measure a signal of the target cell so as to camp on the target cell. That is, the UE may derive a reception level Srxlev and a reception quality Squal of the target cell, based on SIB1 broadcast by the target cell, and then may determine whether the target cell fulfils a cell selection criterion (S-criterion) (Srxlev>0 AND Squal>0).

In this regard, even when the $Q_{qualmin}$ value or the $Q_{rxlevmin}$ value which is included in SIB1 broadcast by the target cell is greater than the $Q_{qualmin}$ value or the $Q_{rxlevmin}$ value included in each of SIB2 (when the target cell is an intra-frequency cell), SIB4 (when the target cell is an inter-frequency cell), and SIB5 (when the target cell is an inter-RAT cell) which are broadcast by the serving cell that the UE camped on in operation 1g-05, the UE may determine that the cell selection criterion is fulfilled, due to the $Q_{qualminoffsetcell}$ value or the $Q_{rxlevminoffsetcell}$ value, and may camp on a new target cell, such that a ping-pong phenomenon in cell reselection may be prevented.

Figure 1H:
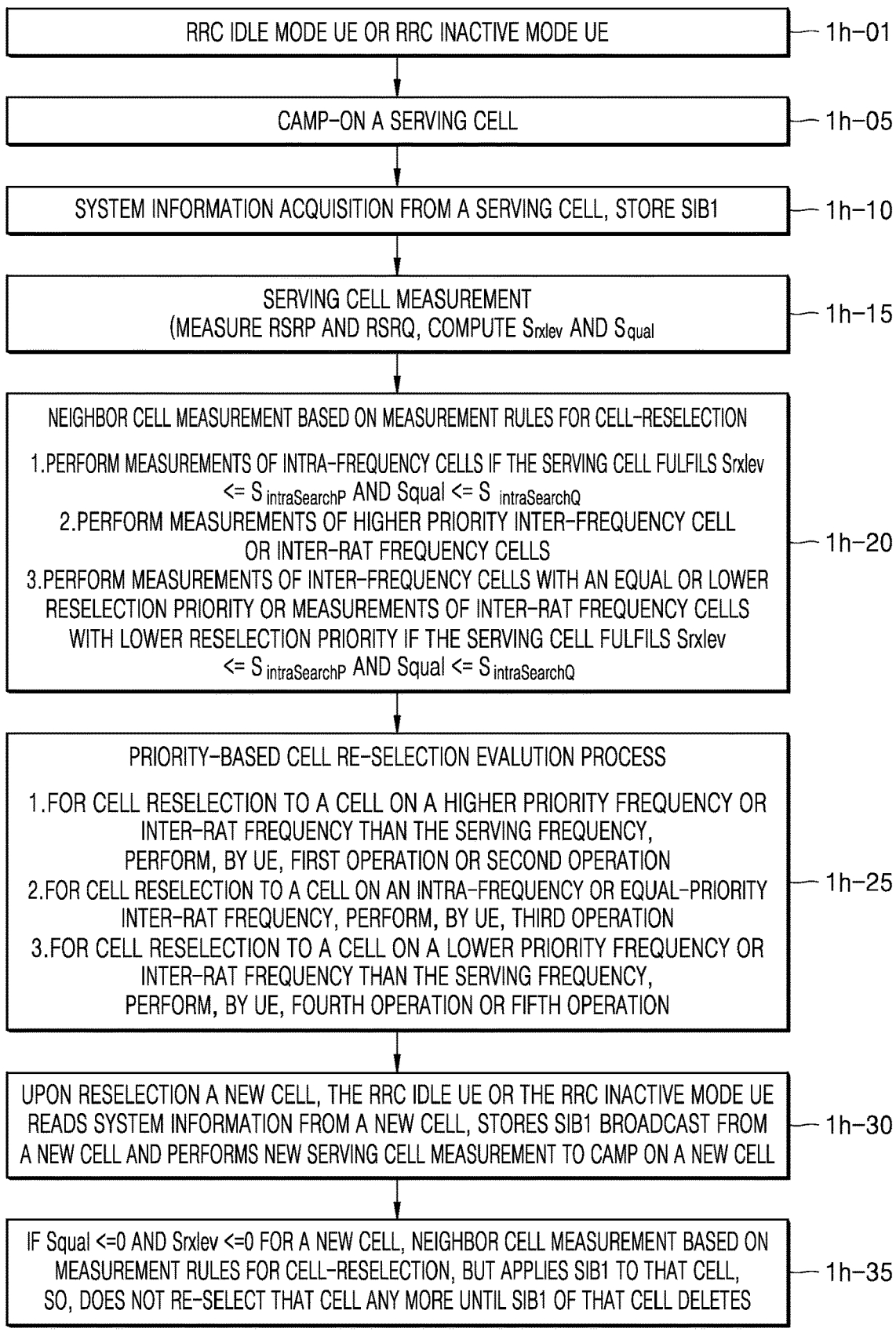
FIG. 1H illustrates a process of preventing a ping-pong phenomenon when the UE is in the RRC idle mode or the RRC inactive mode, according to an embodiment of the disclosure.

FIG. 1H illustrates a process of preventing a ping-pong phenomenon by storing SIB1 broadcast by a serving cell or a target cell, when the UE in the RRC idle mode or the RRC inactive mode reselects a cell, according to an embodiment of the disclosure.

Referring to FIG. 1H, the UE in the RRC idle mode or the RRC inactive mode (operation 1h-01) may perform a series of operations when it camps on a serving cell (operation 1h-05).

In operation 1h-10, the UE in the RRC idle mode or the RRC inactive mode may receive system information broadcast by a base station of the serving cell. In this regard, the UE in the RRC idle mode or the RRC inactive mode may not receive system information broadcast by a base station of the neighbor cell. The system information may be divided into an MIB and SIBs. In addition, the SIBs may be divided into SIB1 and an SI message (e.g., SIB2, SIB3, SIB4, or SIB5) excluding SIB1.

In operation 1h-10, the UE in the RRC idle mode or the RRC inactive mode may store SIB1. The UE in the RRC idle mode or the RRC inactive mode may previously receive and read system information (e.g., MIB, SIB1, or SIB2) broadcast by a base station of a certain serving cell before the UE camps by on the certain serving cell. When the UE previously receives the system information, the UE may store SIB1. For reference, MIB and SIB1 may be system information to be commonly applied to all UEs. SIB2 may be system information to be commonly applied to a process of reselecting, by the UE in the RRC idle mode or the RRC inactive mode, the intra-frequency cell, the inter-frequency cell, or the inter-RAT cell. SIB3 to SIB5 may include information required for the UE in the RRC idle mode or the RRC inactive mode to reselect a cell. SIB1 may include information about parameters such as a minimum required reception level, a minimum required quality level, or a threshold value which is used in determining whether to measure a serving cell signal, and such information may be applied in a cell-specific manner. SIB2, SIB3, SIB4, and SIB5 may include information about parameters such as a minimum required reception level, a minimum required quality level, or a threshold value which is used in determining whether to measure a neighbor cell signal. In detail, SIB2 may include common information for reselecting the intra-frequency cell, the inter-frequency cell, or the inter-RAT cell, SIB3 may include information for reselecting only the intra-frequency cell, SIB4 may include information for reselecting only the inter-frequency cell, and SIB5 may include information for reselecting only the inter-RAT cell.

In operation 1h-15, the UE in the RRC idle mode or the RRC inactive mode may wake up in a DRX period and may measure a RSRP $Q_{rxlevmeas}$ and a RSRQ $Q_{qualmeas}$. The UE may calculate, based on the measurement values, a reception level Srxlev and a reception quality Squal of the serving cell by using the parameters received from SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 1h-20). In this regard, the UE in the RRC idle mode or the RRC inactive mode may not receive the system information broadcast by the base station of the neighbor cell, and may perform the neighbor cell measurement by using the system information broadcast by the serving cell that the UE currently camps on. When the reception level Srxlev and the reception quality Squal of the serving cell which are measured in operation 1h-15 are lower than a threshold value (Srxlev≤$S_{IntraSearchP}$ and Squal≤$S_{IntraSearchQ}$), the UE in the RRC idle mode or the RRC inactive mode may measure neighbor cells using a same frequency as the serving cell (operation 1h-20). That is, a reception quality Squal or a reception level Srxlev of each neighbor cell using the same frequency as the serving cell may be derived based on SIB2 or SIB3 broadcast by the serving cell (according to Equation 1).

For reference, information about threshold values of $S_{IntraSearchP}$ and $S_{IntraSearchQ}$ is included in SIB2. Also, regardless of a quality of the serving cell, the neighbor cell measurement may be performed on inter-frequency and inter-RAT cells having priorities higher than a frequency of the current serving cell (operation 1h-20). That is, a reception quality Squal or a reception level Srxlev of each of inter-frequency cells having a priority higher than the frequency of the serving cell is derived (according to Equation 1) based on SIB4 broadcast by the serving cell, and a reception quality Squal or a reception level Srxlev of each of inter-RAT cells having a priority higher than the frequency of the serving cell is derived (according to Equation 1) based on SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell which are measured in operation 1h-15 are lower than a threshold value (Srxlex≤$S_{nonIntraSearchP}$ and Squal≤$S_{intraSearchQ}$), the UE in the RRC idle mode or the RRC inactive mode may measure neighbor inter-frequency cells (neighbor cells using a frequency different from the serving cell) or neighbor inter-RAT cells (neighbor cells using a RAT different from that of the serving cell) (operation 1h-20). That is, a reception quality Squal or a reception level Srxlev of at least one inter-frequency cell having a priority equal to or lower than the frequency of the serving cell is derived (according to Equation 1) based on SIB4 broadcast by the serving cell, and a reception quality Squal or a reception level Srxlev of at least one inter-RAT cell having a priority lower than the frequency of the serving cell is derived (according to Equation 1) based on SIB5 broadcast by the serving cell. For reference, information about threshold values of $S_{nonIntraSearchP}$ and $S_{nonIntraSearchQ}$ is included in SIB2.

The UE in the RRC idle mode or the RRC inactive mode may perform a priority-based cell reselection evaluation process (CellReselectionPriority) based on measurement values of neighbor cells (obtained in operation 1h-20) (operation 1h-25). That is, when a plurality of cells fulfilling cell reselection criteria have different priorities, reselection of frequency/RAT cells having a higher priority precedes reselection of frequency/RAT cells having a lower priority. Priority information is included in the system information (SIB2, SIB4, and SIB5) broadcast by the serving cell or is included in an RRCRelease message received when the UE transitions from an RRC connected mode to the RRC idle mode or the RRC inactive mode. Operations of the UE with respect to a cell reselection evaluation process for inter-frequency/inter-RAT cells having a priority higher than the frequency of the serving cell will now be described below.

First Operation:

In a case where SIB2 including a threshold value of threshServingLowQ is broadcast and one second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during a time interval $Treselection_{RAT}$), the UE may perform reselection with respect to the inter-frequency or inter-RAT cell.

Second Operation:

When the UE cannot perform the first operation, the UE may perform the second operation.

When one second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X,HighP}$ during a time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Thresh_{X,HighQ}$ and $Thresh_{X,HighP}$, and $Treselection_{RAT}$ of the inter-frequency cell, i.e., information included in SIB4 broadcast by the serving cell. Also, the UE may perform the first operation or the second operation, based on values of a reception quality Squal, a reception level Srxlev, threshold values $Thresh_{X,HighQ}$ and $Thresh_{X,HighP}$, and $Treselection_{RAT}$ of the inter-RAT cell, i.e., information included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

Also, operations of the UE with respect to a cell reselection evaluation process for intra-frequency/inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (i.e. The UE shall perform ranking of all cells that fulfils the cell selection criterion S). Rankings of the serving cell and a neighbor cell may be respectively calculated by using Equation 2 described above.

In Equation 2 described above, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB3. When the inter-frequency cell is reselected, Qoffset is signaled according to each cell, is applied only to a designated cell, and is included in SIB4. When a ranking of a neighbor cell which is derived according to Equation 2 is greater than a ranking of the serving cell (i.e., $R_n$>$R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where SIB2 including a threshold value of threshServingLowQ is broadcast and one second has elapsed after the UE camped on the current serving cell, when a reception quality Squal of the current serving cell is less than a threshold value $Thresh_{Serving,LowQ}$ (Squal<$Thresh_{Serving,LowQ}$) and a reception quality Squal of an inter-frequency or inter-RAT cell is higher than a threshold value $Thresh_{X,LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When one second has elapsed after the UE camped on the current serving cell, a reception level Srxlev of the current serving cell is lower than a threshold value $Thresh_{Serving,LowP}$ (Srxlev<$Thresh_{Serving,LowP}$), and a reception level Srxlev of the inter-frequency or inter-RAT cell is higher than a threshold value $Thresh_{X,LowQ}$ during a specific time interval $Treselection_{RAT}$ (Srxlev>$Thresh_{X,LowP}$ during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving,LowQ}$ and $Thresh_{Serving,LowP}$ included in SIB2 broadcast by the serving cell, and the reception quality Squal, the reception level Srxlev, and the threshold values $\text{Thresh}_{X,\ LowQ}$ and $\text{Thresh}_{X,\ LowP}$ of the inter-frequency cell which are included in SIB4 broadcast by the serving cell. The fourth operation or the fifth operation by the UE with respect to the inter-RAT cell may be performed based on the threshold values $\text{Thresh}_{Serving,\ LowQ}$ and $\text{Thresh}_{Serving,\ LowP}$ included in SIB2 broadcast by the serving cell, and the reception quality Squal, the reception level Srxlev, and the threshold values $\text{Thresh}_{X,LowQ}$ and $\text{Thresh}_{X,\ LowP}$ of the inter-RAT cell which are included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

In operation 1h-30, the UE may receive system information (e.g., MIB, SIB1, SIB2, SIB3, SIB4, or SIB5) broadcast by a target cell reselected based on a priority in operation 1h-25, may store SIB1, and may measure a signal of the target cell so as to camp on the target cell. That is, the UE may derive a reception level Srxlev and a reception quality Squal of the target cell, based on SIB1 broadcast by the target cell, and then may determine whether the target cell fulfils a cell selection criterion (S-criterion) (Srxlev>0 AND Squal>0).

In this regard, when the $Q_{qualmin}$ value or the $Q_{rxlevmin}$ value which is included in SIB1 broadcast by the target cell is greater than the $Q_{qualmin}$ value or the $Q_{rxlevmin}$ value included in each of SIB2 (when the target cell is an intra-frequency cell), SIB4 (when the target cell is an inter-frequency cell), and SIB 5 (when the target cell is an inter-RAT cell) which are broadcast by the serving cell that the UE camped on in operation 1h-05, the UE may determine that the cell selection criterion is not fulfilled. In operation 1h-35, when a reselected cell does not fulfill an S-criterion, the UE may perform neighbor cell measurement again based on the system information so as to reselect a new cell. The neighbor cell measurement may be performed in a same manner as operation 1h-20, and for the reselected cell that does not fulfill the S-criterion, a cell measurement operation may be performed by using information of SIB1.

Afterward, the UE may perform operation 1h-25 again and then may reselect and camp on the cell that the UE camped on in operation 1h-05 or may reselect a cell that was not previously camped on. Because the UE stores SIB1 of each of the previously camped on cell and the cell reselected in operation 1h-30, when the UE performs operation 1h-30, the UE may previously determine that the S-criterion is not fulfilled, and thus a ping-pong phenomenon may occur in a cell reselection process.

FIG. 1I illustrates a process of preventing a ping-pong phenomenon by using SIB1 broadcast by a cell before the UE in the RRC idle mode or the RRC inactive mode reselects the cell that fulfilled a cell reselection evaluation process, according to an embodiment of the disclosure.

Referring to FIG. 1I, the UE in the RRC idle mode or the RRC inactive mode (operation 1i-01) may perform a series of operations when it camps on a serving cell (operation 1i-05).

In operation 1i-10, the UE in the RRC idle mode or the RRC inactive mode may receive system information broadcast by a base station of the serving cell. In this regard, the UE in the RRC idle mode or the RRC inactive mode may not receive system information broadcast by a base station of the neighbor cell. The system information may be divided into an MIB and SIBs. In addition, the SIBs may be divided into SIB1 and an SI message (e.g., SIB2, SIB3, SIB4, or SIB5) excluding SIB1. In operation 1i-10, the UE in the RRC idle mode or the RRC inactive mode may store SIB1. The UE in the RRC idle mode or the RRC inactive mode may previously receive and read system information (e.g., MIB, SIB1, or SIB2) broadcast by a base station of a certain serving cell before the UE camps on the certain serving cell. When the UE previously receives the system information, the UE may store SIB1. For reference, MIB and SIB1 may be system information to be commonly applied to all UEs. SIB2 may be system information to be commonly applied to a process of reselecting, by the UE in the RRC idle mode or the RRC inactive mode, the intra-frequency cell, the inter-frequency cell, or the inter-RAT cell. SIB3 to SIB5 may include information required for the UE in the RRC idle mode or the RRC inactive mode to reselect a cell.

SIB1 may include information about parameters such as a minimum required reception level, a minimum required quality level, or a threshold value which is used in determining whether to measure a serving cell signal, and such information may be applied in a cell-specific manner. SIB2, SIB3, SIB4, and SIB5 may include information about parameters such as a minimum required reception level, a minimum required quality level, or a threshold value which is used in determining whether to measure a neighbor cell signal. In detail, SIB2 may include common information for reselecting the intra-frequency cell, the inter-frequency cell, or the inter-RAT cell, SIB3 may include information for reselecting only the intra-frequency cell, SIB4 may include information for reselecting only the inter-frequency cell, and SIB5 may include information for reselecting only the inter-RAT cell.

In operation 1i-15, the UE in the RRC idle mode or the RRC inactive mode may wake up in a DRX period and may measure a RSRP $Q_{rxlevmeas}$ and a RSRQ $Q_{qualmeas}$. The UE may calculate, based on the measurement values, a reception level Srxlev and a reception quality Squal of the serving cell by using the parameters received from SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 1i-20). In this regard, the UE in the RRC idle mode or the RRC inactive mode may not receive the system information broadcast by the base station of the neighbor cell, and may perform the neighbor cell measurement by using the system information broadcast by the serving cell that the UE currently camps on. When the reception level Srxlev and the reception quality Squal of the serving cell which are measured in operation 1i-15 are lower than a threshold value (Srxlev≤$S_{IntraSearchP}$ and Squal≤$S_{IntraSearchQ}$), the UE in the RRC idle mode or the RRC inactive mode may measure neighbor cells using a same frequency as the serving cell (operation 1i-20). That is, a reception quality Squal or a reception level Srxlev of each neighbor cell using the same frequency as the serving cell may be derived based on SIB2 or SIB3 broadcast by the serving cell (according to Equation 1).

For reference, information about threshold values of $S_{IntraSearchP}$ and $S_{IntrasearchQ}$ is included in SIB2. Also, regardless of a quality of the serving cell, the neighbor cell measurement may be performed on inter-frequency and inter-RAT cells having priorities higher than a frequency of the current serving cell (operation 1$i$-20). That is, a reception quality Squal or a reception level Srxlev of each of inter-frequency cells having a priority higher than the frequency of the serving cell is derived (according to Equation 1) based on SIB4 broadcast by the serving cell, and a reception quality Squal or a reception level Srxlev of each of inter-RAT cells having a priority higher than the frequency of the serving cell is derived (according to Equation 1) based on SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell which are measured in operation 1$i$-15 are lower than a threshold value (Srxlex≤$S_{nonIntraSearchP}$ and Squal≤$S_{intraSearchQ}$), the UE in the RRC idle mode or the RRC inactive mode may measure neighbor inter-frequency cells (neighbor cells using a frequency different from the serving cell) or inter-RAT cells (neighbor cells using a RAT different from that of the serving cell) (operation 1$i$-20). That is, a reception quality Squal or a reception level Srxlev of at least one inter-frequency cell having a priority equal to or lower than the frequency of the serving cell is derived (according to Equation 1) based on SIB4 broadcast by the serving cell, and a reception quality Squal or a reception level Srxlev of at least one inter-RAT cell having a priority lower than the frequency of the serving cell is derived (according to Equation 1) based on SIB5 broadcast by the serving cell. For reference, information about threshold values of $S_{nonIntraSearchP}$ and $S_{nonIntraSearchQ}$ is included in SIB2.

The UE in the RRC idle mode or the RRC inactive mode may perform a priority-based cell reselection evaluation process (CellReselectionPriority) based on measurement values of neighbor cells (obtained in operation 1$i$-20) (operation 1$i$-25). That is, when a plurality of cells fulfilling cell reselection criteria have different priorities, reselection of frequency/RAT cells having a higher priority precedes reselection of frequency/RAT cells having a lower priority. Priority information is included in the system information (SIB2, SIB4, and SIB5) broadcast by the serving cell or is included in an RRCRelease message received when the UE transitions from an RRC connected mode to the RRC idle mode or the RRC inactive mode. Operations of the UE with respect to a cell reselection evaluation process for inter-frequency/inter-RAT cells having a priority higher than the frequency of the serving cell will now be described below.

First Operation:

In a case where SIB2 including a threshold value of threshServingLowQ is broadcast and one second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during a time interval $Treselection_{RAT}$), the UE may perform reselection with respect to the inter-frequency or inter-RAT cell.

Second Operation:

When the UE cannot perform the first operation, the UE may perform the second operation.

When one second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X,HighP}$ during a time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Thresh_{X,HighQ}$ and $Thresh_{X,HighP}$, and $Treselection_{RAT}$ of the inter-frequency cell, i.e., information included in SIB4 broadcast by the serving cell. Also, the UE may perform the first operation or the second operation, based on values of a reception quality Squal, a reception level Srxlev, threshold values $Thresh_{X,HighQ}$ and $Thresh_{X,HighP}$, and $Treselection_{RAT}$ of the inter-RAT cell, i.e., information included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

Also, operations of the UE with respect to a cell reselection evaluation process for intra-frequency/inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (i.e. The UE shall perform ranking of all cells that fulfils the cell selection criterion S). Rankings of the serving cell and a neighbor cell may be respectively calculated by using Equation 2 described above.

In Equation 2 described above, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB3. When the inter-frequency cell is reselected, Qoffset is signaled according to each cell, is applied only to a designated cell, and is included in SIB4. When a ranking of a neighbor cell which is derived according to Equation 2 is greater than a ranking of the serving cell (i.e., $R_n > R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where SIB2 including a threshold value of threshServingLowQ is broadcast and one second has elapsed after the UE camped on the current serving cell, when a reception quality Squal of the current serving cell is less than a threshold value $Thresh_{Serving,LowQ}$ (Squal<$Thresh_{Serving,LowQ}$) and a reception quality Squal of an inter-frequency or inter-RAT cell is higher than a threshold value $Thresh_{X,LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When one second has elapsed after the UE camped on the current serving cell, a reception level Srxlev of the current serving cell is lower than a threshold value $Thresh_{Serving,LowP}$ (Srxlev<$Thresh_{Serving,LowP}$), and a reception level Srxlev of the inter-frequency or inter-RAT cell is higher than a threshold value Thresh$_{X, LowQ}$ during a specific time interval Treselection$_{RAT}$ (Srxlev>Thresh$_{X,LowP}$ during a time interval Treselection$_{RAT}$), the UE may perform reselection with respect to the inter-frequency or inter-RAT cell.

In this regard, the fourth operation or the fifth operation by the UE with respect to the inter-frequency cell may be performed based on the threshold values Thresh$_{Serving, LowQ}$ and Thresh$_{Serving, LowP}$ included in SIB2 broadcast by the serving cell, and the reception quality Squal, the reception level Srxlev, and the threshold values Thresh$_{X, LowQ}$ and Thresh$_{X, LowP}$ of the inter-frequency cell which are included in SIB4 broadcast by the serving cell. The fourth operation or the fifth operation by the UE with respect to the inter-RAT cell may be performed based on the threshold values Thresh$_{Serving, LowQ}$ and Thresh$_{Serving, LowP}$ included in SIB2 broadcast by the serving cell, and the reception quality Squal, the reception level Srxlev, and the threshold values Thresh$_{X,LowQ}$ and Thresh$_{X, LowP}$ of the inter-RAT cell which are included in SIB5 broadcast by the serving cell. For example, SIB4 includes a Q$_{qualmin}$ value or a Q$_{rxlevmin}$ value, and the reception quality Squal or the reception level Srxlev of the inter-frequency cell may be derived based on the values.

In operation 1*i*-30, before the UE finally reselects a candidate target cell based on a priority in operation 1*i*-25, the UE may receive system information (e.g., MIB or SIB1) broadcast by the candidate target cell, and may measure a signal of the candidate target cell so as to camp on the candidate target cell.

That is, the UE may derive a reception level Srxlev and a reception quality Squal of the candidate target cell, based on SIB1 broadcast by the candidate target cell, and may determine whether the candidate target cell fulfills a cell selection criterion (S-criterion) (Srxlev>0 AND Squal>0).

When a cell reselected in operation 1*i*-30 does not fulfill the S-criterion, and the serving cell that the UE camped on in operation 1*i*-05 fulfills the S-criterion, the UE constantly camps on the serving cell, or to reselect another candidate target cell, the UE may receive system information (e.g., MIB or SIB1) broadcast by the other candidate target cell, may measure a signal of the other candidate target cell so as to camp on the other candidate target cell, may derive a reception level Srxlev and a reception quality Squal of the other candidate target cell, based on SIB1, and then may determine whether the other candidate target cell fulfills the S-criterion (Srxlev>0 AND Squal>0). Therefore, in the cell reselection process, the ping-pong phenomenon may be prevented.

Figure 1J:
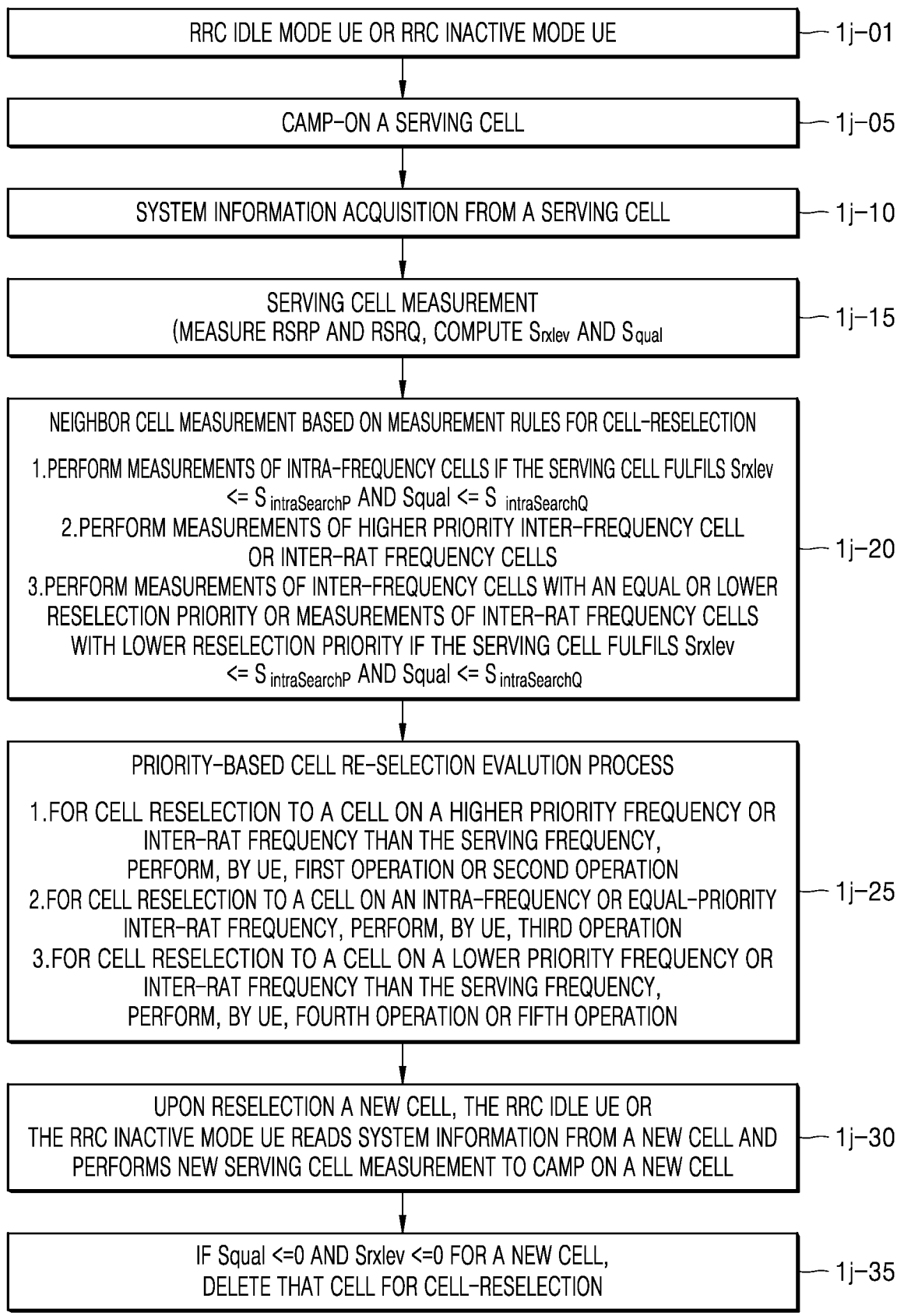
FIG. 1J illustrates a process of preventing a ping-pong phenomenon when the UE is in the RRC idle mode or the RRC inactive mode, according to an embodiment of the disclosure.

FIG. 1J illustrates a process of preventing a ping-pong phenomenon by excluding, in a next cell reselection process, a cell that does not fulfill a S-criterion when the UE in the RRC idle mode or the RRC inactive mode reselects a cell, according to an embodiment of the disclosure.

Referring to FIG. 1J, the UE in the RRC idle mode or the RRC inactive mode (operation 1*j*-01) may perform a series of operations when it camps on a serving cell (operation 1*j*-05).

In operation 1*j*-10, the UE in the RRC idle mode or the RRC inactive mode may receive system information broadcast by a base station of the serving cell. In this regard, the UE in the RRC idle mode or the RRC inactive mode may not receive system information broadcast by a base station of the neighbor cell. The system information may be divided into an MIB and SIBs. In addition, the SIBs may be divided into SIB1 and an SI message (e.g., SIB2, SIB3, SIB4, or SIB5) excluding SIB1. In operation 1*j*-10, the UE in the RRC idle mode or the RRC inactive mode may store SIB1. The UE in the RRC idle mode or the RRC inactive mode may previously receive and read system information (e.g., MIB, SIB1, or SIB2) broadcast by a base station of a certain serving cell before the UE camps on the certain serving cell. When the UE previously receives the system information, the UE may store SIB1. SIB2 may be system information to be commonly applied to a process of reselecting, by the UE in the RRC idle mode or the RRC inactive mode, the intra-frequency cell, the inter-frequency cell, or the inter-RAT cell. SIB3 to SIB5 may include information required for the UE in the RRC idle mode or the RRC inactive mode to reselect a cell.

SIB1 may include information about parameters such as a minimum required reception level, a minimum required quality level, or a threshold value which is used in determining whether to measure a serving cell signal, and such information may be applied in a cell-specific manner. SIB2, SIB3, SIB4, and SIB5 may include information about parameters such as a minimum required reception level, a minimum required quality level, or a threshold value which is used in determining whether to measure a neighbor cell signal. In detail, SIB2 may include common information for reselecting the intra-frequency cell, the inter-frequency cell, or the inter-RAT cell, SIB3 may include information for reselecting only the intra-frequency cell, SIB4 may include information for reselecting only the inter-frequency cell, and SIB5 may include information for reselecting only the inter-RAT cell.

In operation 1*j*-15, the UE in the RRC idle mode or the RRC inactive mode may wake up in a DRX period and may measure a RSRP Q$_{rxlevmeas}$ and a RSRQ Q$_{qualmeas}$. The UE may calculate, based on the measurement values, a reception level Srxlev and a reception quality Squal of the serving cell by using the parameters received from SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 1*j*-20). In this regard, the UE in the RRC idle mode or the RRC inactive mode may not receive the system information broadcast by the base station of the neighbor cell, and may perform the neighbor cell measurement by using the system information broadcast by the serving cell that the UE currently camps on. When the reception level Srxlev and the reception quality Squal of the serving cell which are measured in operation 1*j*-15 are lower than a threshold value (Srxlev≤S$_{IntraSearchP}$ and Squal≤S$_{IntraSearchQ}$), the UE in the RRC idle mode or the RRC inactive mode may measure neighbor cells using a same frequency as the serving cell (operation 1*j*-20). That is, a reception quality Squal or a reception level Srxlev of each neighbor cell using the same frequency as the serving cell may be derived based on SIB2 or SIB3 broadcast by the serving cell (according to Equation 1).

For reference, information about threshold values of S$_{IntraSearchP}$ and S$_{IntrasearchQ}$ is included in SIB2. Also, regardless of a quality of the serving cell, the neighbor cell measurement may be performed on inter-frequency and inter-RAT cells having priorities higher than a frequency of the current serving cell (operation 1*j*-20). That is, a reception quality Squal or a reception level Srxlev of each of inter-frequency cells having a priority higher than the frequency of the serving cell is derived (according to Equation 1) based on SIB4 broadcast by the serving cell, and a reception quality Squal or a reception level Srxlev of each of inter-RAT cells having a priority higher than the frequency of the serving cell is derived (according to Equation 1) based on SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell which are measured in operation 1*j*-15 are lower than a threshold value (Srxlex≤$S_{nonIntraSearchP}$ and Squal≤$S_{intraSearchQ}$), the UE in the RRC idle mode or the RRC inactive mode may measure neighbor inter-frequency cells (neighbor cells using a frequency different from the serving cell) or neighbor inter-RAT cells (neighbor cells using a RAT different from that of the serving cell) (operation 1*j*-20). That is, a reception quality Squal or a reception level Srxlev of at least one inter-frequency cell having a priority equal to or lower than the frequency of the serving cell is derived (according to Equation 1) based on SIB4 broadcast by the serving cell, and a reception quality Squal or a reception level Srxlev of at least one inter-RAT cell having a priority lower than the frequency of the serving cell is derived (according to Equation 1) based on SIB5 broadcast by the serving cell. For reference, information about threshold values of $S_{nonIntraSearchP}$ and $S_{nonIntraSearchQ}$ is included in SIB2.

The UE in the RRC idle mode or the RRC inactive mode may perform a priority-based cell reselection evaluation process (CellReselectionPriority) based on measurement values of neighbor cells (obtained in operation 1*j*-20) (operation 1*j*-25). That is, when a plurality of cells fulfilling cell reselection criteria have different priorities, reselection of frequency/RAT cells having a higher priority precedes reselection of frequency/RAT cells having a lower priority. Priority information is included in the system information (SIB2, SIB4, and SIB5) broadcast by the serving cell or is included in an RRCRelease message received when the UE transitions from an RRC connected mode to the RRC idle mode or the RRC inactive mode. Operations of the UE with respect to a cell reselection evaluation process for inter-frequency/inter-RAT cells having a priority higher than the frequency of the serving cell will now be described below.

First Operation:

In a case where SIB2 including a threshold value of threshServingLowQ is broadcast and one second has elapsed after the UE camped on the current serving cell, when a reception quality Squal of an inter-frequency or inter-RAT cell is higher than a threshold value $Thresh_{X,HighQ}$ during a specific time interval $Treselection_{RAT}$ (Squal>$Thresh_{X,HighQ}$ during a time interval $Treselection_{RAT}$), the UE may perform reselection with respect to the inter-frequency or inter-RAT cell.

Second Operation:

When the UE cannot perform the first operation, the UE may perform the second operation.

When one second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X,\ HighP}$ during a time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Thresh_{X,\ HighQ}$ and $Thresh_{X,\ HighP}$, and $Treselection_{RAT}$ of the inter-frequency cell, i.e., information included in SIB4 broadcast by the serving cell. Also, the UE may perform the first operation or the second operation, based on values of a reception quality Squal, a reception level Srxlev, threshold values $Thresh_{X,\ HighQ}$ and $Thresh_{X,\ HighP}$, and $Treselection_{RAT}$ of the inter-RAT cell, i.e., information included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

Also, operations of the UE with respect to a cell reselection evaluation process for intra-frequency/inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (i.e. The UE shall perform ranking of all cells that fulfils the cell selection criterion S). Rankings of the serving cell and a neighbor cell may be respectively calculated by using Equation 2 described above.

In Equation 2 described above, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB3. When the inter-frequency cell is reselected, Qoffset is signaled according to each cell, is applied only to a designated cell, and is included in SIB4. When a ranking of a neighbor cell which is derived according to Equation 2 is greater than a ranking of the serving cell (i.e., $R_n$>$R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where SIB2 including a threshold value of threshServingLowQ is broadcast and one second has elapsed after the UE camped on the current serving cell, when a reception quality Squal of the current serving cell is less than a threshold value $Thresh_{Serving,\ LowQ}$ (Squal<$Thresh_{Serving,\ LowQ}$) and a reception quality Squal of an inter-frequency or inter-RAT cell is higher than a threshold value $Thresh_{X,\ LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When one second has elapsed after the UE camped on the current serving cell, a reception level Srxlev of the current serving cell is lower than a threshold value $Thresh_{Serving,\ LowP}$ (Srxlev<$Thresh_{Serving,\ LowP}$), and a reception level Srxlev of the inter-frequency or inter-RAT cell is higher than a threshold value $Thresh_{X,\ LowQ}$ during a specific time interval $Treselection_{RAT}$ (Srxlev>$Thresh_{X,LowP}$ during a time interval Treselection$_{RAT}$), the UE may perform reselection with respect to the inter-frequency or inter-RAT cell.

In this regard, the fourth operation or the fifth operation by the UE with respect to the inter-frequency cell may be performed based on the threshold values Thresh$_{Serving, LowQ}$ and Thresh$_{Serving, LowP}$ included in SIB2 broadcast by the serving cell, and the reception quality Squal, the reception level Srxlev, and the threshold values Thresh$_{X, LowQ}$ and Thresh$_{X, LowP}$ of the inter-frequency cell which are included in SIB4 broadcast by the serving cell. The fourth operation or the fifth operation by the UE with respect to the inter-RAT cell may be performed based on the threshold values Thresh$_{Serving, LowQ}$ and Thresh$_{Serving, LowP}$ included in SIB2 broadcast by the serving cell, and the reception quality Squal, the reception level Srxlev, and the threshold values Thresh$_{X,LowQ}$ and Thresh$_{X, LowP}$ of the inter-RAT cell which are included in SIB5 broadcast by the serving cell. For example, SIB4 includes a Q$_{qualmin}$ value or a Q$_{rxlevmin}$ value, and the reception quality Squal or the reception level Srxlev of the inter-frequency cell may be derived based on the values.

In operation 1j-30, the UE may receive system information (e.g., MIB, SIB1, SIB2, SIB3, SIB4, or SIB5) broadcast by a target cell reselected based on a priority in operation 1j-25, and may measure a signal of the target cell so as to camp on the target cell. That is, the UE may derive a reception level Srxlev and a reception quality Squal of the target cell, based on SIB1 broadcast by the target cell, and then may determine whether the target cell fulfils a cell selection criterion (S-criterion) (Srxlev>0 AND Squal>0).

In this regard, when the Q$_{qualmin}$ value or the Q$_{rxlevmin}$ value which is included in SIB1 broadcast by the target cell is greater than the Q$_{qualmin}$ value or the Q$_{rxlevmin}$ value included in each of SIB2 (when the target cell is an intra-frequency cell), SIB4 (when the target cell is an inter-frequency cell), and SIB5 (when the target cell is an inter-RAT cell) which are broadcast by the serving cell that the UE camped on in operation 1j-05, the UE may determine that the target cell does not fulfill the cell selection criterion. When the target cell does not fulfill the cell selection criterion, the UE may not consider the target cell in the next cell reselection process and may delete the target cell for cell re-selection, in operation 1j-35. Therefore, the ping-pong phenomenon may be prevented in a cell selection process.

Figure 1K:
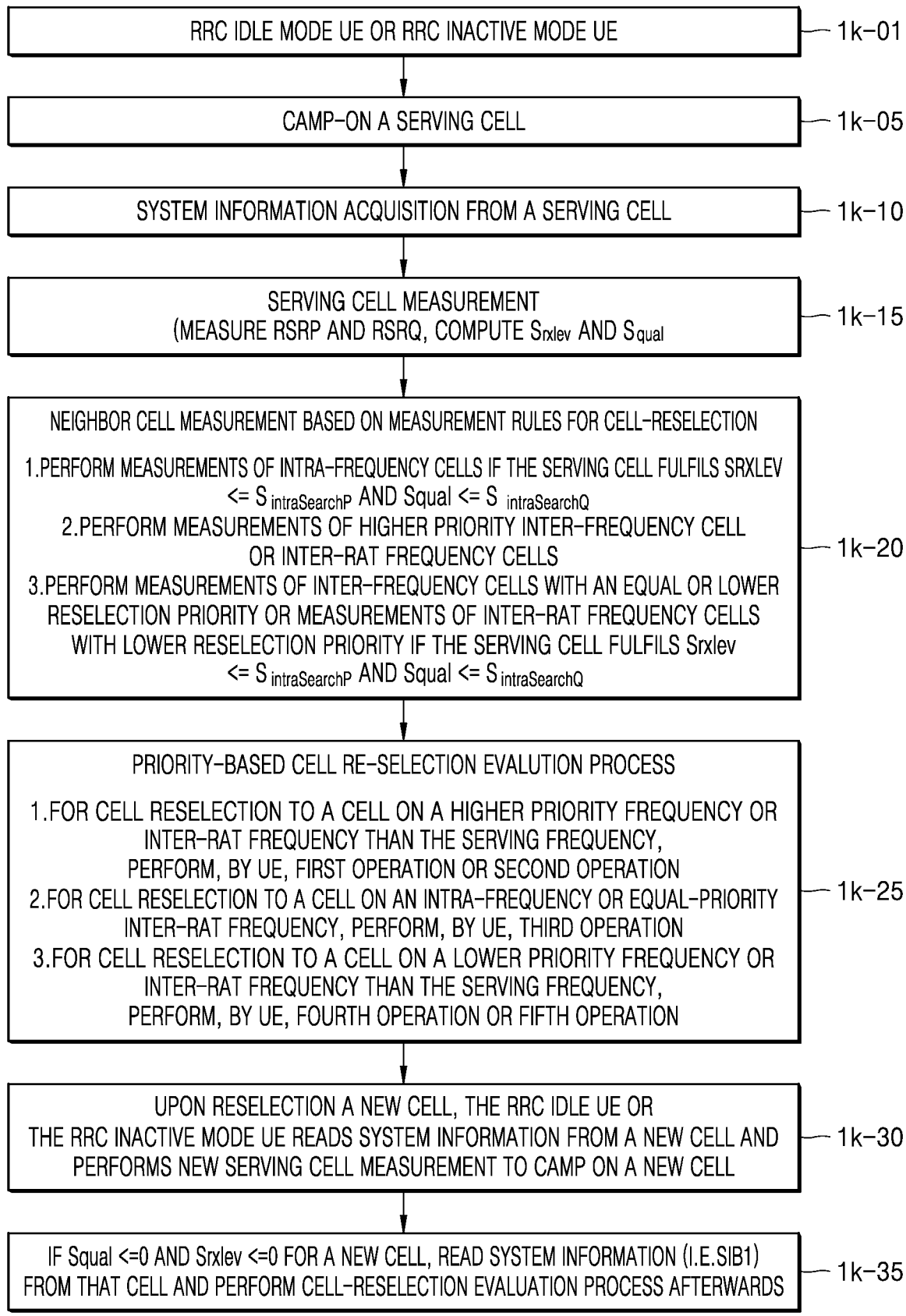
FIG. 1K illustrates a process of preventing a ping-pong phenomenon when the UE is in the RRC idle mode or the RRC inactive mode, according to an embodiment of the disclosure.

FIG. 1K illustrates a process of preventing a ping-pong phenomenon by using system information (e.g., MIB or SIB1) of a neighbor cell in a next cell reselection process, when the UE in the RRC idle mode or the RRC inactive mode reselected the neighbor cell in a cell reselection process and the neighbor cell did not fulfill an S-criterion, according to an embodiment of the disclosure.

Referring to FIG. 1K, the UE in the RRC idle mode or the RRC inactive mode (operation 1k-01) may perform a series of operations when it camps on a serving cell (operation 1k-05).

In operation, 1k-10, the UE in the RRC idle mode or the RRC inactive mode may receive system information broadcast by a base station of the serving cell. In this regard, the UE in the RRC idle mode or the RRC inactive mode may not receive system information broadcast by a base station of the neighbor cell. The system information may be divided into an MIB and SIBs. In addition, the SIBs may be divided into SIB1 and an SI message (e.g., SIB2, SIB3, SIB4, or SIB5) excluding SIB1. In operation 1k-10, the UE in the RRC idle mode or the RRC inactive mode may store SIB1. The UE in the RRC idle mode or the RRC inactive mode may previously receive and read system information (e.g., MIB, SIB1, or SIB2) broadcast by a base station of a certain serving cell before the UE camps on the certain serving cell. When the UE previously receives the system information, the UE may store SIB1. SIB2 may be system information to be commonly applied to a process of reselecting, by the UE in the RRC idle mode or the RRC inactive mode, the intra-frequency cell, the inter-frequency cell, or the inter-RAT cell. SIB3 to SIB5 may include information required for the UE in the RRC idle mode or the RRC inactive mode to reselect a cell.

SIB1 may include information about parameters such as a minimum required reception level, a minimum required quality level, or a threshold value which is used in determining whether to measure a serving cell signal, and such information may be applied in a cell-specific manner. SIB2, SIB3, SIB4, and SIB5 may include information about parameters such as a minimum required reception level, a minimum required quality level, or a threshold value which is used in determining whether to measure a neighbor cell signal. In detail, SIB2 may include common information for reselecting the intra-frequency cell, the inter-frequency cell, or the inter-RAT cell, SIB3 may include information for reselecting only the intra-frequency cell, SIB4 may include information for reselecting only the inter-frequency cell, and SIB5 may include information for reselecting only the inter-RAT cell.

In operation 1k-15, the UE in the RRC idle mode or the RRC inactive mode may wake up in a DRX period and may measure a RSRP Q$_{rxlevmeas}$ and a RSRQ Q$_{qualmeas}$. The UE may calculate, based on the measurement values, a reception level Srxlev and a reception quality Squal of the serving cell by using the parameters received from SIB1. The UE may compare the calculated values with threshold values and then may determine whether to perform neighbor cell measurement for cell reselection. The reception level Srxlev and the reception quality Squal of the serving cell may be determined by using Equation 1 described above.

The UE in the RRC idle mode or the RRC inactive mode may not constantly perform the neighbor cell measurement but may determine whether to perform the neighbor cell measurement based on measurement rules so as to minimize consumption of a battery power (operation 1k-20). In this regard, the UE in the RRC idle mode or the RRC inactive mode may not receive the system information broadcast by the base station of the neighbor cell, and may perform the neighbor cell measurement by using the system information broadcast by the serving cell that the UE currently camps on. When the reception level Srxlev and the reception quality Squal of the serving cell which are measured in operation 1k-15 are lower than a threshold value (Srxlev≤S$_{IntraSearchP}$ and Squal≤S$_{IntraSearchQ}$), the UE in the RRC idle mode or the RRC inactive mode may measure neighbor cells using a same frequency as the serving cell (operation 1k-20). That is, a reception quality Squal or a reception level Srxlev of each neighbor cell using the same frequency as the serving cell may be derived based on SIB2 or SIB3 broadcast by the serving cell (according to Equation 1).

For reference, information about threshold values of S$_{IntraSearchP}$ and S$_{IntraSearchQ}$ is included in SIB2. Also, regardless of a quality of the serving cell, the neighbor cell measurement may be performed on inter-frequency and inter-RAT cells having priorities higher than a frequency of the current serving cell (operation 1k-20). That is, a reception quality Squal or a reception level Srxlev of each of inter-frequency cells having a priority higher than the frequency of the serving cell is derived (according to Equation 1) based on SIB4 broadcast by the serving cell, and a reception quality Squal or a reception level Srxlev of each of inter-RAT cells having a priority higher than the frequency of the serving cell is derived (according to Equation 1) based on SIB5 broadcast by the serving cell. Also, for inter-frequency cells having a priority equal to or lower than the frequency of the serving cell or for inter-RAT cells having a priority lower than the frequency of the serving cell, when the reception level Srxlev and the reception quality Squal of the serving cell which are measured in operation 1k-15 are lower than a threshold value (Srxlex≤$S_{nonIntraSearchP}$ and Squal≤$S_{intraSearchQ}$), the UE in the RRC idle mode or the RRC inactive mode may measure neighbor inter-frequency cells (neighbor cells using a frequency different from the serving cell) or neighbor inter-RAT cells (neighbor cells using a RAT different from that of the serving cell) (operation 1k-20). That is, a reception quality Squal or a reception level Srxlev of at least one inter-frequency cell having a priority equal to or lower than the frequency of the serving cell is derived (according to Equation 1) based on SIB4 broadcast by the serving cell, and a reception quality Squal or a reception level Srxlev of at least one inter-RAT cell having a priority lower than the frequency of the serving cell is derived (according to Equation 1) based on SIB5 broadcast by the serving cell. For reference, information about threshold values of $S_{nonIntraSearchP}$ and $S_{nonIntraSearchQ}$ is included in SIB2.

The UE in the RRC idle mode or the RRC inactive mode may perform a priority-based cell reselection evaluation process (CellReselectionPriority) based on measurement values of neighbor cells (obtained in operation 1k-20) (operation 1k-25). That is, when a plurality of cells fulfilling cell reselection criteria have different priorities, reselection of frequency/RAT cells having a higher priority precedes reselection of frequency/RAT cells having a lower priority. Priority information is included in the system information (SIB2, SIB4, and SIB5) broadcast by the serving cell or is included in an RRCRelease message received when the UE transitions from an RRC connected mode to the RRC idle mode or the RRC inactive mode. Operations of the UE with respect to a cell reselection evaluation process for inter-frequency/inter-RAT cells having a priority higher than the frequency of the serving cell will now be described below.

First Operation:

In a case where SIB2 including a threshold value of threshServingLowQ is broadcast and one second has elapsed after the UE camped on the current serving cell, when a reception quality Squal of an inter-frequency or inter-RAT cell is higher than a threshold value $Thresh_{X, HighQ}$ during a specific time interval $Treselection_{RAT}$ (Squal>$Thresh_{X,HighQ}$ during a time interval $Treselection_{RAT}$), the UE may perform reselection with respect to the inter-frequency or inter-RAT cell.

Second Operation:

When the UE cannot perform the first operation, the UE may perform the second operation.

When one second has elapsed after the UE camped on the current serving cell, and a reception level Srxlev of the inter-frequency or inter-RAT cell is higher than a threshold value $Thresh_{X,HighP}$ during a specific time interval $Treselection_{RAT}$ (Srxlev>$Thresh_{X, HighP}$ during a time interval $Treselection_{RAT}$), the UE may perform reselection with respect to the inter-frequency or inter-RAT cell.

In this regard, the UE may perform the first operation or the second operation, based on values of a reception quality Squal, a reception level Srxlev, threshold values $Thresh_{X, HighQ}$ and $Thresh_{X, HighP}$, and $Treselection_{RAT}$ of the inter-frequency cell, i.e., information included in SIB4 broadcast by the serving cell. Also, the UE may perform the first operation or the second operation, based on values of a reception quality Squal, a reception level Srxlev, threshold values $Thresh_{X, HighQ}$ and $Thresh_{X, HighP}$, and $Treselection_{RAT}$ of the inter-RAT cell, i.e., information included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

Also, operations of the UE with respect to a cell reselection evaluation process for intra-frequency/inter-frequency cells having a priority equal to the frequency of the current serving cell will now be described below.

Third Operation:

When a reception quality Squal and a reception level Srxlev of each of the intra-frequency/inter-frequency cells are greater than 0, the UE may derive rankings of respective cells based on measurement values of RSRPs (i.e. The UE shall perform ranking of all cells that fulfils the cell selection criterion S). Rankings of the serving cell and a neighbor cell may be respectively calculated by using Equation 2 described above.

In Equation 2 described above, $Q_{meas,s}$ indicates an RSRP measurement value of the serving cell, $Q_{meas,n}$ indicates an RSRP measurement value of the neighbor cell, $Q_{hyst}$ indicates a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB5. When the inter-frequency cell is reselected, Qoffset is signaled according to each cell, is applied only to a designated cell, and is included in SIB4. When a ranking of a neighbor cell which is derived according to Equation 2 is greater than a ranking of the serving cell (i.e., $R_n$>$R_s$), the UE may camp on an optimal cell from among neighbor cells.

Also, operations of the UE with respect to a cell reselection evaluation process for inter-frequency/inter-RAT cells having a priority lower than the frequency of the current serving cell will now be described below.

Fourth Operation:

In a case where SIB2 including a threshold value of threshServingLowQ is broadcast and one second has elapsed after the UE camped on the current serving cell, when a reception quality Squal of the current serving cell is less than a threshold value $Thresh_{Serving, LowQ}$ (Squal<$Thresh_{Serving, LowQ}$) and a reception quality Squal of an inter-frequency or inter-RAT cell is higher than a threshold value $Thresh_{X, LowQ}$ during a specific time interval $Treselection_{RAT}$ (Squal>$Thresh_{X,LowQ}$ during a time interval $Treselection_{RAT}$), the UE may perform reselection with respect to the inter-frequency or inter-RAT cell.

Fifth Operation:

When the UE cannot perform the fourth operation, the UE may perform the fifth operation.

When one second has elapsed after the UE camped on the current serving cell, a reception level Srxlev of the current serving cell is lower than a threshold value $Thresh_{Serving, LowP}$ (Srxlev<$Thresh_{Serving, LowP}$), and a reception level Srxlev of the inter-frequency or inter-RAT cell is higher than a threshold value $Thresh_{X, LowQ}$ during a specific time interval $Treselection_{RAT}$ (Srxlev>$Thresh_{X,LowP}$ during a time interval $Treselection_{RAT}$), the UE may perform reselection with respect to the inter-frequency or inter-RAT cell.

In this regard, the fourth operation or the fifth operation by the UE with respect to the inter-frequency cell may be performed based on the threshold values $Thresh_{Serving, LowQ}$ and $Thresh_{Serving, LowP}$ included in SIB2 broadcast by the serving cell, and the reception quality Squal, the reception level Srxlev, and the threshold values $Thresh_{X, LowQ}$ and $Thresh_{X, LowP}$ of the inter-frequency cell which are included in SIB4 broadcast by the serving cell. The fourth operation or the fifth operation by the UE with respect to the inter-RAT cell may be performed based on the threshold values $Thresh_{Serving, LowQ}$ and $Thresh_{Serving, LowP}$ included in SIB2 broadcast by the serving cell, and the reception quality Squal, the reception level Srxlev, and the threshold values $Thresh_{X, LowQ}$ and $Thresh_{X, LowP}$ of the inter-RAT cell which are included in SIB5 broadcast by the serving cell. For example, SIB4 includes a $Q_{qualmin}$ value or a $Q_{rxlevmin}$ value, and the reception quality Squal or the reception level Srxlev of the inter-frequency cell may be derived based on the values.

In operation 1k-30, the UE may receive system information (e.g., MIB, SIB1, SIB2, SIB3, SIB4, or SIB5) broadcast by a target cell reselected based on a priority in operation 1k-25, and may measure a signal of the target cell so as to camp on the target cell. That is, the UE may derive a reception level Srxlev and a reception quality Squal of the target cell, based on SIB1 broadcast by the target cell, and then may determine whether the target cell fulfils a cell selection criterion (S-criterion) (Srxlev>0 AND Squal>0).

In this regard, when the $Q_{qualmin}$ value or the $Q_{rxlevmin}$ value which is included in SIB1 broadcast by the target cell is greater than the $Q_{qualmin}$ value or the $Q_{rxlevmin}$ value included in each of SIB2 (when the target cell is an intra-frequency cell), SIB4 (when the target cell is an inter-frequency cell), and SIB5 (when the target cell is an inter-RAT cell) which are broadcast by the serving cell that the UE camped on in operation 1k-05, the UE may determine that the target cell does not fulfill the cell selection criterion. When the target cell does not fulfill the cell selection criterion, the UE may perform a cell reselection process based on SIB1 broadcast by the target cell in a case of the target cell in the next cell reselection process, in operation 1k-35, and thus may prevent the ping-pong phenomenon.

Figure 1L:
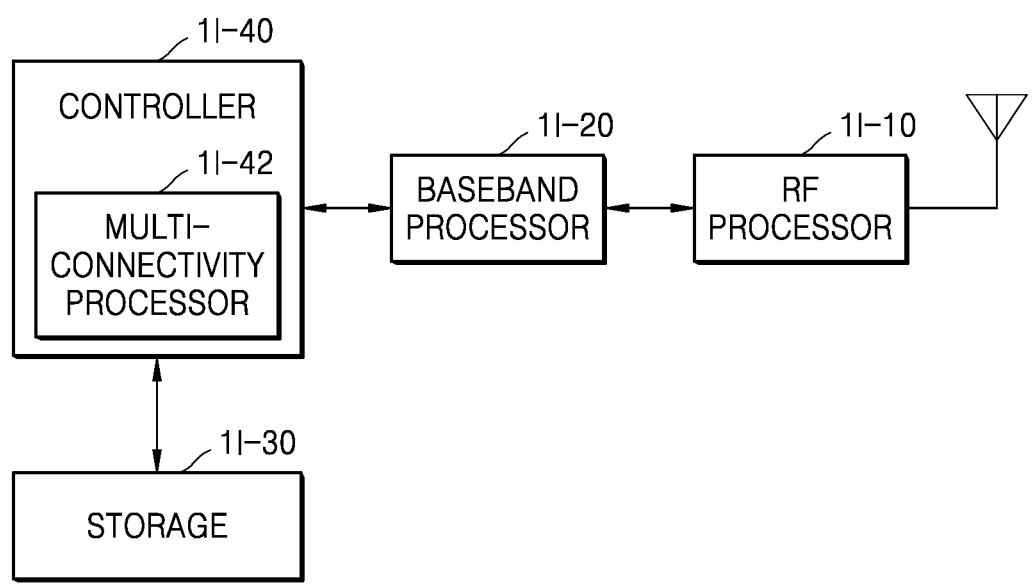
FIG. 1L illustrates a structure of a UE according to an embodiment of the disclosure.

FIG. 1L illustrates a structure of a UE according to an embodiment of the disclosure.

Referring to FIG. 1L, the UE may include a radio frequency (RF) processor 1*l*-10, a baseband processor 1*l*-20, a storage 1*l*-30, and a controller 1*l*-40. The controller 1*l*-40 may include a multi-connectivity processor 1*l*-42.

The RF processor 1*l*-10 according to an embodiment of the disclosure may perform functions for transmitting and receiving signals through radio channels, e.g., band conversion and amplification of signals. That is, the RF processor 1*l*-10 may up-convert a baseband signal provided from the baseband processor 1*l*-20, into a RF band signal and then may transmit the RF band signal through an antenna, and may down-convert an RF band signal received through an antenna, into a baseband signal. For example, the RF processor 1*l*-10 may include a transmitting filter, a receiving filter, an amplifier, a mixer, an oscillator, a digital-to-analog convertor (DAC), an analog-to-digital convertor (ADC), or the like.

Referring to FIG. 1L, only one antenna is illustrated, but the UE may include a plurality of antennas.

The RF processor 1*l*-10 may include a plurality of RF chains. Furthermore, the RF processor 1*l*-10 may perform beamforming. For beamforming, the RF processor 1*l*-10 may adjust phases and sizes of respective signals to be transmitted or having received through a plurality of antennas or antenna elements. Also, the RF processor 1*l*-10 may perform multiple-input and multiple-output (MIMO) and may receive data of a plurality of layers in the MIMO operation. By the control of the controller 1*l*-40, the RF processor 1*l*-10 may perform received beam sweeping by appropriately configuring the plurality of antennas or the antenna elements, or may adjust a direction and a beam width of a received beam to coordinate with a transmit beam.

The baseband processor 1*l*-20 may convert between a baseband signal and a bitstream based on physical layer specifications of a system. For example, for data transmission, the baseband processor 1*l*-20 may generate complex symbols by encoding and modulating a transmit bitstream. For data reception, the baseband processor 1*l*-20 may reconstruct a received bitstream by demodulating and decoding a baseband signal provided from the RF processor 1*l*-10. For example, according to an orthogonal frequency division multiplexing (OFDM) scheme, for data transmission, the baseband processor 1*l*-20 may generate complex symbols by encoding and modulating a transmit bitstream, may map the complex symbols to subcarriers, and then may configure OFDM symbols by performing inverse fast Fourier transform (IFFT) and cyclic prefix (CP) insertion. For data reception, the baseband processor 1*l*-20 may segment a baseband signal provided from the RF processor 1*l*-10, into OFDM symbol units, may reconstruct signals mapped to subcarriers by performing fast Fourier transform (FFT), and then may reconstruct a received bitstream by demodulating and decoding the signals.

The baseband processor 1*l*-20 and the RF processor 1*l*-10 may transmit and receive signals as described above. Accordingly, the baseband processor 1*l*-20 and the RF processor 1*l*-10 may also be called a transmitter, a receiver, a transceiver, or a communicator. In addition, at least one of the baseband processor 1*l*-20 or the RF processor 1*l*-10 may include a plurality of communication modules to support a plurality of different RATs. Also, at least one of the baseband processor 1*l*-20 or the RF processor 1*l*-10 may include different communication modules to process signals of different frequency bands. For example, the different RATs may include an LTE network, an NR network, or the like. The different frequency bands may include a super-high frequency (SHF) (e.g., 2.2 gHz or 2 gHz) band and a millimeter wave (mm Wave) (e.g., 60 GHz) band.

The storage 1*l*-30 may store basic programs, application programs, and data, e.g., configuration information, for operations of the UE. The storage 1*l*-30 may provide the stored data upon request by the controller 1*l*-40.

The controller 1*l*-40 may control overall operations of the UE. For example, the controller 1*l*-40 may transmit and receive signals through the baseband processor 1*l*-20 and the RF processor 1*l*-10. Also, the controller 1*l*-40 writes and reads data to or from the storage 1*l*-30. To do so, the controller 1*l*-40 may include at least one processor. For example, the controller 1*l*-40 may include a communication processor (CP) for controlling communications and an application processor (AP) for controlling an upper layer such as an application program.

Figure 1M:
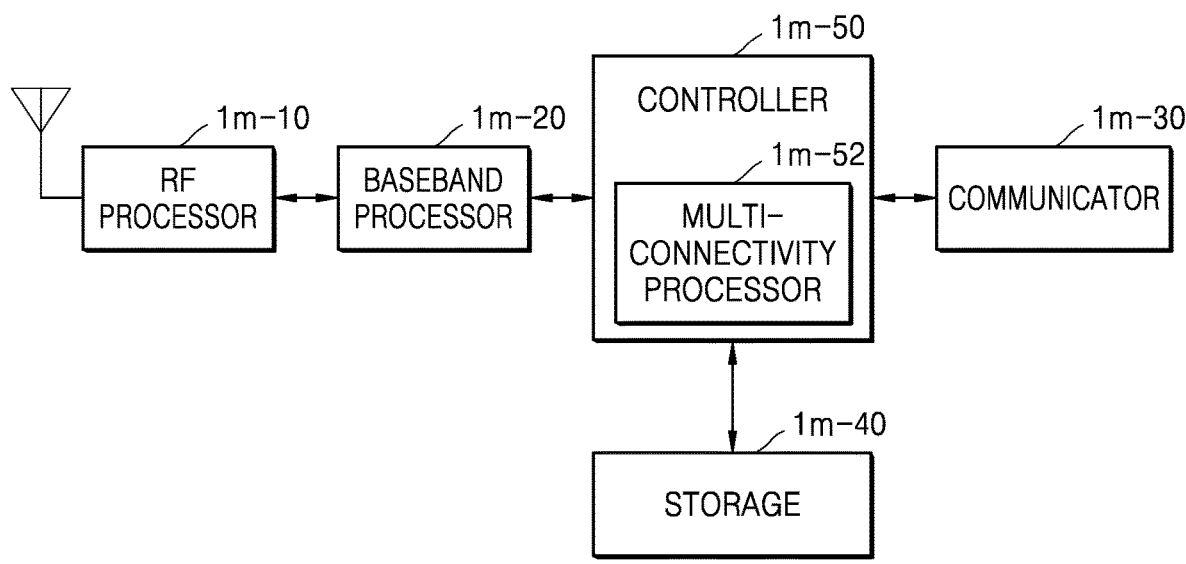
FIG. 1M illustrates a structure of a base station according to an embodiment of the disclosure.

FIG. 1M illustrates a structure of a base station according to an embodiment of the disclosure.

The base station according to an embodiment of the disclosure may include at least one transmission-reception point (TRP).

Referring to FIG. 1M, the base station according to an embodiment of the disclosure may include an RF processor 1*m*-10, a baseband processor 1*m*-20, a communicator 1*m*-30, a storage 1*m*-40, and a controller 1*m*-50. The controller 1*m*-50 may include a multi-connectivity processor 1*m*-52.

The RF processor 1*m*-10 may perform functions for transmitting and receiving signals through radio channels, e.g., band conversion and amplification of signals. That is, the RF processor 1*m*-10 may up-convert a baseband signal provided from the baseband processor 1*m*-20, into a RF band signal and then may transmit the RF band signal through an antenna, and may down-convert an RF band signal received through an antenna, into a baseband signal. For example, the RF processor 1*m*-10 may include a transmitting filter, a receiving filter, an amplifier, a mixer, an oscillator, a DAC, an ADC, or the like.

Referring to FIG. 1M, only one antenna is illustrated, but the base station may include a plurality of antennas.

Also, the RF processor 1*m*-10 may include a plurality of RF chains. Furthermore, the RF processor 1*m*-10 may perform beamforming. For beamforming, the RF processor 1*m*-10 may adjust phases and sizes of respective signals to be transmitted or having received through a plurality of antennas or antenna elements. Also, the RF processor 1*m*-10 may perform a downlink MIMO operation by transmitting data of a plurality of layers.

The baseband processor 1*m*-20 may convert between a baseband signal and a bitstream based on physical layer specifications of a first RAT. For example, for data transmission, the baseband processor 1*m*-20 may generate complex symbols by encoding and modulating a transmit bitstream. For data reception, the baseband processor 1*m*-20 may reconstruct a received bitstream by demodulating and decoding a baseband signal provided from the RF processor 1*m*-10. For example, according to an OFDM scheme, for data transmission, the baseband processor 1*m*-20 may generate complex symbols by encoding and modulating a transmit bitstream, may map the complex symbols to subcarriers, and then may configure OFDM symbols by performing IFFT and CP insertion. For data reception, the baseband processor 1*m*-20 may segment a baseband signal provided from the RF processor 1*m*-10, into OFDM symbol units, may reconstruct signals mapped to subcarriers by performing FFT, and then may reconstruct a received bitstream by demodulating and decoding the signals. The baseband processor 1*m*-20 and the RF processor 1*m*-10 may transmit and receive signals as described above.

Accordingly, the baseband processor 1*m*-20 and the RF processor 1*m*-10 may also be called a transmitter, a receiver, a transceiver, a communicator, or a wireless communicator.

The communicator 1*m*-30 may also be referred to as a backhaul communicator, and may provide an interface for communicating with other nodes in a network.

The storage 1*m*-40 may store basic programs, application programs, and data, e.g., configuration information, for operations of a main base station. In particular, the storage 1*m*-40 may store information about bearers allocated for a connected UE and measurement results reported from the connected UE. Also, the storage 1*m*-40 may store criteria information used to determine whether to provide or release multi-connectivity to or from the UE. The storage 1*m*-40 may provide the stored data upon request by the controller 1*m*-50.

The controller 1*m*-50 may control overall operations of the main base station. For example, the controller 1*m*-50 may transmit and receive signals through the baseband processor 1*m*-20 and the RF processor 1*m*-10, or the communicator 1*m*-30. Also, the controller 1*m*-50 writes and reads data to or from the storage 1*m*-40. To do so, the controller 1*m*-50 may include at least one processor.

Figure 2A:
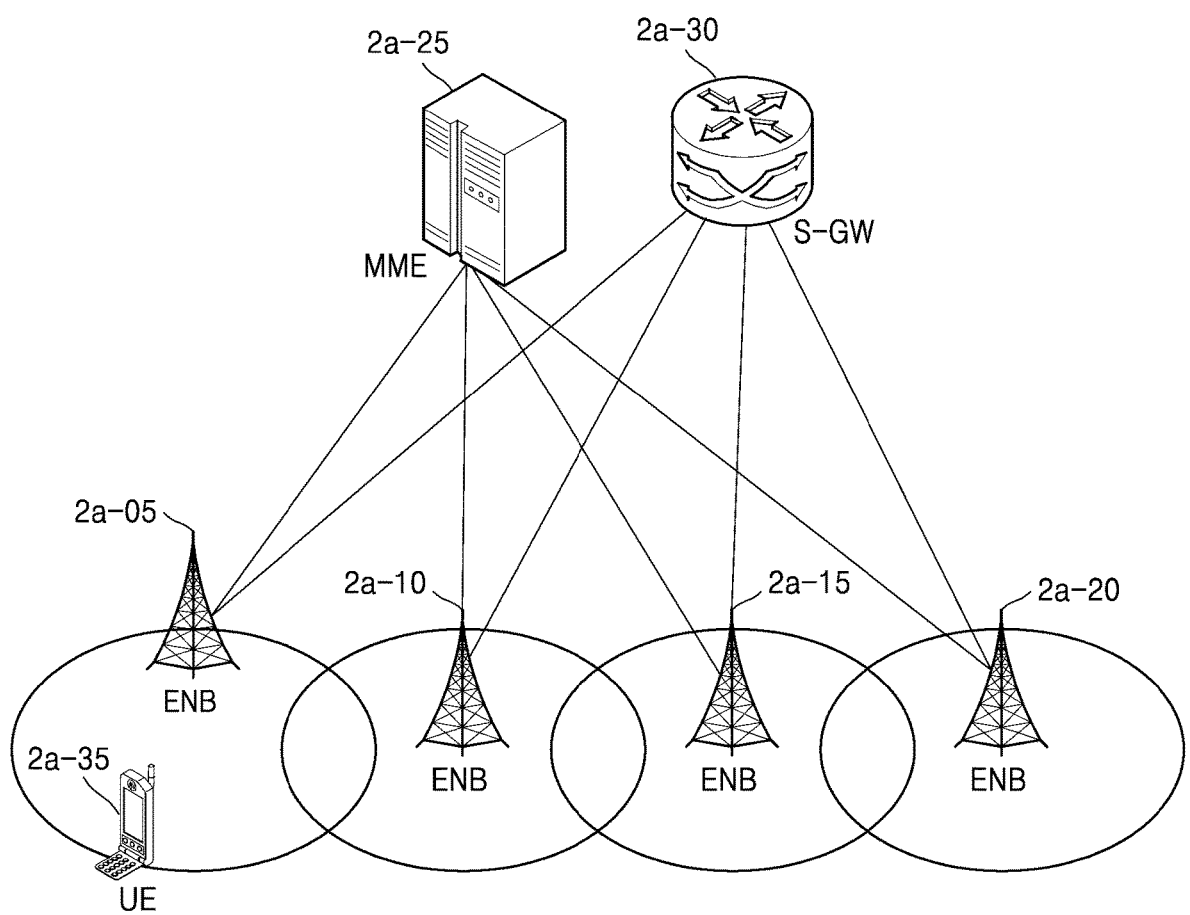
FIG. 2A is a diagram illustrating a configuration of an LTE system according to an embodiment of the disclosure.

FIG. 2A is a diagram illustrating a configuration of an LTE system according to an embodiment of the disclosure.

Referring to FIG. 2A, an RAN of the LTE system as illustrated may include evolved nodes B (eNBs) or nodes B or eNB 2*a*-05, 2*a*-10, 2*a*-15, and 2*a*-20, an MME 2*a*-25, and an S-GW 2*a*-30. A UE (also referred to as a terminal) 2*a*-35 may access an external network via the eNB 2*a*-05, 2*a*-10, 2*a*-15, and 2*a*-20 and the S-GW 2*a*-30.

In FIG. 2A, each of the eNBs 2*a*-05, 2*a*-10, 2*a*-15, and 2*a*-20 may correspond to an existing node B of a UMTS. Each eNB is connected to the UE 2*a*-35 through radio channels and may perform complex functions compared to the existing node B. In the LTE system, all user traffic data including real-time services such as VoIP may be serviced through shared channels. Therefore, an entity for collating, for example, buffer status information of UEs, available transmit power status information, and channel status information and performing scheduling is required, and each of the eNBs 2*a*-05, 2*a*-10, 2*a*-15, and 2*a*-20 may serve as such an entity. One eNB may generally control a plurality of cells. For example, the LTE system may use RAT such as OFDM at a bandwidth of 20 MHz to achieve a data rate of 100 Mbps. In addition, the eNB may use AMC to determine a modulation scheme and a channel coding rate in accordance with a channel status of the UE 2*a*-35. The S-GW 2*a*-30 is an entity for providing data bearers and may establish and release the data bearers by the control of the MME 2*a*-25. The MME 2*a*-25 is an entity for performing a mobility management function and various control functions on the UE 2*a*-35 and may be connected to a plurality of base stations.

Figure 2B:
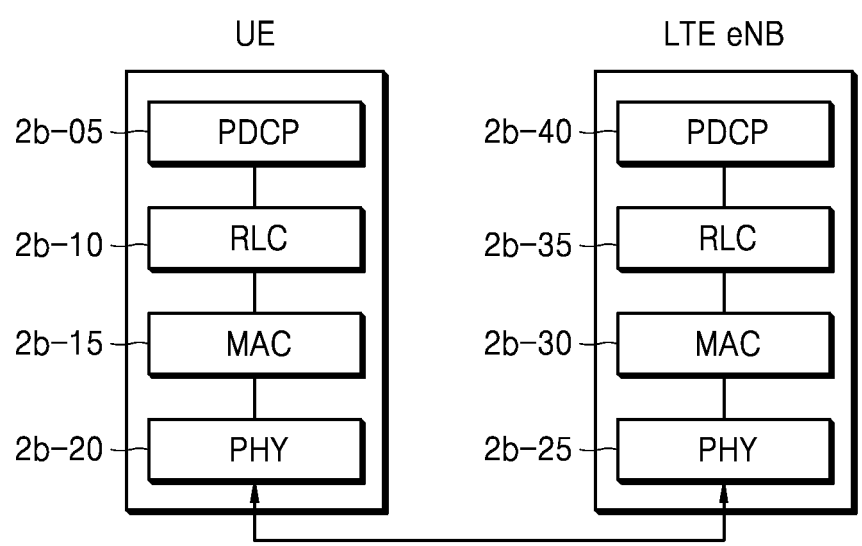
FIG. 2B is a diagram illustrating a radio protocol architecture of an LTE system according to an embodiment of the disclosure.

FIG. 2B is a diagram illustrating a radio protocol architecture of an LTE system according to an embodiment of the disclosure.

Referring to FIG. 2B, the radio protocol architecture of the LTE system may include PDCP layers 2*b*-05 and 2*b*-40, RLC layers 2*b*-10 and 2*b*-35, and MAC layers 2*b*-15 and 2*b*-30 respectively for a UE and an eNB. The PDCP layer 2*b*-05 or 2*b*-40 may perform operations such as IP header compression/decompression. Main functions of the PDCP layer 2*b*-05 or 2*b*-40 may be summarized as shown below:

Header compression and decompression: robust header compression (ROHC) only;

Transfer of user data;

In-sequence delivery of upper layer packet data units (PDUs) at PDCP re-establishment procedure for RLC acknowledged mode (AM);

For split bearers in DC (only support for RLC AM): PDCP PDU routing for transmission and PDCP PDU reordering for reception;

Duplicate detection of lower layer service data units (SDUs) at PDCP re-establishment procedure for RLC AM;

Retransmission of PDCP SDUs at handover and, for split bearers in DC, of PDCP PDUs at PDCP data-recovery procedure, for RLC AM;

Ciphering and deciphering; and

Timer-based SDU discard in uplink.

The RLC layer 2*b*-10 or 2*b*-35 may perform, for example, an ARQ operation by reconfiguring PDCP PDUs to an appropriate size. Main functions of the RLC layer 2*b*-10 or 2*b*-35 may be summarized as shown below:

Transfer of upper layer PDUs;

Error correction through ARQ (only for AM data transfer);

Concatenation, segmentation and reassembly of RLC SDUs (only for unacknowledged mode (UM) and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer); and
RLC re-establishment.

The MAC layer 2b-15 or 2b-30 may be connected to a plurality of RLC layers configured for one UE and may multiplex RLC PDUs into a MAC PDU and may demultiplex the RLC PDUs from the MAC PDU. Main functions of the MAC layer 2b-15 or 2b-30 may be summarized as shown below:
Mapping between logical channels and transport channels;
Multiplexing/demultiplexing of MAC SDUs belonging to one or different logical channels into/from transport blocks (TBs) delivered to/from the physical layer on transport channels;
Scheduling information reporting;
Error correction through hybrid ARQ (HARQ);
Priority handling between logical channels of one UE;
Priority handling between UEs by means of dynamic scheduling;
Multimedia broadcast/multicast service (MBMS) service identification
Transport format selection; and
Padding.

A PHY layer 2b-20 or 2b-25 may channel-code and modulate upper layer data into OFDM symbols and may transmit the OFDM symbols through a radio channel, or may demodulate OFDM symbols received through a radio channel and may channel-decode and may deliver the OFDM symbols to an upper layer.

Figure 2C:
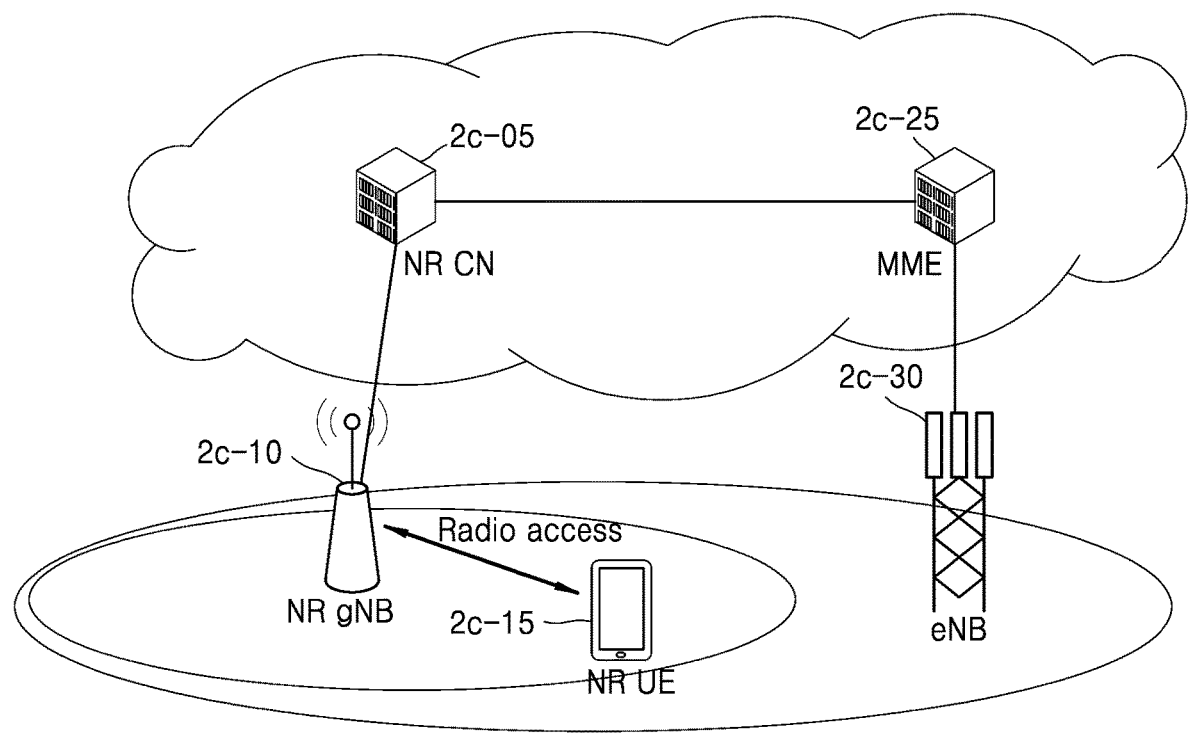
FIG. 2C is a diagram illustrating a configuration of a new mobile communication system according to an embodiment of the disclosure.

FIG. 2C is a diagram illustrating a configuration of a new mobile communication system according to an embodiment of the disclosure.

Referring to FIG. 2C, an RAN of the new mobile communication system (hereinafter, NR or 5G includes a new radio node B (hereinafter, NR gNB or NR base station) 2c-10 and a new radio core network (NR CN) 2c-05. A new radio user equipment (hereinafter, NR UE or terminal) 2c-15 may access an external network via the NR gNB 2c-10 and the NR CN 2c-05.

In FIG. 2C, the NR gNB 2c-10 may correspond to an eNB of an existing LTE system. The NR gNB 2c-10 is connected to the NR UE 2c-15 through radio channels and may provide superior services compared to an existing node B. In the NR or 5G system, all user traffic data may be serviced through shared channels. Therefore, an entity for collating, for example, buffer status information of UEs, available transmit power status information, and channel status information and performing scheduling is required, and the NR gNB 2c-10 may serve as such an entity. One NR gNB may generally control a plurality of cells. The NR or 5G system may have a bandwidth equal to or greater than a current maximum bandwidth of existing LTE so as to achieve an ultrahigh data rate. Also, the NR or 5G system may additionally use a beamforming technology by using OFDM as RAT. Also, the NR or 5G system may use AMC to determine a modulation scheme and a channel coding rate according to a channel state of a terminal. The NR CN 2c-05 may perform functions such as mobility support, bearer configuration, QoS configuration, or the like. The NR CN 2c-05 is an entity for performing a mobility management function and various control functions on the NR UE 2c-15 and may be connected to a plurality of base stations. The NR or 5G system may cooperate with the existing LTE system, and the NR CN 2c-05 may be connected to an MME 2c-25 through a network interface. The MME 2c-25 may be connected to an existing eNB 2c-30.

Figure 2D:
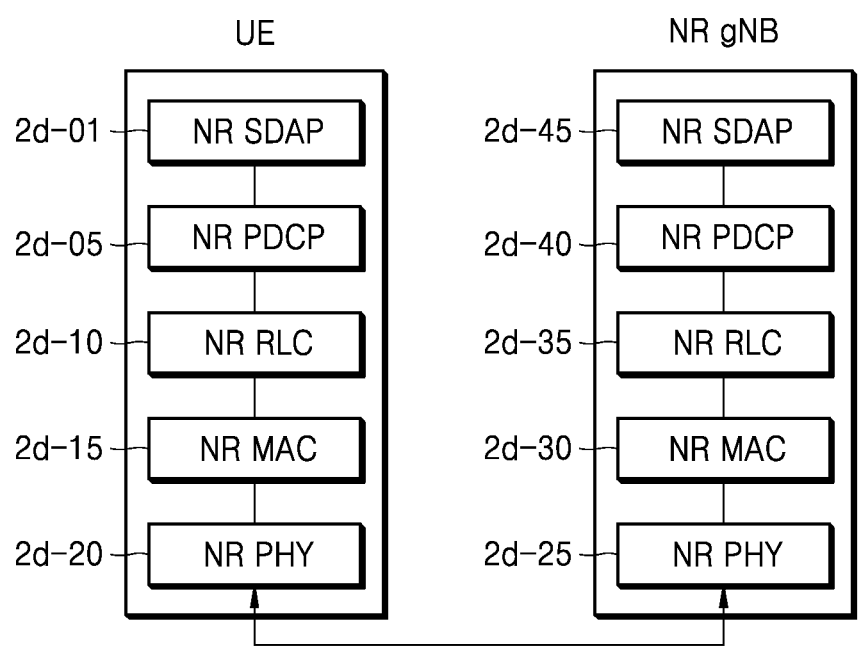
FIG. 2D is a diagram illustrating a radio protocol architecture of an NR or 5G system, according to an embodiment of the disclosure.

FIG. 2D is a diagram illustrating a radio protocol architecture of an NR or 5G system according to an embodiment of the disclosure.

Referring to FIG. 2D, the radio protocol architecture of the NR or 5G system includes NR SDAP layers 2d-01 and 2d-45, NR PDCP layers 2d-05 and 2d-40, NR RLC layers 2d-10 and 2d-35, and NR MAC layers 2d-15 and 2d-30 respectively for a UE and an NR gNB.

Main functions of the NR SDAP layer 2d-01 or 2d-45 may include some of the following functions:
Transfer of user plane data;
Mapping between a QoS flow and a data radio bearer (DRB) for both DL and UL;
Marking QoS flow identifier (ID) in both DL and UL packets; and
Reflective QoS flow to DRB mapping for the UL SDAP PDUs.

With regard to a SDAP layer, information about whether to use a header of the SDAP layer or to use functions of the SDAP layer may be configured for a UE by using an RRC message per PDCP layer, per bearer, or per logical channel. When the SDAP header is configured, the UE may update or reconfigure UL and DL QoS flow and data bearer mapping information by using a 1-bit NAS reflective QoS indicator and a 1-bit AS reflective QoS indicator of the SDAP header. The SDAP header may include QoS flow ID information indicating QoS. QoS information may be used as data processing priority information or scheduling information for appropriately supporting a service.

Main functions of the NR PDCP layer 2d-05 or 2d-40 may include some of the following functions:
Header compression and decompression: ROHC only;
Transfer of user data;
In-sequence delivery of upper layer PDUs;
Out-of-sequence delivery of upper layer PDUs;
PDCP PDU reordering for reception;
Duplicate detection of lower layer SDUs;
Retransmission of PDCP SDUs;
Ciphering and deciphering; and
Timer-based SDU discard in uplink.

In the aforementioned descriptions, the reordering function of the NR PDCP layer 2d-05 or 2d-40 may indicate a function of reordering PDCP PDUs received from a lower layer, on a PDCP SN basis. The reordering function of the NR PDCP layer 2d-05 or 2d-40 may include a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

Main functions of the NR RLC layer 2d-10 or 2d-35 may include some of the following functions:
Transfer of upper layer PDUs;
In-sequence delivery of upper layer PDUs;
Out-of-sequence delivery of upper layer PDUs;
Error correction through ARQ;

Concatenation, segmentation and reassembly of RLC SDUs;

Re-segmentation of RLC data PDUs;

Reordering of RLC data PDUs;

Duplicate detection;

Protocol error detection;

RLC SDU discard; and

RLC re-establishment.

In the aforementioned descriptions, the in-sequence delivery function of the NR RLC layer 2d-10 or 2d-35 may indicate a function of delivering RLC SDUs received from a lower layer, to an upper layer in order. When one RLC SDU is segmented into a plurality of RLC SDUs and the segmented RLC SDUs are received, the in-sequence delivery function of the NR RLC layer 2d-10 or 2d-35 may include a function of reassembling the segmented RLC SDUs and delivering the reassembled RLC SDU.

The in-sequence delivery function of the NR RLC layer 2d-10 or 2d-35 may include a function of reordering received RLC PDUs on a RLC SN or PDCP SN basis, a function of recording missing RLC PDUs by reordering the received RLC PDUs, a function of reporting status information of the missing RLC PDUs to a transmitter, and a function of requesting to retransmit the missing RLC PDUs.

The in-sequence delivery function of the NR RLC layer 2d-10 or 2d-35 may include a function of delivering only RLC SDUs prior to a missing RLC SDU, to an upper layer in order when the missing RLC SDU exists.

The in-sequence delivery function of the NR RLC layer 2d-10 or 2d-35 may include a function of delivering all RLC SDUs received before a timer starts, to an upper layer in order although a missing RLC SDU exists when a certain timer stops.

The in-sequence delivery function of the NR RLC layer 2d-10 or 2d-35 may include a function of delivering all RLC SDUs received up to a current time, to an upper layer in order although a missing RLC SDU exists when a certain timer stops.

The NR RLC layer 2d-10 or 2d-35 may process the RLC PDUs in order of reception, regardless of SNs, and may deliver the RLC PDUs to a PDCP layer out of order (out-of-sequence delivery).

When the NR RLC layer 2d-10 or 2d-35 is to receive a segment, the NR RLC layer 2d-10 or 2d-35 may receive segments stored in a buffer or to be received, may reassemble the segments into a whole RLC PDU and may deliver the RLC PDU to the NR PDCP layer.

The NR RLC layer 2d-10 or 2d-35 may not have a concatenation function, and the concatenation function may be performed by the NR MAC layer 2d-15 or 2d-30 or be replaced with a multiplexing function of the NR MAC layer 2d-15 or 2d-30.

In the aforementioned descriptions, the out-of-sequence delivery function of the NR RLC layer 2d-10 or 2d-35 may indicate a function of delivering RLC SDUs received from a lower layer, to an upper layer out of order. The out-of-sequence delivery function of the NR RLC layer 2d-10 or 2d-35 may include a function of reassembling a plurality of RLC SDUs segmented from one RLC SDU and delivering the reassembled RLC SDU when the segmented RLC SDUs are received. The out-of-sequence delivery function of the NR RLC layer 2d-10 or 2d-35 may include a function of recording missing RLC PDUs by storing RLC SNs or PDCP SNs of received RLC PDUs and reordering the received RLC PDUs.

The NR MAC layer 2d-15 or 2d-30 may be connected to a plurality of NR RLC layers configured for one UE, and main functions of the NR MAC layer 2d-15 or 2d-30 may include some of the following functions:

Mapping between logical channels and transport channels;

Multiplexing/demultiplexing of MAC SDUs;

Scheduling information reporting;

Error correction through HARQ;

Priority handling between logical channels of one UE;

Priority handling between UEs by means of dynamic scheduling;

MBMS service identification;

Transport format selection; and

Padding.

An NR PHY layer 2d-20 or 2d-25 may channel-code and modulate upper layer data into OFDM symbols and may transmit the OFDM symbols through a radio channel, or may demodulate OFDM symbols received through a radio channel and channel-decode and deliver the OFDM symbols to an upper layer.

FIG. 2E illustrates a procedure in which an eNB releases connection to a UE and thus the UE transitions from an RRC connected mode to an RRC idle mode, and a procedure in which the UE establishes connection with the eNB and thus transitions from the RRC idle mode to the RRC connected mode, according to an embodiment of the disclosure.

Referring to FIG. 2E, according to an embodiment of the disclosure, when the UE that transceives data in the RRC connected mode does not transceive data for a certain reason or for a certain time, the eNB transmits an RRCConnectionRelease message to the UE to switch the UE to the RRC idle mode (operation 2e-01). Afterward, when the UE that has not established connection with the eNB (hereinafter, the idle mode UE) has data to be transmitted, the idle mode UE performs an RRC connection establishment procedure with the eNB.

The idle mode UE establishes reverse transmission synchronization with the eNB through a random access process, and transmits an RRCConnectionRequest message to the eNB (operation 2e-05). The RRCConnectionRequest message may include an identifier of the idle mode UE, establishment cause, or the like.

The eNB transmits an RRCConnectionSetup message such that the idle mode UE establishes RRC connection (operation 2e-10). The RRCConnectionSetup message may include RRC connection set-up information, or the like. RRC connection may be called a signaling radio bearer (SRB), and may be used in transmitting and receiving an RRC message that is a control message between the UE and the eNB.

The UE establishes the RRC connection and then transmits an RRCConnetionSetupComplete message to the eNB (operation 2e-15). The RRCConnetionSetupComplete message may include a control message such as a SERVICE REQUEST message for requesting an MME to configure a bearer for a certain service by the UE.

The eNB may transmit the SERVICE REQUEST message included in the RRCConnetionSetupComplete message to the MME (operation 2e-20), and the MME may determine whether to provide the service requested by the UE.

As a result of the determination, when the MME decides to provide the service requested by the UE, the MME transmits an INITIAL CONTEXT SETUP REQUEST message to the eNB (operation 2e-25). The INITIAL CONTEXT SETUP REQUEST message may include QoS information to be applied in configuring a data radio bearer (DRB), security information (e.g., a security key, a security algorithm, or the like) to be applied to the DRB, or the like.

The eNB may exchange a SecurityModeCommand message 2e-30 and a SecurityModeComplete message 2e-35 with the UE to configure a security mode.

After the security mode is completely configured, the eNB may transmit an RRCConnectionReconfiguration message to the UE (operation 2e-40).

The RRCConnectionReconfiguration message may include setting information about the DRB to process user data, and the UE may set the DRB by using the setting information and may transmit an RRCConnectionReconfigurationComplete message to the eNB (operation 2e-45).

The eNB may complete the DRB setting with the UE and then may transmit an INITIAL CONTEXT SETUP COMPLETE message to the MME (operation 2e-50), and the MME may receive the message and then may exchange an S1 BEARER SETUP message 2e-55 and an S1 BEARER SETUP RESPONSE message 2e-60 with a S-GW so as to set an S1 bearer. The S1 bearer may indicate data transmission connection that is set up between the S-GW and the eNB, and may correspond to the DRB in a one-to-one manner.

When the aforementioned procedure is completed, the UE and the eNB may transfer and receive data via the S-GW (operations 2e-65 and 2e-70). The aforementioned general data transfer procedure includes three steps that are RRC connection setting, security setting, and DRB setting.

The gNB may transmit an RRCConnectionReconfiguration message to the UE so as to newly perform, add, or change a configuration of the UE (operation 2e-75).

In this regard, when the UE establishes the RRC connection so as to transition from the RRC idle mode to the RRC connected mode, a large number of signaling procedures may be requested. Therefore, in the NR or 5G system, an RRC inactive mode may be newly defined. As described above, in the new mode, the UE and the eNB may store a context of the UE and may maintain the S1 bearer when required, and therefore, when the UE in the RRC inactive mode attempts to re-access a network, the UE may access the network faster through less signaling procedures and may transceive data, according to an RRC reconnection setup procedure to be provided below.

Figure 2F:
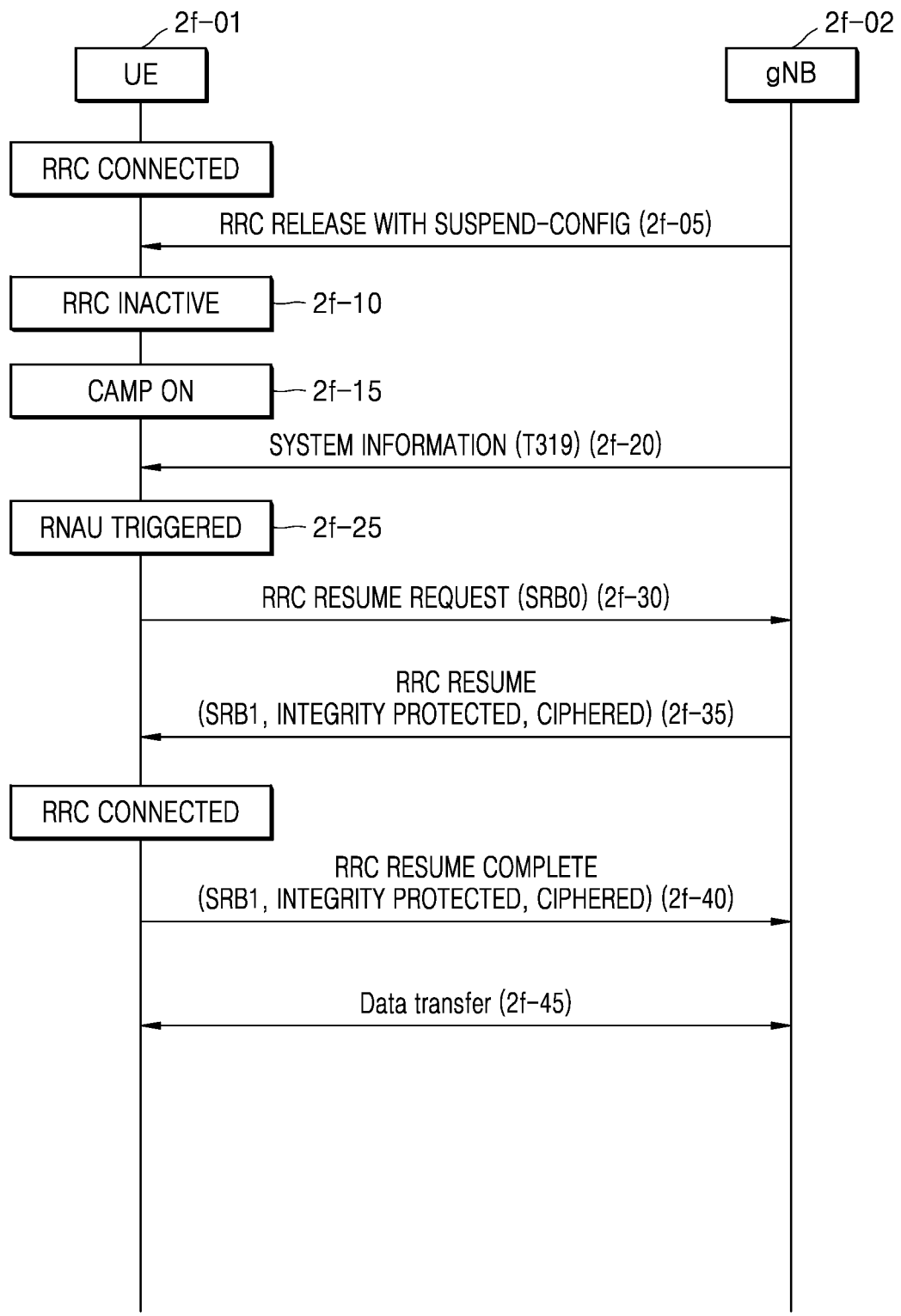
FIG. 2F illustrates a procedure in which a gNode B (gNB) releases a connection to a UE and thus the UE transitions from an RRC connected mode to an RRC inactive mode, and a procedure in which the UE establishes a connection with the gNB and thus transitions from the RRC inactive mode to the RRC connected mode, according to an embodiment of the disclosure.

FIG. 2F illustrates a procedure in which a gNB 2f-02 releases connection to a UE 2f-01 and thus the UE 2f-01 transitions from an RRC connected mode to an RRC inactive mode, and a procedure in which the UE 2f-01 establishes connection with the gNB 2f-02 and thus transitions from the RRC inactive mode to the RRC connected mode, according to an embodiment of the disclosure.

Referring to FIG. 2F, the UE 2f-01 may be connected with the gNB 2f-02 through a network and may transceive data. When it is required for the gNB 2f-02 to switch the UE 2f-01 to the RRC inactive mode for a certain reason, the gNB 2f-02 may send an RRCRelease message 2f-05 including suspend configuration information (suspend-Config) and may switch the UE 2f-01 to the RRC inactive mode.

Proposed operations of the UE 2f-01 when the UE 2f-01 receives the RRCRelease message 2f-05 including the suspend configuration information (suspendConfig) are as below.

1. When the RRCRelease message 2f-05 includes the suspend configuration information (suspendConfig), and
   A. when the UE 2f-01 has a UE connection-resume identifier, a NexthopChainingCount (NCC), an RAN-PagingCycle, and RAN-NotificationArea information which are already stored in the UE 2f-01,
      i. the UE 2f-01 may replace (or may update) stored values with new values included in the suspend configuration information of the RRCRelease message 2f-05.
   B. When the UE 2f-01 does not have the UE connection-resume identifier, the NCC, the RAN-PagingCycle, and the RAN-NotificationArea information which are already stored in the UE 2f-01,
      i. the UE 2f-01 may store a UE connection-resume identifier, an NCC, an RAN-PagingCycle, and RAN-NotificationArea information which are included in the suspend configuration information of the RRCRelease message 2f-05.
   C. Then, the UE 2f-01 may reset an MAC layer (so as to prevent unnecessary retransmission of a plurality of items of data stored in an HARQ buffer, when connection is resumed).
   D. Also, the UE 2f-01 may re-establish RLC layers with respect to all SRBs and DRBs (so as to prevent unnecessary retransmission of a plurality of items of data stored in an RLC buffer, when connection is resumed, and to initialize variables to be used at a later time).
   E. In the aforementioned descriptions, when the UE 2f-01 did not receive the RRCRelease message 2f-05 including the suspend configuration information as a response to an RRCResumeRequest message,
      i. the UE 2f-01 may store a UE context. The UE context may include current RRC configuration information, current security context information, PDCP state information including ROHC state information, SDAP configuration information, UE cell identifier used in a source PCell, and a cell identifier and a physical cell identifier of the source PCell.
   F. Then, the UE 2f-01 may suspend all SRBs and DRBs except for SRB0.
   G. Then, the UE 2f-01 may drive a T380 timer by using a periodic RAN-based notification area update (RNAU) timer value included in the suspend configuration information.
   H. Then, the UE 2f-01 may report suspension of RRC connection to an upper layer.
   I. Then, the UE 2f-01 may set lower layers to suspend an integrity protection function and a ciphering function.
   J. Then, the UE 2f-01 may transition to the RRC inactive mode.

In the aforementioned descriptions, when the RRCRelease message 2f-05 includes redirected carrier information (redirectedCarrierInfo), the UE 2f-01 that transitioned to the RRC inactive mode may search for a suitable cell by performing a cell selection process based on the redirected carrier information, and when a cell to camp on is found (operation 2f-15), the UE 2f-01 may read system information of the cell (operation 2f-20). The system information may include T319 timer information or the like. When the UE 2f-01 cannot find the suitable cell, the UE 2f-01 may search for the suitable cell in a directed RAT and may find a cell to camp on (operation 2f-15). When the cell to camp on is found, the UE 2f-01 may read system information of the cell (operation 2f-20). When the RRCRelease message 2f-05 does not include the redirected carrier information, the UE 2f-01 has to find a cell to camp on by searching for the suitable cell in an NR carrier, and when the cell to camp on is found, the UE 2f-01 may read system information of the cell (operation 2f-20).

In a case where the UE 2f-01 cannot find the suitable cell to camp on, by using the aforementioned methods, the UE 2f-01 may search for the suitable cell to camp on, by performing the cell selection process based on information stored in the UE 2f-01 (operation 2f-15), and when the cell to camp on is found, the UE 2f-01 may read system information of the cell (operation 2f-20). In the disclosure, the suitable cell may be defined as the cell that fulfills the following conditions.

Suitable Cell:
A cell is considered a suitable cell when the following conditions are fulfilled:
  The cell is part of either:
    the selected public land mobile network (PLMN), or
    a PLMN of the equivalent PLMN list;
  The cell selection criteria are fulfilled; and
  A cell is served by the selected/registered PLMN and not barred.
  According to the latest information provided by NAS:
  The cell is not barred;
  The cell is part of at least one TA that is not part of the list of "Forbidden Tracking Areas," which belongs to a PLMN that fulfils the first bullet above.

Also, according to the disclosure, when the UE 2f-01 that transitioned to the RRC inactive mode in operation 2f-10 camps on a suitable cell, the UE 2f-01 may be in a camped normally state. In general, a UE in a camped normally state may receive a general service from a network and may perform the following operations:
  select and monitor the indicated paging channels of the cell according to information sent in system information;
  monitor relevant system information;
  perform necessary measurements for the cell reselection evaluation procedure; and
  execute the cell reselection evaluation process on the following occasions/triggers:
    1) UE internal triggers, so as to meet performance; and
    2) when information on the broadcast control channel (BCCH) used for the cell reselection evaluation procedure has been modified.

According to the disclosure, when the UE 2f-01 that transitioned to the RRC inactive mode in operation 2f-10 cannot find the suitable cell, the UE 2f-01 may be in one of the following three states:
  1. The case where the UE in the RRC inactive mode (also referred to as the inactive UE) is temporarily in out of coverage from a camped normally state;
  2. The case where the UE in the RRC inactive mode camps on an acceptable cell and thus is in a camped on any cell state; or
  3. The case where the UE in the RRC inactive mode cannot find an acceptable cell to camp on and thus is in any cell selection state in which the UE searches for the acceptable cell in all PLMNs.

In this regard, the UE 2f-01 that transitioned to the RRC inactive mode in operation 2f-10 does not transition to the RRC idle mode and maintains the RRC inactive mode.

In a case where the UE 2f-01 that transitioned to the RRC inactive mode in operation 2f-10 cannot find the suitable cell according to the aforementioned processes and conditions, when the RRCRelease message 2f-05 includes redirected carrier information (redirectedCarrierInfo), the UE 2f-01 may search for an acceptable cell by performing a cell selection process based on the redirected carrier information, and when a cell to camp on is found (operation 2f-15), the UE 2f-01 may read system information of the cell (operation 2f-20). The system information includes T319 timer information or the like. When the UE 2f-01 cannot find the acceptable cell in the RRC inactive mode in operation 2f-10, the UE 2f-01 may search for the acceptable cell in a directed RAT and then may find the cell to camp on (operation 2f-15), and when the cell to camp on is found, the UE 2f-01 may read system information of the cell (operation 2f-20). When the RRCRelease message 2f-05 does not include the redirected carrier information, the UE 2f-01 may search for the acceptable cell in an NR carrier in operation and may find the cell to camp on, and when the cell to camp on is found, the UE 2f-01 may read system information of the cell (operation 2f-20). When the UE 2f-01 cannot find the acceptable cell to camp on, by using the aforementioned methods, the UE 2f-01 in the any cell selection state may search for the acceptable cell in all PLMNs in the RRC inactive mode in operation 2f-10, and when the cell to camp on is found, the UE 2f-01 may read system information of the cell (operation 2f-20). The acceptable cell in the disclosure may be defined as a cell that is acceptable when the following conditions are fulfilled.

Acceptable Cell:
An "acceptable cell" is a cell on which the UE may camp on to obtain a limited service (originate emergency calls and receive Earthquake and Tsunami Warning System (ETWS) and Commercial Mobile Alert System (CMAS) notifications. The cell shall fulfill the following requirements, which is the minimum set of requirements to initiate an emergency call and to receive ETWS and CMAS notification in an NR network:
  The cell is not barred; and
  The cell selection criteria are fulfilled.

Also, according to the disclosure, when the UE 2f-01 that transitioned to the RRC inactive mode in operation 2f-10 camps on the acceptable cell, the UE 2f-01 may be in a camped on any cell state. The UE 2f-01 in the camped on any cell state may receive a limited service such as an emergency call, reception of natural disaster information, or the like through a network, and may perform the following operations:
  select and monitor the indicated paging channels of the cell;
  monitor relevant system information;
  perform necessary measurements for the cell reselection evaluation procedure;
  execute the cell reselection evaluation process on the following occasions/triggers:
    1) the UE internal triggers, so as to meet performance; and
    2) When information on the BCCH used for the cell reselection evaluation procedure has been modified; and
  regularly attempt to find a suitable cell by trying all frequencies of all RATs that are supported by the UE. When the suitable cell is found, the UE shall move to a camped normally state.

In a case where a T380 timer stops or the UE 2f-01 in the RRC inactive mode exits a set ran-notification area while the UE 2f-01 moves, when it is required to perform an RNAU (operation 2f-25), the UE 2f-01 may perform an RRC connection resume process. When the UE 2f-01 is camped on the suitable cell in operation 2f-15, the UE 2f-01 in the RRC inactive mode may perform a random access process, and may drive a T319 timer when transmitting an RRCResumeRequest message to the gNB 2f-02. When the UE 2f-01 does not receive an RRCResume message in response to the RRCResumeRequest message until the driven T319 timer stops, the UE 2f-01 in the RRC inactive mode may transition to the RRC idle mode.

Operations of the UE 2f-01, which are related to transmission of the RRCResumeRequest message, are as below (operation 2f-30).

1. The UE 2f-01 may check system information, and when the system information indicates transmission of a full UE connection resume identifier (a full radio network temporary identifier (I-RNTI) or a full resume ID), the UE 2f-01 may include a stored full I-RNTI in a message and may prepare to send the message. When the system information indicates transmission of a truncated I-RNTI or a truncated resume ID, the UE 2f-01 may split the stored full I-RNTI into truncated resume IDs by using a predetermined method, may include the truncated resume IDs in a message and may prepare to send the message.

2. The UE 2f-01 may reconstruct RRC connection set-up information and security context information from the UE context storing the RRC connection set-up information and the security context information.

3. Then, the UE 2f-01 may update a new KgNB security key based on a current KgNB security key, a NextHop (NH) value, and a stored NCC value.

4. Then, the UE 2f-01 may derive, by using the updated new KgNB security key, new security keys, i.e., K_RRCenc, K_RRC_int, K_UPint, and K_UPenc, which are to be used in an integrity protection and verification process and a decoding process.

5. Then, the UE 2f-01 may calculate MAC-I, may include MAC-I in a message, and may prepare to send the message.

6. Then, the UE 2f-01 may resume SRB1 (because the RRCResume message will be received through SRB1, in response to the RRCResumeRequset message to be sent, SRB1 has to be resumed previous thereto).

7. The UE 2f-01 may configure and transfer the RRCResumeRequset message to a lower layer.

8. The UE 2f-01 may resume the integrity protection and verification process on all bearers except for SRB0 by using updated security keys and a preset algorithm, and may apply integrity verification and protection on a plurality of items of data to be transceived thereafter (so as to increase reliability and security of a plurality of items of data to be transceived through SRB1 or DRBs).

9. The UE 2f-01 may resume a ciphering and deciphering process on all bearers except for SRB0 by using updated security keys and a preset algorithm, and may apply ciphering and deciphering on a plurality of items of data to be transceived thereafter (so as to increase reliability and security of a plurality of items of data to be transceived through SRB1 or DRBs).

Operations of the UE 2f-01, as mentioned above, are as described below, the operations being proposed for a case where, when it is required for the UE 2f-01 to establish connection, the UE 2f-01 performs a random access process, transmits an RRCResumeRequest message to the gNB 2f-02, and then receives an RRCResume message in response to the RRCResumeRequest message (operation 2f-35).

1. The UE 2f-01 stops the T319 timer that was driven when the RRCResumeRequest message was transmitted to the gNB 2f-02.

2. When the UE 2f-01 receives a message, the UE 2f-01 may reconstruct a state of a PDCP layer, may reset a COUNT value, and may re-establish PDCP layers of SRB2 and all DRBs.

3. When the message includes masterCellgroup configuration information,

A. the UE 2f-01 may apply the masterCellgroup configuration information included in the message. The masterCellgroup configuration information may include configuration information about RLC layers included in a master cell group, a logical channel identifier, a bearer identifier, or the like.

4. When the message includes bearer configuration information (radioBearerConfig), A. the UE 2f-01 may apply the bearer configuration information (radioBearerConfig) included in the message. The bearer configuration information (radioBearerConfig) may include configuration information about PDCP layers with respect to each bearer, configuration information about SDAP layers, a logical channel identifier, a bearer identifier, or the like.

5. The UE 2f-01 may resume SRB2 and all DRBs.

6. When the message includes frequency measurement configuration information (measConfig), A. the UE 2f-01 may apply the frequency measurement configuration information (measConfig) included in the message. That is, the UE 2f-01 may perform frequency measurement according to the configuration.

7. The UE 2f-01 may transition to an RRC connected mode.

8. The UE 2f-01 may notify an upper layer that RRC connection that was suspended has been resumed.

9. Then, the UE 2f-01 may configure and transfer, to a lower layer, an RRCResumeComplete message to be transmitted (operation 2f-40).

Then, the UE 2f-01 may transmit/receive data to/from the gNB 2f-02 (operation 2f-45).

Figure 2G:
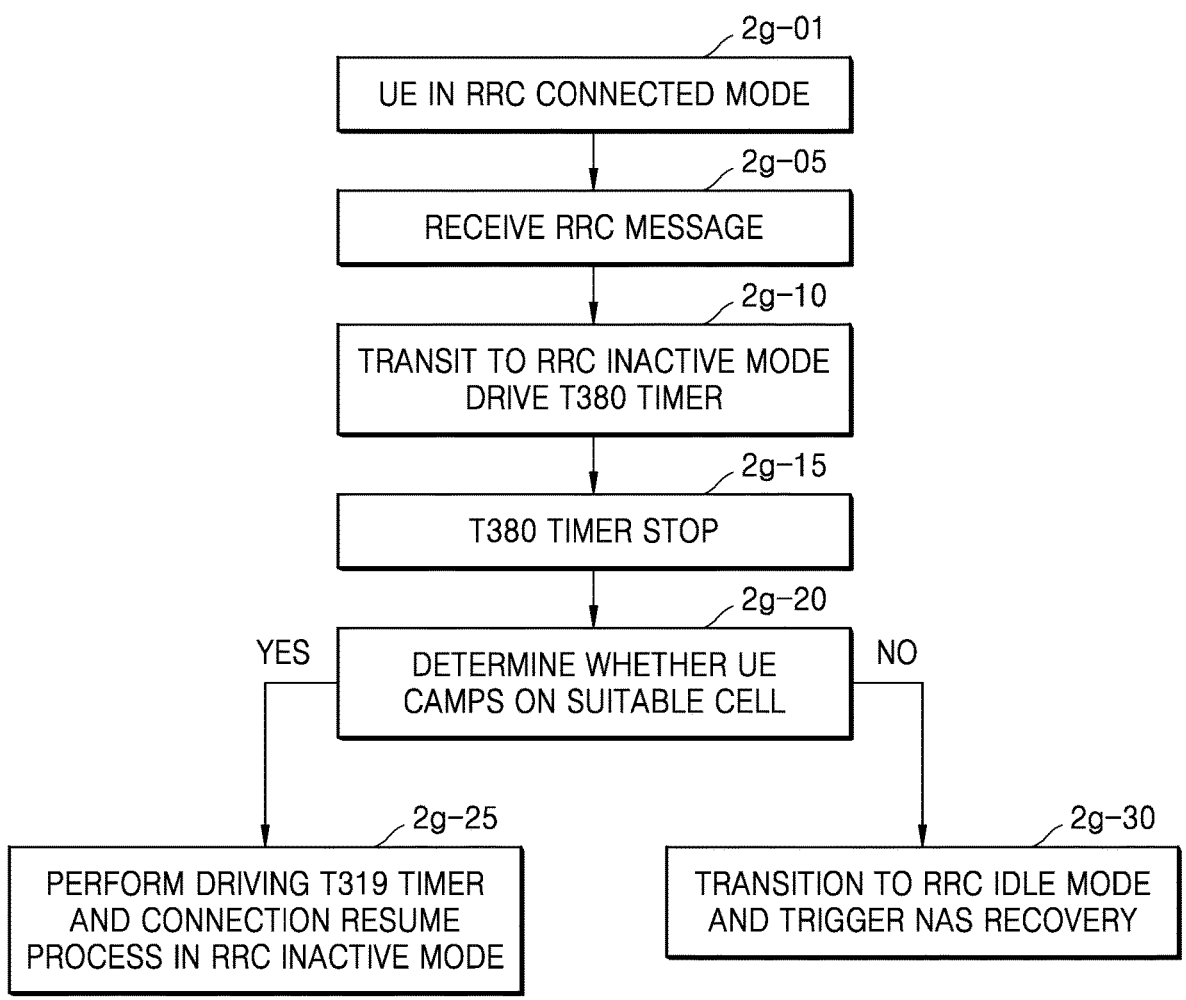
FIG. 2G illustrates a flowchart of operations of a UE according to whether the UE camps on a suitable cell when a T380 timer stops, the T380 timer been driven by the UE after the UE in an RRC connected mode transitioned to an RRC inactive mode, according to an embodiment of the disclosure.

FIG. 2G illustrates a flowchart of operations of a UE according to whether the UE camps on a suitable cell when a T380 timer stops, the T380 timer been driven by the UE after the UE in an RRC connected mode transitioned to an RRC inactive mode, according to an embodiment of the disclosure.

Referring to FIG. 2G, when the UE in the RRC connected mode (operation 2g-01) receives an RRCRelease message including suspend configuration information from a base station for a predetermined reason (operation 2g-05), the UE may transition to an RRC inactive mode (operation 2g-10).

In operation 2g-10, when a T380 timer value is included in the suspend configuration information, the UE may drive the T380 timer. Even when the UE in the RRC inactive mode does not camp on a suitable cell until the driven T380 timer stops, the UE in the RRC inactive mode does not transition to an RRC idle mode and maintains the RRC inactive mode. In operation 2g-15, when the T380 timer driven in operation 2g-10 stops, the UE in the RRC inactive mode may determine whether the UE currently camps on the suitable cell (operation 2g-20). When the UE in the RRC inactive mode camps on the suitable cell and thus is in a camped normally state in operation 2g-20, the UE may perform an RRC connection resume process to perform a RNAU in operation 2g-25. In operation 2g-25, the UE in the RRC inactive mode may drive a T319 timer when transmitting an RRCResumeRequest message to the base station. When the UE in the RRC inactive mode does not receive an RRCResume message from the base station until the driven T319 timer stops, the UE in the RRC inactive mode may transition to the RRC idle mode.

In operation 2g-20, for the following three cases, the UE in the RRC inactive mode may determine that the UE does not currently camp on the suitable cell.

1. The case where the UE in the RRC inactive mode (also referred to as the inactive UE) is temporarily in out of coverage from the camped normally state.

2. The case where the UE in the RRC inactive mode camps on an acceptable cell and thus is in a camped on any cell state.

3. The case where the UE in the RRC inactive mode cannot find the acceptable cell to camp on, or the UE in any cell selection state searches for the acceptable cell in all PLMNs.

In operation 2g-20, when the UE in the RRC inactive mode determines that the UE did not camp on the suitable cell, in operation 2g-30, the UE may transition to the RRC idle mode and may trigger an NAS recovery.

Figure 2H:
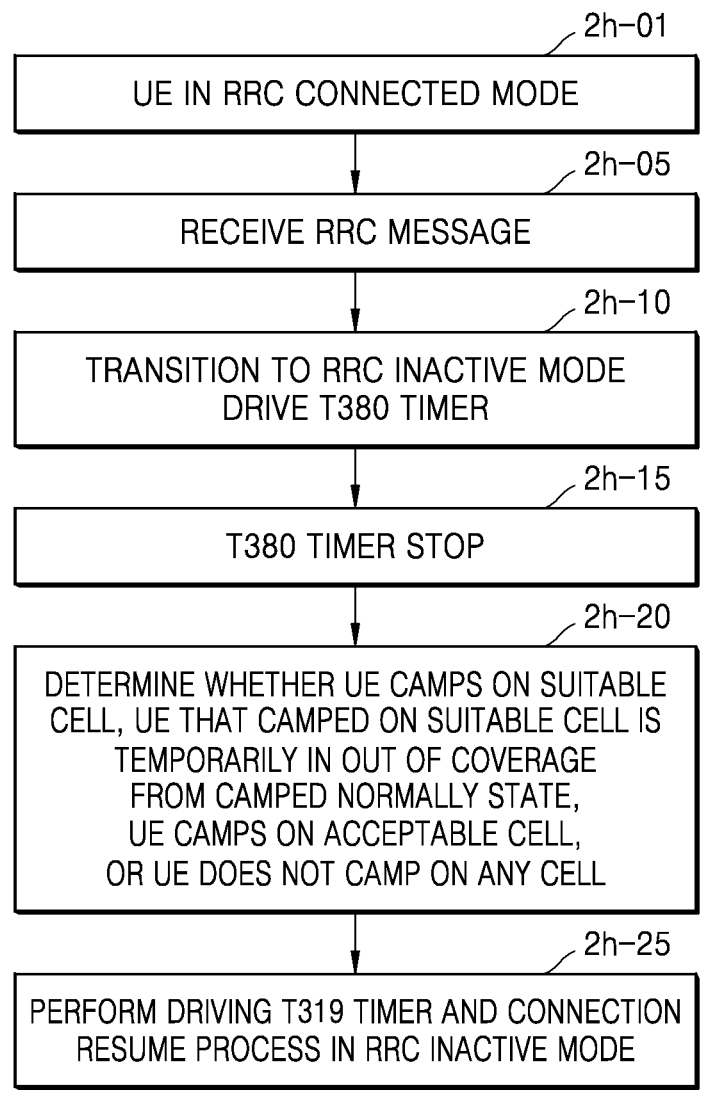
FIG. 2H illustrates a flowchart of operations of a UE according to a case where the UE camps on a suitable cell, a case where the UE that camped on the suitable cell is temporarily in out of coverage from a camped normally state, a case where the UE camps on an acceptable cell, or a case where the UE does not camp on any cell, when a T380 timer stops, the T380 timer been driven by the UE after the UE in an RRC connected mode transitioned to an RRC inactive mode, according to an embodiment of the disclosure.

FIG. 2H illustrates a flowchart of operations of a UE according to a case where the UE camps on a suitable cell, a case where the UE that camped on the suitable cell is temporarily in out of coverage from a camped normally state, a case where the UE camps on an acceptable cell, or a case where the UE does not camp on any cell, when a T380 timer stops, the T380 timer been driven by the UE after the UE in an RRC connected mode transitioned to an RRC inactive mode, according to an embodiment of the disclosure.

Referring to FIG. 2H, when the UE in the RRC connected mode (operation 2h-01) receives an RRCRelease message including suspend configuration information from a base station for a predetermined reason (operation 2h-05), the UE may transition to an RRC inactive mode (operation 2h-10). In operation 2h-10, when a T380 timer value is included in the suspend configuration information, the UE may drive the T380 timer. Even when the UE in the RRC inactive mode does not camp on a suitable cell until the driven T380 timer stops, the UE in the RRC inactive mode does not transition to an RRC idle mode and maintains the RRC inactive mode.

When the T380 timer driven in operation 2h-10 stops in operation 2h-15, the UE in the RRC inactive mode may determine whether the UE currently camps on a suitable cell, the UE is temporarily in out of coverage from a camped normally state, the UE currently camps on an acceptable cell, or the UE does not camp on any cell (operation 2h-20). In operation 2h-20, the UE in the RRC inactive mode may perform an RRC connection resume process to perform a RNAU, regardless of the state of the UE. In operation 2h-25, the UE in the RRC inactive mode may drive a T319 timer when transmitting an RRCResumeRequest message to the base station. When the UE in the RRC inactive mode does not receive an RRCResume message from the base station until the driven T319 timer stops, the UE in the RRC inactive mode may transition to the RRC idle mode.

FIG. 2I illustrates a flowchart of operations of a UE that drives a new timer according to whether the UE camps on a suitable cell when a T380 timer stops, the T380 timer been driven by the UE after the UE transitioned from an RRC connected mode to an RRC inactive mode, according to an embodiment of the disclosure.

Referring to FIG. 2I, according to an embodiment of the disclosure, when the UE in the RRC connected mode (operation 2i-01) receives an RRCRelease message including suspend configuration information from a base station for a predetermined reason (operation 2i-05), the UE may transition to an RRC inactive mode (operation 2i-10). In operation 2i-10, when a T380 timer value is included in the suspend configuration information, the UE may drive the T380 timer.

In operation 2i-15, when the T380 timer driven in operation 2i-10 stops, the UE in the RRC inactive mode may determine whether the UE currently camps on the suitable cell (operation 2i-20).

When the UE in the RRC inactive mode camps on the suitable cell and thus is in a camped normally state in operation 2i-20, the UE may perform an RRC connection resume process to perform an RNAU in operation 2i-25. In operation 2i-25, the UE in the RRC inactive mode may drive a T319 timer when transmitting an RRCResumeRequest message to the base station.

In operation 2i-20, for three cases below, the UE in the RRC inactive mode may determine that the UE does not currently camp on the suitable cell.

1. The case where the UE in the RRC inactive mode (also referred to as the inactive UE) is temporarily in out of coverage from the camped normally state.

2. The case where the UE in the RRC inactive mode camps on an acceptable cell and thus is in a camped on any cell state.

3. The case where the UE in the RRC inactive mode cannot find an acceptable cell to camp on and thus the UE in any cell selection state searches for the acceptable cell in all PLMNs.

When the UE in the RRC inactive mode determines that the UE did not camp on the suitable cell in operation 2i-20, the UE may drive a new wait timer while maintaining the RRC inactive mode, in operation 2i-30. The UE may receive information about the new wait timer from an RRCRelease message or from system information.

In operation 2i-35, before the new wait timer stops, when the UE finds the suitable cell to camp on, by performing a cell selection process, or a cell reselection process, the UE may perform an RRC connection resume process to perform an RNAU in operation 2i-40.

In operation 2i-40, the UE in the RRC inactive mode may drive the T319 timer when transmitting the RRCResumeRequest message to the base station. When the UE does not receive an RRCResume message from the base station until the driven T319 timer stops, the UE may transition to an RRC idle mode.

In operation 2i-45, when the UE did not camp on the suitable cell and the new wait timer stops, in operation 2i-50, the UE may transition from the RRC inactive mode to the RRC idle mode and may trigger an NAS recovery.

Figure 2J:
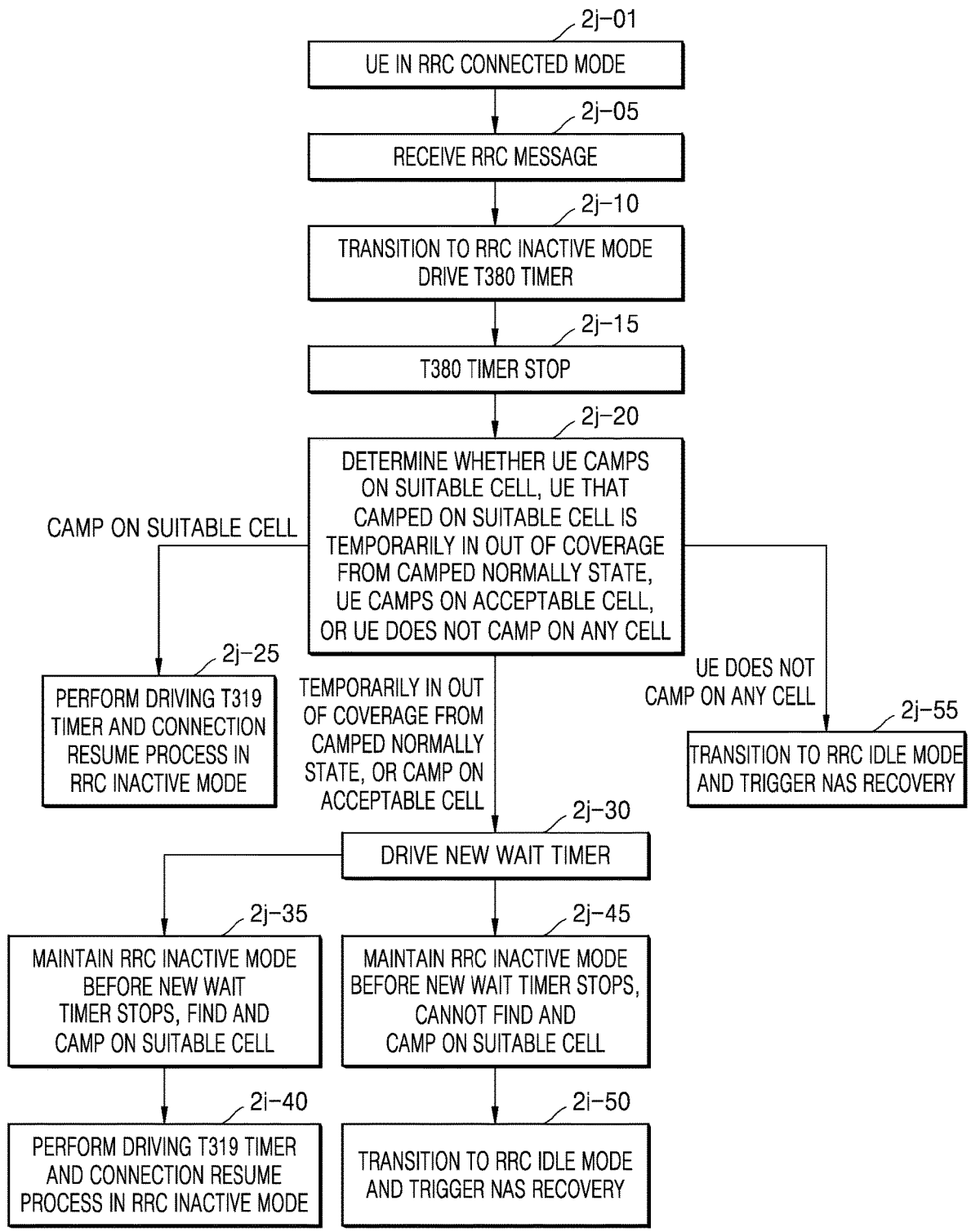
FIG. 2J illustrates a flowchart of operations of a UE that drives a new timer according to a case where the UE camps on a suitable cell, a case where the UE that camped on the suitable cell is temporarily in out of coverage from a camped normally state, a case where the UE camps on an acceptable cell, or a case where the UE does not camp on any cell, when a T380 timer stops, the T380 timer been driven by the UE after the UE transitioned from an RRC connected mode to an RRC inactive mode, according to an embodiment of the disclosure.

FIG. 2J illustrates a flowchart of operations of a UE that drives a new timer according to a case where the UE camps on a suitable cell, a case where the UE that camped on the suitable cell is temporarily in out of coverage from a camped normally state, a case where the UE camps on an acceptable cell, or a case where the UE does not camp on any cell, when a T380 timer stops, the T380 timer been driven by the UE after the UE transitioned from an RRC connected mode to an RRC inactive mode, according to an embodiment of the disclosure.

Referring to FIG. 2J, when the UE in the RRC connected mode (operation 2j-01) receives an RRCRelease message including suspend configuration information from a base station for a predetermined reason (operation 2j-05), the UE may transition to an RRC inactive mode (operation 2j-10).

In operation 2j-10, when a T380 timer value is included in the suspend configuration information, the UE may drive the T380 timer.

When the T380 timer driven in operation 2j-10 stops in operation 2j-15, the UE in the RRC inactive mode may determine whether the UE currently camps on a suitable cell, the UE is temporarily in out of coverage from a camped normally state, the UE currently camps on an acceptable cell, or the UE does not camp on any cell (operation 2j-20).

In operation 2j-20, when the UE in the RRC inactive mode camps on the suitable cell and thus, is in a camped normally state, in operation 2*j*-25, the UE may perform an RRC connection resume process to perform a RNAU.

In operation 2*j*-25, the UE in the RRC inactive mode may drive a T319 timer when transmitting an RRCResumeRequest message to the base station.

In operation 2*j*-20, when the UE in the RRC inactive mode is temporarily in out of coverage from the camped normally state because the UE cannot find the suitable cell while the UE in the camped normally state performs a cell reselection process, or when the UE in the RRC inactive mode camps on an acceptable cell, in operation 2*j*-30, the UE may drive a new timer while maintaining the RRC inactive mode. The UE may receive information about a new wait timer from an RRCRelease message or from system information.

In operation 2*j*-35, before the new wait timer stops, when the UE finds the suitable cell to camp on by performing a cell selection process or a cell reselection process, the UE may perform an RRC connection resume process to perform an RNAU, in operation 2*j*-40.

In operation 2*j*-40, the UE in the RRC inactive mode may drive the T319 timer when transmitting the RRCResumeRequest message to the base station.

In operation 2*j*-45, when the UE did not camp on the suitable cell and the new wait timer stops, in operation 2*j*-50, the UE may transition from the RRC inactive mode to the RRC idle mode and may trigger an NAS recovery.

In operation 2*j*-20, when the UE in the RRC inactive mode cannot find an acceptable cell to camp on and thus the UE in any cell selection state searches for the acceptable cell in all PLMNs, in operation 2*j*-55, the UE may transition from the RRC inactive mode to the RRC idle mode and may trigger the NAS recovery.

Figure 2K:
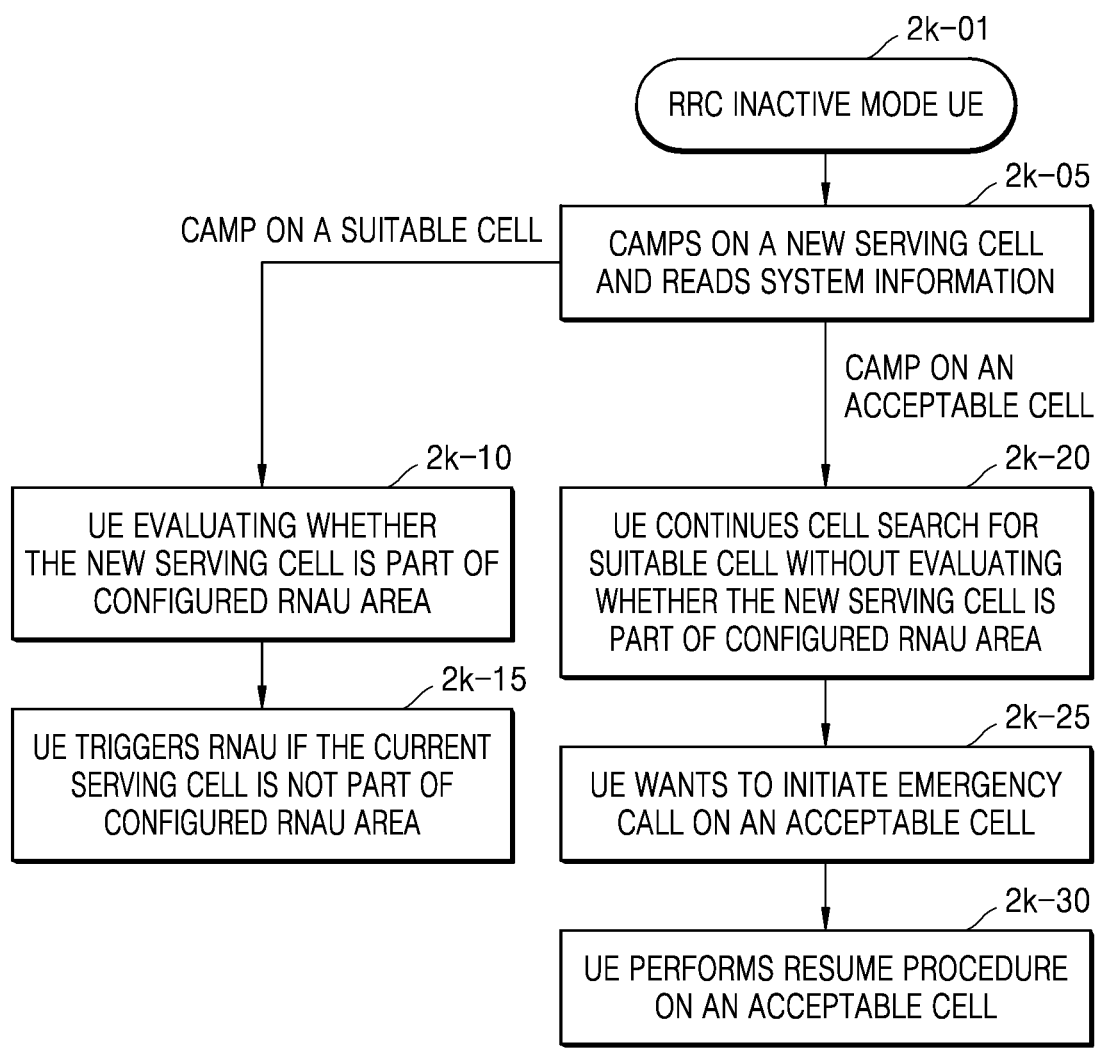
FIG. 2K illustrates a flowchart of operations of a UE that determines whether to evaluate whether a suitable cell stays in a configured radio access network (RAN) notification area (RNA), according to whether the UE camps on the suitable cell, so as to prevent an RAN-based notification area update (RNAU) from being early triggered after the UE transitioned from an RRC connected mode to an RRC inactive mode, according to an embodiment of the disclosure.

FIG. 2K illustrates a flowchart of operations of a UE that evaluates whether a suitable cell stays in a configured ran notification area (RNA), according to whether the UE camps on the suitable cell, so as to prevent an RNAU from being early triggered after the UE transitioned from an RRC connected mode to an RRC inactive mode, according to an embodiment of the disclosure.

An embodiment of the disclosure which is described with reference to FIG. 2K may be applied to all embodiments of the disclosure.

Referring to FIG. 2K, according to an embodiment of the disclosure, the UE in the RRC inactive mode (operation 2*k*-01) camps on a new serving cell and reads system information that is broadcast by the new serving cell (operation 2*k*-05).

When the UE camps on a suitable cell in operation 2*k*-05, the UE may evaluate whether the new serving cell stays in the configured RNA, in operation 2*k*-10. The RNA configured with respect to the UE may be included in an RRCRelease message including suspend configuration information (suspendConfig) received by the UE when the UE transitions from the RRC connected mode to the RRC inactive mode.

When the UE camps on the suitable cell in operation 2*k*-05, the UE in the RRC inactive mode may evaluate whether a current serving cell exited from the configured RNA, in operation 2*k*-10. When the current serving cell exited from the configured RNA, the UE may perform an RRC connection resume process to perform an RNAU, in operation 2*k*-15.

When the UE camps on an acceptable cell in operation 2*k*-05, the UE may not evaluate whether the current serving cell stays in the configured RNA and may continuously perform a cell search to find the suitable cell while the UE maintains the RRC inactive mode, in operation 2*k*-20. Also, when the UE camps on the acceptable cell in operation 2*k*-05, the UE may maintain the RRC inactive mode even when the current serving cell exits the configured RNA, in operation 2*k*-20. In operation 2*k*-25, when the UE in the RRC inactive mode attempts to initiate an emergency call (e.g., when an NAS of the UE attempts signaling), in operation 2*k*-30, the UE that camped on the acceptable cell may perform an RRC connection resume process.

Figure 2L:
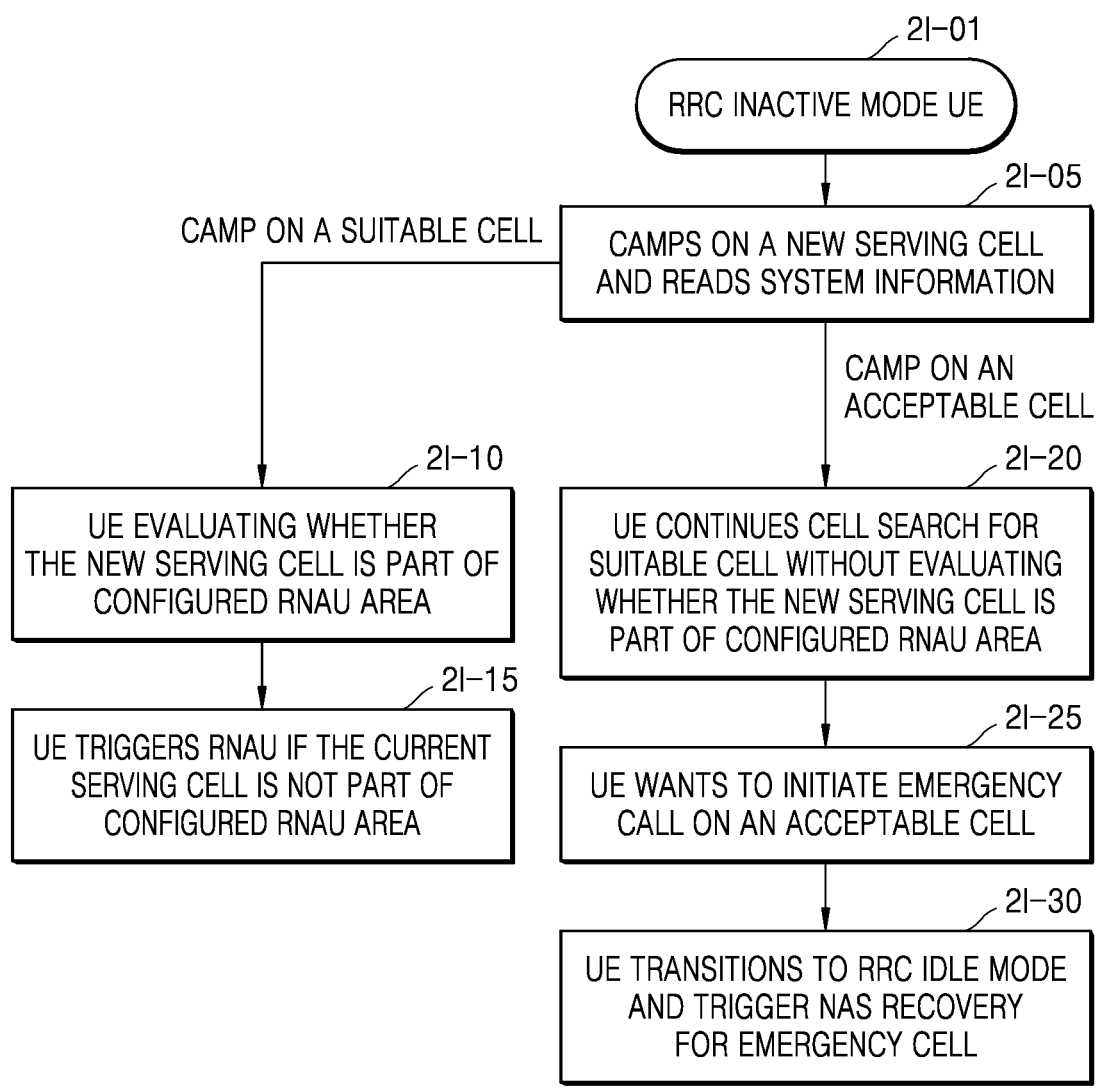
FIG. 2L illustrates a flowchart of operations of a UE that evaluates whether a suitable cell stays in a configured RNA, according to whether the UE camps on the suitable cell, or that performs a connection resume process or a non-access stratum (NAS) recovery process, so as to prevent an RNAU from being early triggered after the UE transitioned from an RRC connected mode to an RRC inactive mode, according to an embodiment of the disclosure.

FIG. 2L illustrates a flowchart of operations of a UE that evaluates whether a suitable cell stays in a configured RNA, according to whether the UE camps on the suitable cell, or that performs a connection resume process or an NAS recovery process, so as to prevent an RNAU from being early triggered after the UE transitioned from an RRC connected mode to an RRC inactive mode, according to an embodiment of the disclosure.

An embodiment of the disclosure which is described with reference to FIG. 2L may be applied to all embodiments of the disclosure.

Referring to FIG. 2L, the UE in the RRC inactive mode (operation 2*l*-01) camps on a new serving cell and reads system information that is broadcast by the new serving cell (operation 2*l*-05). When the UE camps on a suitable cell in operation 2*l*-05, the UE may evaluate whether the new serving cell stays in the configured RNA, in operation 2*l*-10.

The RNA configured with respect to the UE may be included in an RRCRelease message including suspend configuration information (suspendConfig) received by the UE when the UE transitions from the RRC connected mode to the RRC inactive mode.

When the UE camps on the suitable cell in operation 2*l*-05, the UE in the RRC inactive mode may evaluate whether a current serving cell (the new serving cell) exited from the configured RNA, in operation 2*l*-10. When the current serving cell exited from the configured RNA, the UE may perform an RRC connection resume process to perform an RNAU, in operation 2*l*-15.

When the UE camps on an acceptable cell in operation 2*l*-05, the UE may not evaluate whether the current serving cell stays in the set RNA and may continuously perform a cell search to find the suitable cell while the UE maintains the RRC inactive mode, in operation 2*l*-20. Also, when the UE camps on the acceptable cell in operation 2*l*-05, the UE may maintain the RRC inactive mode even when the current serving cell exits the configured RNA, in operation 2*l*-20. In operation 2*l*-25, when the UE in the RRC inactive mode which camped on the acceptable cell attempts to initiate an emergency call (e.g., when an NAS of the UE attempts signaling), in operation 2*l*-30, the UE may transition from the RRC inactive mode to an RRC idle mode and then may initiate an emergency call by triggering an NAS recovery.

Figure 2M:
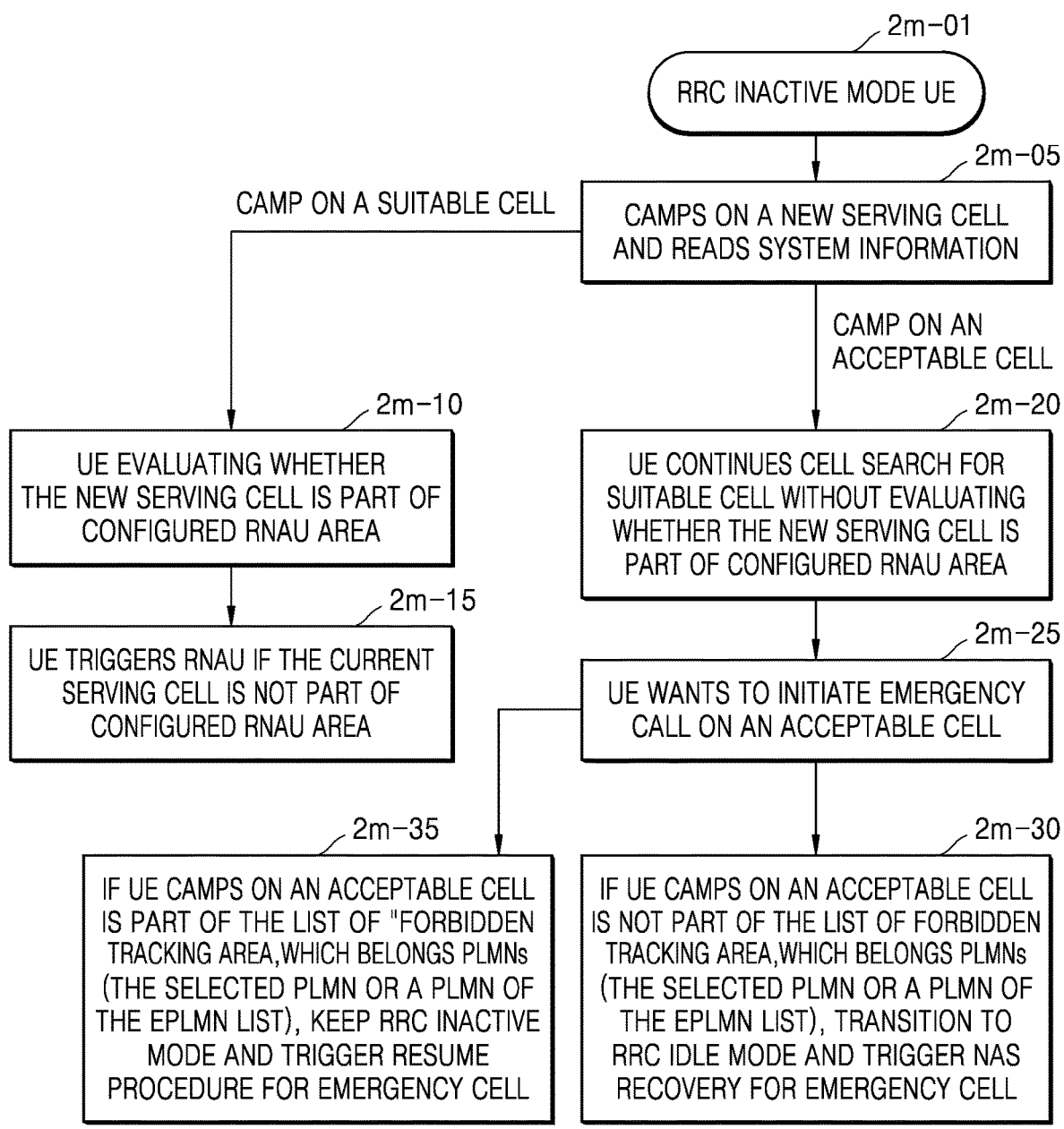
FIG. 2M illustrates a flowchart of operations of a UE that evaluates whether a suitable cell stays in a configured RNA according to whether the UE camps on the suitable cell, or that performs a connection resume process or an NAS recovery process according to a type of an acceptable cell to camp on, so as to prevent an RNAU from being early triggered after the UE transitioned from an RRC connected mode to an RRC inactive mode, according to an embodiment of the disclosure.

FIG. 2M illustrates a flowchart of operations of a UE that determines whether to evaluate whether a suitable cell stays in a configured RNA according to whether the UE camps on the suitable cell, or that performs a connection resume process or an NAS recovery process according to a type of an acceptable cell to camp on, so as to prevent an RNAU from being early triggered after the UE transitioned from an RRC connected mode to an RRC inactive mode, according to an embodiment of the disclosure.

An embodiment of the disclosure which is described with reference to FIG. 2M may be applied to all embodiments of the disclosure.

Referring to FIG. 2M, the UE in the RRC inactive mode (operation 2m-01) camps on a new serving cell and reads system information that is broadcast by the new serving cell (operation 2m-05).

When the UE camps on a suitable cell in operation 2m-05, the UE may evaluate whether the new serving cell stays in the configured RNA, in operation 2m-10. The RNA configured with respect to the UE may be included in an RRCRelease message including suspend configuration information (suspendConfig) received by the UE when the UE transition from the RRC connected mode to the RRC inactive mode.

In operation 2m-15, when a current serving cell (the new serving cell) exits the configured RNA, the UE in the RRC inactive mode may perform an RRC connection resume process to perform an RNAU.

When the UE camps on an acceptable cell in operation 2m-05, the UE may not evaluate whether the new serving cell stays in the set RNA and may continuously perform a cell search to find the suitable cell while the UE maintains the RRC inactive mode, in operation 2m-20. Also, when the UE camps on the acceptable cell in operation 2m-05, the UE may maintain the RRC inactive mode even when the current serving cell exits the configured RNA, in operation 2m-20. In operation 2m-25, in a case where the UE in the RRC inactive mode which camped on the acceptable cell attempts to initiate an emergency call, when the acceptable cell that the UE in the RRC inactive mode camps on is not a cell that belongs to a forbidden tracking area indicator list (TAI list), in operation 2m-30, the UE may transition from the RRC inactive mode to an RRC idle mode and then may initiate the emergency call by triggering an NAS recovery. In operation 2m-25, in a case where the UE in the RRC inactive mode which camped on the acceptable cell attempts to initiate the emergency call, when the acceptable cell that the UE in the RRC inactive mode camps on is a cell that belongs to the forbidden TAI list, in operation 2m-35, the UE may initiate the emergency call by performing the RRC connection resume process while the UE maintains the RRC inactive mode.

Figure 2N:
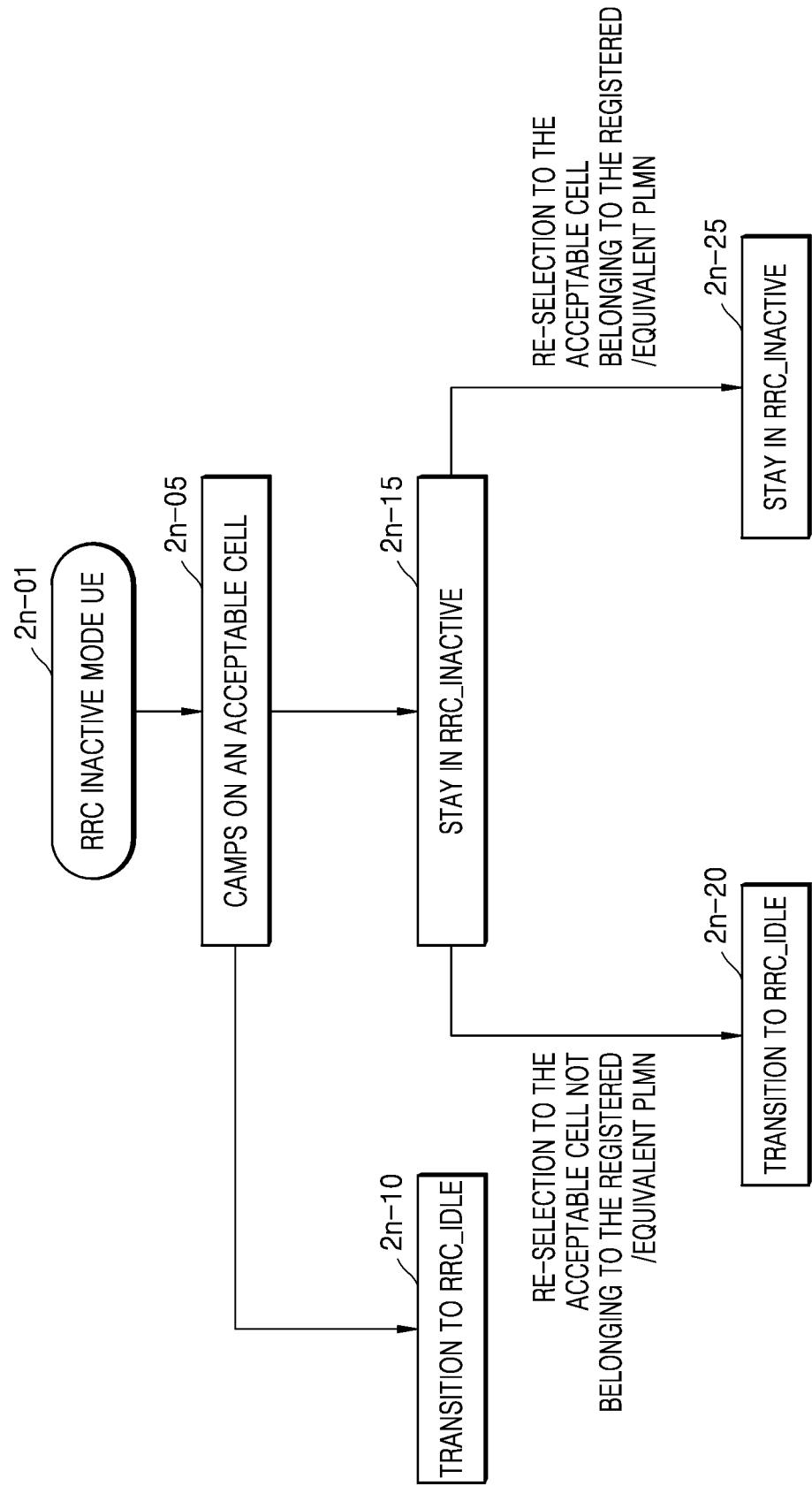
FIG. 2N illustrates a flowchart of operations of a UE in an RRC inactive mode when the UE camps on an acceptable cell, according to an embodiment of the disclosure.
Figure 20:
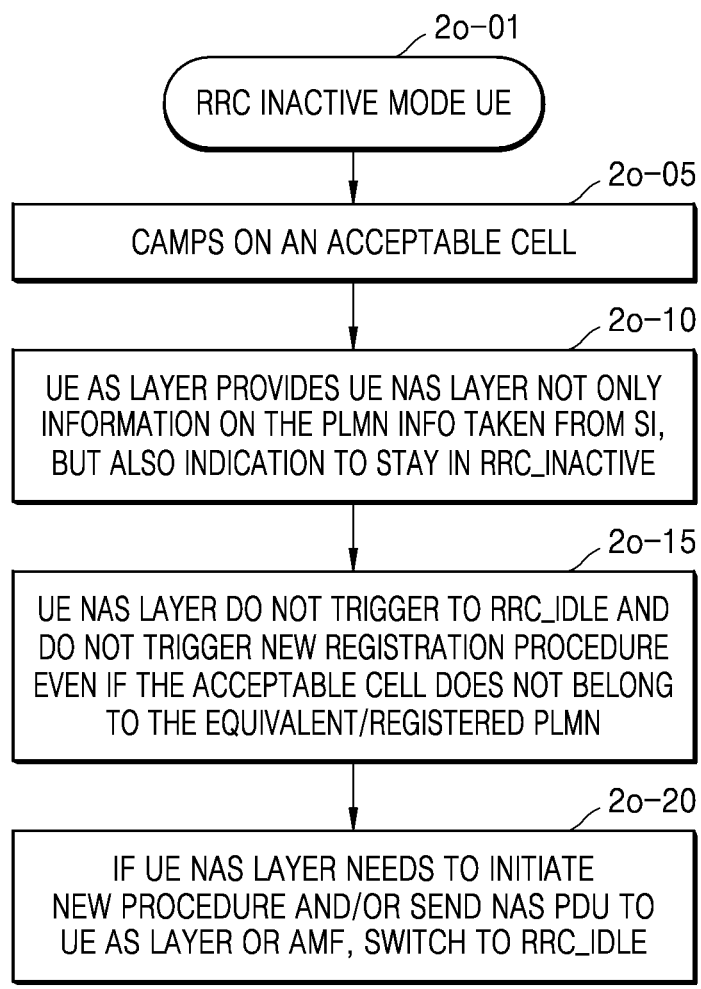

FIG. 2N illustrates a flowchart of operations of a UE in an RRC inactive mode when the UE camps on an acceptable cell, according to an embodiment of the disclosure.

An embodiment of the disclosure which is described with reference to FIG. 2N may be applied to all embodiments of the disclosure.

Referring to FIG. 2N, the UE in the RRC inactive mode, in operation 2n-01, cannot find a suitable cell and thus may camp on the acceptable cell (operation 2n-05). When the UE camps on the acceptable cell, in operation 2n-05, a proposed operation of the UE may be one of the following operations:

1. The UE may transition to an RRC idle mode (operation 2n-10); or
2. The UE may maintain the RRC inactive mode (operation 2n-15).

When the UE maintains the RRC inactive mode (operation 2n-15), the UE may reselect a next cell, may continuously drive a T380 timer that was driven after the UE transitioned from an RRC connected mode to the RRC inactive mode, and may monitor CN paging without monitoring RAN paging. In operation 2n-15, when the UE in the RRC inactive mode reselects an acceptable cell that does not belong to an equivalent PLMN nor a registered PLMN, the UE may transition to the RRC inactive mode (operation 2n-20). In operation 2n-15, when the UE in the RRC inactive mode reselects an acceptable cell that belongs to the equivalent PLMN or the registered PLMN, the UE may maintain the RRC inactive mode (operation 2n-25).

FIG. 2O illustrates a process of maintaining an RRC inactive mode, the process being performed by a UE in the RRC inactive mode when the UE camps on an acceptable cell, according to an embodiment of the disclosure.

An embodiment of the disclosure which is described with reference to FIG. 2O may be applied to all embodiments of the disclosure.

Referring to FIG. 2O, the UE in the RRC inactive mode (operation 2o-01) cannot find a suitable cell and thus may camp on an acceptable cell and may read system information of the acceptable cell (operation 2o-05). In operation 2o-10, while the UE maintains the RRC inactive mode, an AS layer of the UE may send PLMN information and an indicator to an NAS layer of the UE, the PLMN information being read from the system information of the acceptable cell and the indicator indicating not to transition to an RRC idle mode but to maintain the RRC inactive mode. In operation 2o-15, the NAS layer of the UE may not transition to the RRC idle mode and may not perform a new registration procedure. In operation 2o-20, when the NAS layer of the UE attempts to perform a new procedure, to send an NAS PDU to the AS layer of the UE, or to send an NAS PDU to an AMF, the UE may transition to the RRC idle mode.

Figure 2P:
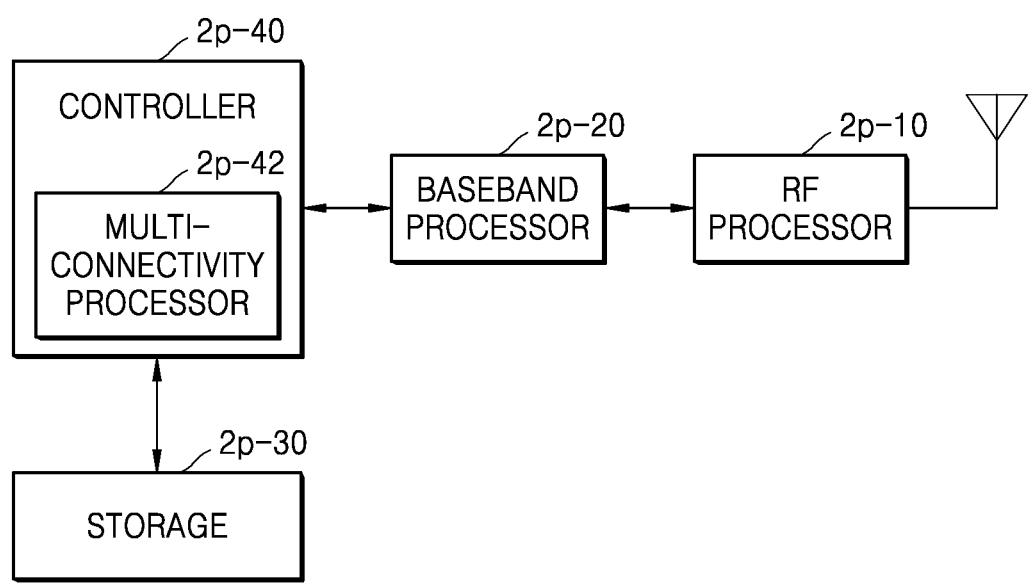
FIG. 2P illustrates a structure of a UE according to an embodiment of the disclosure.

FIG. 2P illustrates a structure of a UE according to an embodiment of the disclosure.

Referring to FIG. 2P, according to an embodiment of the disclosure, the UE may include an RF processor 2p-10, a baseband processor 2p-20, a storage 2p-30, and a controller 2p-40. The controller 2p-40 may include a multi-connectivity processor 2p-42.

The RF processor 2p-10 according to an embodiment of the disclosure may perform functions for transmitting and receiving signals through radio channels, e.g., band conversion and amplification of signals. That is, the RF processor 2p-10 may up-convert a baseband signal provided from the baseband processor 2p-20, into a RF band signal and then may transmit the RF band signal through an antenna, and may down-convert an RF band signal received through an antenna, into a baseband signal. For example, the RF processor 2p-10 may include a transmitting filter, a receiving filter, an amplifier, a mixer, an oscillator, a DAC, an ADC, or the like.

Referring to FIG. 2P, only one antenna is illustrated, but the UE may include a plurality of antennas.

The RF processor 2p-10 may include a plurality of RF chains. Furthermore, the RF processor 2p-10 may perform beamforming. For beamforming, the RF processor 2p-10 may adjust phases and sizes of respective signals to be transmitted or having received through a plurality of antennas or antenna elements. Also, the RF processor 2p-10 may perform MIMO and may receive data of a plurality of layers in the MIMO operation. By the control of the controller 2p-40, the RF processor 2p-10 may perform received beam sweeping by appropriately configuring the plurality of antennas or the antenna elements, or may adjust a direction and a beam width of a received beam to coordinate with a transmit beam.

The baseband processor 2p-20 may convert between a baseband signal and a bitstream based on physical layer specifications of a system. For example, for data transmission, the baseband processor 2p-20 may generate complex symbols by encoding and modulating a transmit bitstream. For data reception, the baseband processor 2p-20 may reconstruct a received bitstream by demodulating and decoding a baseband signal provided from the RF processor 2p-10. For example, according to an OFDM scheme, for data transmission, the baseband processor 2p-20 may generate complex symbols by encoding and modulating a transmit bitstream, may map the complex symbols to subcarriers, and then may configure OFDM symbols by performing inverse IFFT and CP insertion. For data reception, the baseband processor $2p$-20 may segment a baseband signal provided from the RF processor $2p$-10, into OFDM symbol units, may reconstruct signals mapped to subcarriers by performing FFT, and then may reconstruct a received bitstream by demodulating and decoding the signals.

The baseband processor $2p$-20 and the RF processor $2p$-10 may transmit and receive signals as described above. Accordingly, the baseband processor $2p$-20 and the RF processor $2p$-10 may also be called a transmitter, a receiver, a transceiver, or a communicator. In addition, at least one of the baseband processor $2p$-20 or the RF processor $2p$-10 may include a plurality of communication modules to support a plurality of different RATs. Also, at least one of the baseband processor $2p$-20 or the RF processor $2p$-10 may include different communication modules to process signals of different frequency bands. For example, the different RATs may include an LTE network, an NR network, or the like. The different frequency bands may include a SHF (e.g., 2.2 gHz or 2 gHz) band and a mm Wave (e.g., 60 GHz) band.

The storage $2p$-30 may store basic programs, application programs, and data, e.g., configuration information, for operations of the UE. The storage $2p$-30 may provide the stored data upon request by the controller $2p$-40.

The controller $2p$-40 may control overall operations of the UE. For example, the controller $2p$-40 may transmit and receive signals through the baseband processor $2p$-20 and the RF processor $2p$-10. Also, the controller $2p$-40 writes and reads data to or from the storage $2p$-30. To do so, the controller $2p$-40 may include at least one processor. For example, the controller $2p$-40 may include a CP for controlling communications and an AP for controlling an upper layer such as an application program.

Figure 2Q:
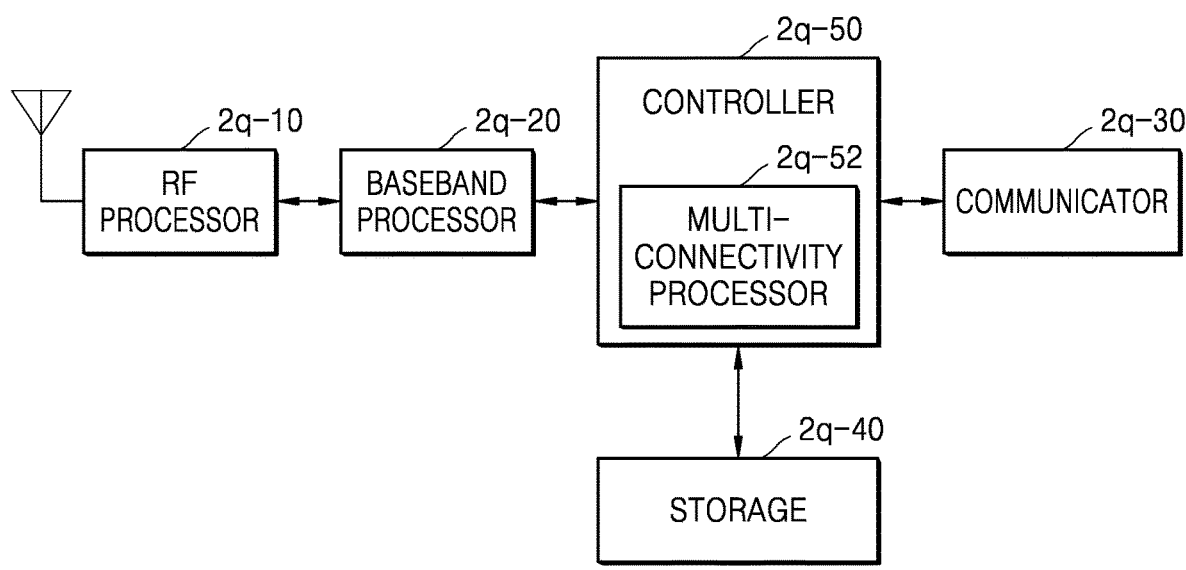
FIG. 2Q illustrates a structure of a base station according to an embodiment of the disclosure.

FIG. 2Q illustrates a structure of a base station according to an embodiment of the disclosure.

The base station according to an embodiment of the disclosure may include at least one TRP.

Referring to FIG. 2Q, the base station according to an embodiment of the disclosure may include an RF processor $2q$-10, a baseband processor $2q$-20, a communicator $2q$-30, a storage $2q$-40, and a controller $2q$-50. The controller $2q$-50 may include a multi-connectivity processor $2q$-52.

The RF processor $2q$-10 may perform functions for transmitting and receiving signals through radio channels, e.g., band conversion and amplification of signals. That is, the RF processor $2q$-10 may up-convert a baseband signal provided from the baseband processor $2q$-20, into a RF band signal and then may transmit the RF band signal through an antenna, and may down-convert an RF band signal received through an antenna, into a baseband signal. For example, the RF processor $2q$-10 may include a transmitting filter, a receiving filter, an amplifier, a mixer, an oscillator, a DAC, an ADC, or the like.

Referring to FIG. 2Q, only one antenna is illustrated, but the base station may include a plurality of antennas. Also, the RF processor $2q$-10 may include a plurality of RF chains. Furthermore, the RF processor $2q$-10 may perform beamforming. For beamforming, the RF processor $2q$-10 may adjust phases and sizes of respective signals to be transmitted or having received through a plurality of antennas or antenna elements. Also, the RF processor $2q$-10 may perform a downlink MIMO operation by transmitting data of a plurality of layers.

The baseband processor $2q$-20 may convert between a baseband signal and a bitstream based on physical layer specifications of a first RAT. For example, for data transmission, the baseband processor $2q$-20 may generate complex symbols by encoding and modulating a transmit bitstream. For data reception, the baseband processor $2q$-20 may reconstruct a received bitstream by demodulating and decoding a baseband signal provided from the RF processor $2q$-10. For example, according to an OFDM scheme, for data transmission, the baseband processor $2q$-20 may generate complex symbols by encoding and modulating a transmit bitstream, may map the complex symbols to subcarriers, and then may configure OFDM symbols by performing IFFT and CP insertion. For data reception, the baseband processor $2q$-20 may segment a baseband signal provided from the RF processor $2q$-10, into OFDM symbol units, may reconstruct signals mapped to subcarriers by performing FFT, and then may reconstruct a received bitstream by demodulating and decoding the signals. The baseband processor $2q$-20 and the RF processor $2q$-10 may transmit and receive signals as described above. Accordingly, the baseband processor $2q$-20 and the RF processor $2q$-10 may also be called a transmitter, a receiver, a transceiver, a communicator, or a wireless communicator.

The communicator $2q$-30 may also be referred to as a backhaul communicator, and may provide an interface for communicating with other nodes in a network.

The storage $2q$-40 may store basic programs, application programs, and data, e.g., configuration information, for operations of a main base station. In particular, the storage $2q$-40 may store information about bearers allocated for a connected UE and measurement results reported from the connected UE. Also, the storage $2q$-40 may store criteria information used to determine whether to provide or release multi-connectivity to or from the UE. The storage $2q$-40 may provide the stored data upon request by the controller $2q$-50.

The controller $2q$-50 may control overall operations of the main base station. For example, the controller $2q$-50 may transmit and receive signals through the baseband processor $2q$-20 and the RF processor $2q$-10, or the communicator $2q$-30. Also, the controller $2q$-50 writes and reads data to or from the storage $2q$-40. To do so, the controller $2q$-50 may include at least one processor. The storage $2q$-40 and the RF processor $2q$-10 may also be called a transmitter, a receiver, a transceiver, a communicator, or a wireless communicator.

Methods according to embodiments described in claims or specification of the disclosure may be implemented as hardware, software, or a combination of hardware and software.

When implemented as software, a non-transitory computer-readable storage medium storing at least one program (software module) may be provided. The at least one program stored in the non-transitory computer-readable storage medium is configured to be executable by one or more processors in an electronic device. The one or more processors may include instructions causing the electronic device to execute the methods according to embodiments described in claims or specification of the disclosure.

The at least one program (the software module, the software) may be stored in a non-volatile including a random-access memory (RAM) and a flash memory, a read-only memory (ROM), an electrically erasable programmable read-only memory (EEPROM), a magnetic disc storage device, a Compact Disc-ROM (CD-ROM), Digital Versatile Discs (DVDs), other optical storage devices, a magnetic cassette, or the like, or a memory configured of any or all combinations thereof. Also, each of configuration memories may be provided in a multiple number.

The at least one program may be stored in an attachable storage device that can be accessed via a communication network including Internet, Intranet, a local area network (LAN), a wide LAN (WLAN), or a storage area network (SAN), or a combination thereof. The storage device may access, via an external port, an apparatus for performing embodiments of the disclosure. Also, a separate storage device on a communication network may access the apparatus for performing embodiments of the disclosure.

In the aforementioned embodiments of the disclosure, each element included in the disclosure is expressed in a singular form or a plural form according to the embodiments. However, for convenience of description, the expression in the singular form or the plural form is selected to be appropriate for a provided situation, and thus, the disclosure is not limited to the singular form or the plural form. Accordingly, even when an element is expressed in a plural form, the element may be configured in a singular form, and even when an element is expressed in a singular form, the element may be configured in a plural form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a user equipment (UE) in a wireless communication system, the method comprising:
   receiving, from a serving cell, system information including at least one parameter associated with the serving cell, wherein the system information is at least one of a system information block (SIB) 2, SIB 3, SIB 4, or SIB 5;
   identifying a target cell which fulfills a cell reselection criterion from at least one non-serving cell based on the at least one parameter associated with the serving cell;
   receiving, from the target cell, a SIB 1 associated with the target cell;
   identifying at least one parameter included in the SIB 1 associated with the target cell; and
   determining whether to select the target cell based on the at least one parameter included in the SIB 1 associated with the target cell.

2. The method of claim 1, wherein the determining of whether to select the target cell comprises:
   identifying a cell selection reception level value (Srxlev) and a cell selection quality value (Squal) for the target cell, based on the at least one parameter included in the SIB 1 associated with the target cell, and
   selecting the target cell in case that the Srxlev for the target cell is greater than 0 and the Squal for the target cell is greater than 0.

3. The method of claim 1, wherein the at least one parameter included in the SIB 1 includes at least one of a parameter for a minimum required reception level associated with the target cell or a parameter for a minimum required quality level associated with the target cell.

4. The method of claim 1, wherein the identifying of the target cell which fulfills the cell reselection criterion comprises:
   measuring a cell selection reception level value (Srxlev) and a cell selection quality value (Squal) for the at least one non-serving cell based on the at least one parameter included in the system information, and
   identifying the target cell which fulfills the cell reselection criterion from the at least one non-serving cell based on the Srxlev and the Squal for the at least one non-serving cell.

5. The method of claim 1, wherein the at least one parameter included in the system information includes at least one of a parameter for a minimum required reception level associated with the at least one non-serving cell or a parameter for a minimum required quality level associated with the at least one non-serving cell.

6. The method of claim 1, wherein the method is performed in case that the UE is in a radio resource control (RRC) idle state or an RRC inactive state.

7. A user equipment (UE) comprising:
   a transceiver; and
   at least one controller coupled with the transceiver and configured to:
      receive, from a serving cell, system information including at least one parameter associated with the serving cell, wherein the system information is at least one of a system information block (SIB) 2, SIB 3, SIB 4, or SIB 5,
      identify a target cell which fulfills a cell reselection criterion from at least one non-serving cell based on the at least one parameter associated with the serving cell,
      receive, from the target cell, a SIB 1 associated with the target cell,
      identify at least one parameter included in the SIB 1 associated with the target cell, and
      determine whether to select the target cell based on the at least one parameter included in the SIB 1 associated with the target cell.

8. The UE of claim 7, wherein the at least one controller is further configured to:
   identify a cell selection reception level value (Srxlev) and a cell selection quality value (Squal) for the target cell, based on the at least one parameter included in the SIB 1 associated with the target cell, and
   select the target cell in case that the Srxlev for the target cell is greater than 0 and the Squal for the target cell is greater than 0.

9. The UE of claim 7, wherein the at least one parameter included in the SIB 1 includes at least one of a parameter for a minimum required reception level associated with the target cell or a parameter for a minimum required quality level associated with the target cell.

10. The UE of claim 7, wherein the at least one controller is further configured to:
    measure a cell selection reception level value (Srxlev) and a cell selection quality value (Squal) for the at least one non-serving cell based on the at least one parameter included in the system information, and
    identify the target cell which fulfills the cell reselection criterion from the at least one non-serving cell based on the Srxlev and Squal for the at least one non-serving cell.

11. The UE of claim 7, wherein the at least one parameter included in the system information includes at least one of a parameter for a minimum required reception level associated with the at least one non-serving cell or a parameter for a minimum required quality level associated with the at least one non-serving cell.

12. The UE of claim 7, wherein an operation of the at least one controller is performed in case that the UE is in a radio resource control (RRC) idle state or an RRC inactive state.

13. A computer program product comprising a non-transitory computer readable recording medium having a computer readable program stored therein, the computer readable program, when executed on a computing device, causes the computing device to:
- receive, from a serving cell, system information including at least one parameter associated with the serving cell, wherein the system information is at least one of a system information block (SIB) 2, SIB 3, SIB 4, or SIB 5;
- identify a target cell which fulfills a cell reselection criterion from at least one non-serving cell based on the at least one parameter associated with the serving cell;
- receive, from the target cell, a SIB 1 associated with the target cell;
- identify at least one parameter included in the SIB 1 associated with the target cell; and
- determine whether to select the target cell based on the at least one parameter included in the SIB 1 associated with the target cell.

* * * * *